(12) United States Patent
Swaminathan et al.

(10) Patent No.: US 8,359,015 B2
(45) Date of Patent: Jan. 22, 2013

(54) METHOD OF PROVIDING A CALL COMPLETION SERVICE TO A NOT REGISTERED OR NOT AVAILABLE USER IN A TELECOMMUNICATION NETWORK

(75) Inventors: Seetharaman Swaminathan, Chennai (IN); Ananthakrishnan Sujatha, Chennai (IN)

(73) Assignee: Alcatel Lucent, Paris (FR)

( * ) Notice: Subject to any disclaimer, the term of this patent is extended or adjusted under 35 U.S.C. 154(b) by 91 days.

(21) Appl. No.: 12/810,548

(22) PCT Filed: Dec. 27, 2007

(86) PCT No.: PCT/IB2007/055407
§ 371 (c)(1),
(2), (4) Date: Sep. 23, 2010

(87) PCT Pub. No.: WO2009/083754
PCT Pub. Date: Jul. 9, 2009

(65) Prior Publication Data
US 2011/0028130 A1 Feb. 3, 2011

(51) Int. Cl.
*H04M 3/42* (2006.01)
*G06F 15/173* (2006.01)
*H04L 12/28* (2006.01)
(52) U.S. Cl. ............... 455/414.1; 709/238; 370/254
(58) Field of Classification Search ............ 709/238; 455/414.1; 370/254
See application file for complete search history.

(56) References Cited

U.S. PATENT DOCUMENTS

| 2002/0160776 A1 | 10/2002 | Torabi |
| 2004/0066927 A1 | 4/2004 | Horvath et al. |
| 2005/0063527 A1 | 3/2005 | Bury et al. |

OTHER PUBLICATIONS

Telecommunications and Internet Converged Services and Protocols for Advanced Networking (TISPAN); PSTN/ISDN Simulation Services; Completion of Communications to Busy Subscriber (CCBS) Completion of Communications by No Reply (CCNR); Protocol specification; Draft TS 183 042 WI03035,' ETSI Standards, LIS, Sophia Antipolis, Cedex, France, No. V0.0.18, XP014039232; pp. 20-27, Nov. 1, 2007.

(Continued)

*Primary Examiner* — George Eng
*Assistant Examiner* — Nizar Sivji
(74) *Attorney, Agent, or Firm* — Fay Sharpe LLP

(57) ABSTRACT

A method is disclosed of providing a call completion service to a not registered or not available user (CCNReg):—sending (9-10) a SUBSCRIBE message, from the originating application server (AS1) to the terminating I-CSCF, —then sending (11) a Location Information Request (LIR), from the terminating I-CSCF towards the HSS, requesting information about the terminating S-CSCF (S-CSCF2),—then sending (12) a Location Info Answer (LIA) containing S-CSCF capabilities or/and name, from the HSS to the terminating I-CSCF,—then assigning (13) a S-CSCF, referred to as the terminating S-CSCF (S-CSCF2), and forwarding the SUBSCRIBE message to said the terminating S-CSCF (S-CSCF2),—then sending (14) a Server Assignment Request (SAR) from the terminating (S-CSCF2) to the HSS,—then sending (15) a Server Assignment Answer (SAA) containing second user's profile info, from the HSS to the terminating S-CSCF (S-CSCF2),—then, forwarding (16) the SUBSCRIBE message to the terminating application server (AS2), for requiring to handle the CCNReg service),— and then sending (21-23) a NOTIFY with the indication that the CCNReg subscription to the CCNReg service is active, and that the CCNReg request for the first user (User A) to communicate with the second user (User B) has been queued.

11 Claims, 27 Drawing Sheets

OTHER PUBLICATIONS

Joachim Poetzl Martin Huelsemann Deutsche Telekom Jean-Marie Stupka Siemens, "Extensions to the Session Initiation Protocol (SIP) for the support of the Call Completion Services for the European Telecommunications Standards Institute; draft-poetzl-sipping-call-competition-02.txt," IETF Standard_Working_Draft, Internet Engineering Task Force, IETF CH, No. 2, XP015050311, pp. 1-29, Feb. 1, 2007.

International Search Report for PCT/IB2007/055407, Oct. 15, 2008.

METHOD OF PROVIDING A CALL COMPLETION SERVICE TO A NOT REGISTERED OR NOT AVAILABLE USER IN A TELECOMMUNICATION NETWORK

BACKGROUND OF THE INVENTION

| Acronyms | |
|---|---|
| AKA | Authentication and Key Agreement |
| AS | Application Server |
| AVP | Attribute Value Pair |
| CCBS | Call Completion on Busy Subscriber |
| CCNR | Call Completion on No Reply |
| CCNReg | Call Completion Service to a user who is not registered or not available |
| HSS | Home Subscriber Server |
| I-CSCF | Interrogating-Call Session Control Function |
| IMS | IP Multimedia Subsystem |
| IP | Internet Protocol |
| ISUP | ISDN (Integrated Service Digital Network) User Part |
| LIA | Location Info Answer |
| LIR | Location Info Request |
| MAA | Multimedia- Authentication -Answer |
| MAR | Multimedia- Authentication -Request |
| MGCF | Media Gateway Controller Function |
| MRF | Media Resource Function |
| NGN | Next Generation Network |
| P-CSCF | Proxy-Call Session Control Function |
| PLMN | Public Land Mobile Network |
| PPA | Push-Profile-Answer |
| PPR | Push-Profile-Request |
| PS | (SIP) Proxy Server |
| PSTN | Public Switched Telephone Network |
| REL | (ISUP) Release Message |
| RLC | (ISUP) Release Complete Message |
| RTA | Registration Termination Answer |
| RTP | Real-Time Transport Protocol |
| RTR | Registration-Termination-Request |
| SAA | Server-Assignment-Answer |
| SAR | Server-Assignment-Request |
| S-CSCF | Serving-Call Session Control Function |
| SDP | Session Description Protocol |
| SIP | Session Initiation Protocol |
| SL | Subscriber Locator |
| TCAP | Transaction Capabilities Application Part |
| UAA | User-Authorization-Answer |
| UAR | User-Authorization-Request |

1. Field of the Invention

The present invention generally relates to call completion services which enable call attempts to be completed by a telecom network without the calling users having to initiate (repeated) new attempts themselves. It peculiarly concerns calls which are to set up through a SIP based telecom network, in particular the IP Multimedia Subsystem.

2. Description of the Prior Art

Examples of call completion services today include, Call Completion to a Busy Subscriber (CCBS), and Call Completion on No Reply (CCNR).

The network elements monitor the state of the called user, and 'recalls' the calling user, when the called user becomes 'free for recall'. In case of multiple calling users making call attempts to the same called user, a called user queue is used to store the relevant info, and then complete the call attempts in sequence. (Responsibility: terminating switch). A calling user can invoke a 'call completion' service multiple times to different called users—this is also managed by using a queue for the calling user. (Responsibility: originating switch)

CCBS and CCNR are today available in the Public Switched Telephone Network (PSTN) and in the Public Land Mobile Network (PLMN), for users that are busy or that are absent when their phone terminals are called. Call completion within a PLMN, is available for the not-reachable case. With the IP based telecom networks appeared new concepts: registration and presence. In an IP based network, a user cannot be called if the user is not "registered" in a registrar server. Similarly, a user cannot benefit from presence based services, if this user has not a status "available" in a presence server.

As concerns users that are busy or absent when their phone terminals are called, CCBS and CCNR for the Next Generation Networks (NGN), and for the Internet Protocol Multimedia Subsystem (IMS) based on the Session Initiation Protocol (SIP), are being discussed in standardization bodies (ETSI TISPAN). CCBS and CCNR services for SIP-based (not necessarily IMS) networks are being discussed in IETF, and drafts have already been proposed.

As concerns users that are not registered/not available, today there is no Call Completion to a Not Registered/Not available user (CCNReg) service, enabling communication attempts to a called IMS/SIP user who is not registered/not available, to be completed without the calling user having to initiate new communication attempts.

Thus, there is a need to provide a method for a Completion to a Not Registered/Not available user (CCNReg) service in a SIP based network (IMS, or non-IMS network).

Another aim of the invention is to provide the interworking of CCNReg service to PSTN/PLMN. Interworking will enables this service to be offered to:
- a PSTN/PLMN user, when this user makes a communication attempt,
  - to a SIP/IMS user who is not registered currently, or if the "presence" status of the called user indicates unavailability of the called user;
  - or to a PLMN user when the originating PSTN/PLMN and the terminating PLMN networks are connected only via an IMS/SIP/VOIP network in between.
- an IMS/VOIP/SIP user, when such a user makes a communication attempt to:
  - a PLMN user who is not present/not reachable/not available,
  - or to an IMS/VOIP/SIP user when the originating and the terminating IMS/SIP/VOIP networks are connected only via an PSTN/PLMN in between.

Note that in case of calls between IMS/SIP users, the calling and called users can belong to the same IMS/SIP network or different IMS/SIP networks.

FIGS. 1 to 4 illustrate various examples of interworking:

FIG. 1 shows an example in which a PSTN/PLMN User A calls a IMS/SIP User B.

FIG. 2 shows an example in which a PSTN/PLMN User A calls a PLMN User B, originating and terminating networks being connected via an IMS/SIP network.

FIG. 3 shows an example in which an IMS/SIP User A calls a PLMN User B.

FIG. 4 shows an example in which an IMS/SIP User A calls an IMS/SIP User B, originating and terminating networks being connected via a PSTN/PLMN network.

SUMMARY OF THE INVENTION

According to a first aspect of the present invention, there is provided a method for providing a call completion service to a not registered or not available user, this service being referred to as CCNReg, the call originating from a first user and terminating at a second user that are both in an IMS telecommunication network comprising:
- a P-CSCF,
- an originating I-CSCF, for a first user who is originating a call to a second user,
- a terminating I-CSCF for the second user,
- an originating S-CSCF for the first user,
- a terminating S-CSCF for the second user,
- an originating application server for the first user (e.g., http://en.wikipedia.org/wiki/Application server),
- a terminating application server for the second user,
- a Home Subscriber Server;

this method comprising steps consisting in detecting that the second user is not registered or not available, and then monitoring the status of the second user;
and being characterized in that, for monitoring the status of the second user, said method comprises the steps of:
- sending a first SUBSCRIBE message, from the originating application server to the terminating I-CSCF, via the originating S-CSCF, the first SUBSCRIBE message containing indications to inform the terminating I-CSCF of the initiation of the CCNReg service for completion of the communication attempt between the first user and the second user,
- then, on determining that the first SUBSCRIBE message is for CCNReg by finding the indications mentioned above, sending a Location Information Request, from the terminating I-CSCF towards the HSS, requesting information about the terminating S-CSCF,
- then sending a Location Info Answer containing S-CSCF capabilities or/and name, from the HSS to the terminating I-CSCF,
- then, on receiving S-CSCF capabilities or/and name in the terminating I-CSCF, assigning a S-CSCF, referred to as the terminating S-CSCF, and forwarding the SUBSCRIBE message to said the terminating S-CSCF,
- then sending a Server Assignment Request from the terminating to the HSS,
- then sending a Server Assignment Answer containing second user's profile info, from the HSS to the terminating S-CSCF,
- then, forwarding the first SUBSCRIBE message, from the terminating S-CSCF to the terminating application server, for requiring to handle the CCNReg service functions for the second user,
- then sending a first NOTIFY message from the terminating application server to the originating application server with the indication that the CCNReg subscription to the CCNReg service is active, and that the CCNReg request for the first user to communicate with the second user has been queued,
- and when the second user becomes registered/available again, and becomes ready for completion for the CCNReg call, and the first user becomes the first entry in the call completion queue, then sending a second NOTIFY message from the terminating application server to the originating application server with the indication that the CCNReg subscription to the CCNReg service is active, and that the second user is now registered/available, i.e., ready for call completion to the first user.

The claimed method provides a CCNReg service because the above mentioned SUBSCRIBE-NOTIFY mechanism provides a way to monitor the status of the second user.

The invention also provides an Interrogating Call Session Control Function, a Serving Call Session Control Function, an Application Server, and a Home Subscriber Server, functionally adapted for implementing the claimed method.

It is possible to provide the CCNReg service to any SIP-based (non-IMS) network, with the roles performed by the network elements above being taken up by network elements such as proxy server and registrar in a SIP network. The service concept remains the same and can be easily extended with minor adaptations to the call/signaling message flows.

So, according to a second aspect of the present invention, there is provided a method of providing a call completion service to a not registered or not available user, this service being referred to as CCNReg, the call originating from a first user and terminating at a second user that are both in a non-IMS SIP based telecommunication network comprising:
- an originating proxy server for the first user who is originating a call to a second user,
- a terminating proxy server for the second user, this method comprising steps consisting in detecting that the second user is not registered or not available, and then monitoring the status of the second user;
and being characterized in that, for monitoring the status of the second user, said method comprises the steps of:
- sending a first SUBSCRIBE message, from the originating proxy server to the terminating proxy server, this SUBSCRIBE message containing indications to inform the terminating proxy server of the initiation of the CCNReg service for completion of the communication attempt between the first user and the second user,
- then, on determining that this SUBSCRIBE message is for CCNReg by finding the indications mentioned above, sending a first NOTIFY message, from the terminating proxy server towards the originating proxy server, to convey CCNReg specific information that the CCNReg event subscription is now active, and the request is queued,
- then, on detecting that the second user registers/becomes available, sending from the terminating proxy server to the originating proxy server a NOTIFY message containing an indication that the second user is free for recall, i.e. ready for call completion.

The interworking of the CCNReg service to PSTN/PLMN is provided additionally by Media Gateway Control Function in case of IMS networks, and by SIP (to PSTN/PLMN) gateways in a (non-IMS) SIP network), PSTN/PLMN switches (connecting the users) being functionally adapted for implementing the claimed method.

Several extensions/enhancements to this method are possible, and the proposed method can be easily modified, for example, to provide: CCNReg as a terminating feature, Selective CCNReg, etc.

Other features and advantages of the present invention will become more apparent from the following detailed description of implementations of the present invention, when taken in conjunction with the accompanying drawings.

BRIEF DESCRIPTION OF THE DRAWINGS

In order to illustrate in detail features and advantages of implementations of the present invention, the following will be with reference to the accompanying drawings. If possible, like or similar reference numerals designate the same or similar components throughout the figures thereof and description, in which:

FIGS. 12 to 25 represent the call flow in an example where the caller belongs to a PSTN/PLMN, and the callee belongs to a SIP based network.

FIGS. 25 to 30 represent the call flow in an example where the caller belongs to a SIP network and the callee belongs to a PLMN network.

DETAILED DESCRIPTION OF PREFERRED IMPLEMENTATIONS

Calling User and Called User Belong to an IMS Based Network

Figure 5:
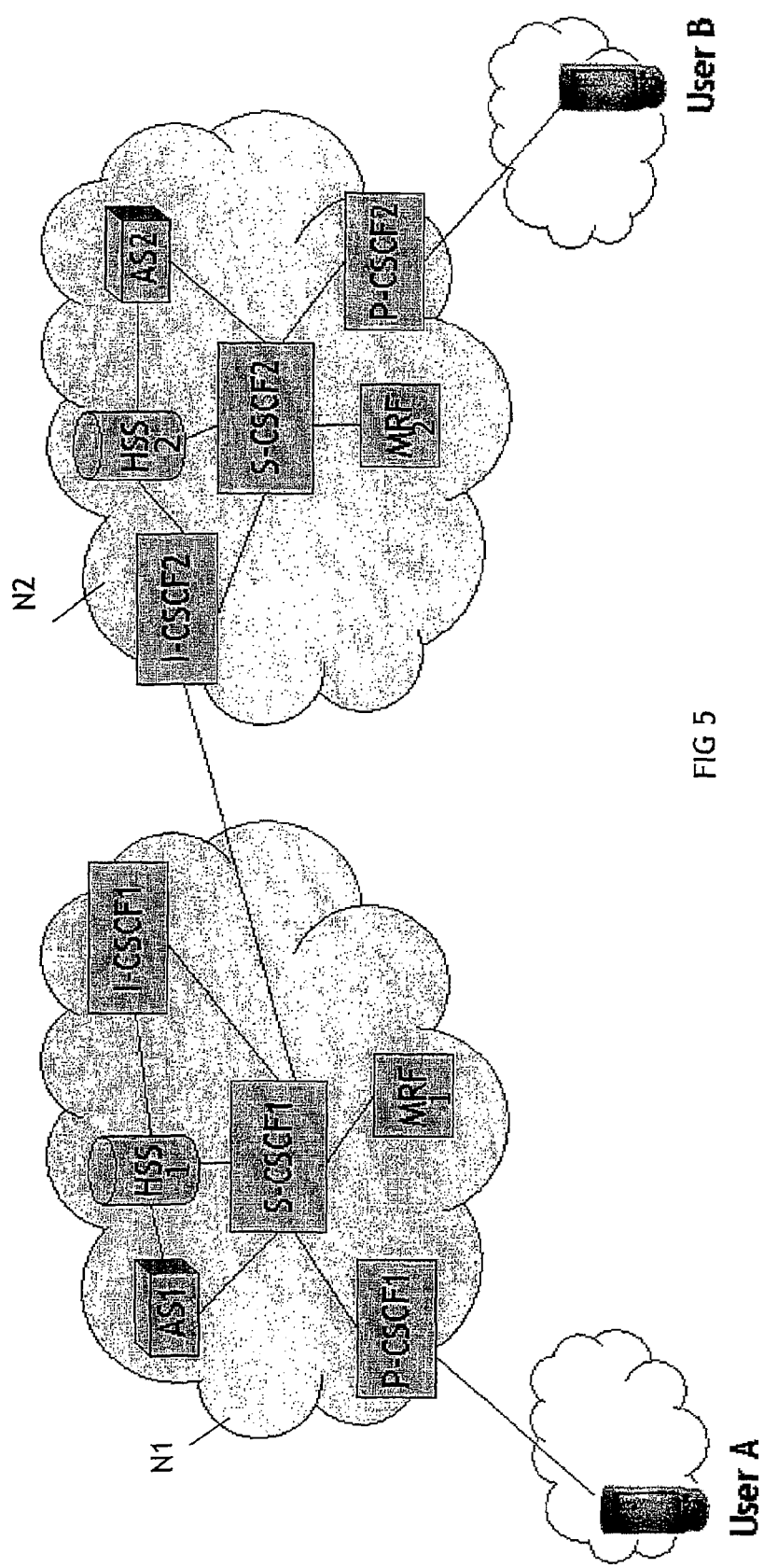
FIG. 5 represents an example of an IMS network where the method according to the invention can be applied.

FIG. 5 represents an example of an IMS network where the method according to the invention can be implemented by executing some adapted software in the nodes.

This example of an IMS network comprises two parts, N1 and N2, which are connected together. An IMS terminal of a user A is connected to a first network part N1 which will be called originating network when the user A is calling. Network N1 comprises:

A Home Subscriber Server, HSS1, which is a master user database that supports the IMS network entities that actually handle calls. It contains the subscription-related information (user profiles), performs authentication and authorization of the user, and can provide information about the user's physical location. It is similar to a Home Location Register (HLR) and Authentication Centre (AUC) of a PLMN.

A Proxy Call Session control Function, P-CSCF1, which is a SIP proxy that is the first point of contact for the IMS terminal of user A. An IMS terminal discovers its P-CSCF either because it is indicated by the protocol DHCP (Dynamic Host Configuration Protocol), or because it is assigned in the PDP (Public Data Protocol) Context in the General Packet Radio Service (GPRS). A P-CSCF is assigned to an IMS terminal during registration, and does not change for the duration of the registration. The Proxy Call Session control Function P-CSCF1 sits on the path of all signaling messages to and from the terminal of user A, and can inspect every message. It authenticates the user and establishes an IPsec security association with the IMS terminal. It also generates charging records.

A Serving Call Session control Function, S-CSCF1, which is the central node of the signaling plane. It provides services to the users, which they subscribe to. Each terminal is associated with an S-CSCF on SIP registration. The incoming and outgoing sessions passes through it. Home Subscriber Server HSS1 maintains the information about S-CSCF1 and user's association. Home Subscriber Server HSS1 knows the users location and subscribed services. S-CSCF is typically a SIP server, but performs session control too. It uses DIAMETER Cx and Dx interfaces to the Home Subscriber Server HSS1, for downloading and uploading user profiles—it has no local storage of the user. All necessary information is loaded from the HSS. Each terminal attached to the network part N1 is associated with S-CSCF1 on SIP registration. It handles SIP registrations, which allows it to bind the user location (e.g. the IP address of the terminal) and the SIP address of the user. It sits on the path of all signaling messages, and can inspect every message. It decides to which application server(s) a SIP message will be forwarded, in order to provide their services. It provides routing services, typically using Electronic Numbering (ENUM) lookups. It enforces the policy of the network operator. There can be multiple S-CSCF in a network, for load distribution and high availability reasons.

An Interrogating Call Session control Function, I-CSCF1, which locates the associated S-CSCF for a user, and routes the request to it. Its IP address is published in the Domain Name System (DNS) of a domain, so that remote servers can find I-CSCF1 and use it as a forwarding point for SIP packets to this domain. The Interrogating Call Session control Function I-CSCF1 queries the Home Subscriber Server HSS1, by using the DIAMETER Cx interface to retrieve the user location, and then routes the SIP request to its assigned Serving Call Session control Function S-CSCF1. It is the Home Subscriber Server HSS1 that assigns the Serving Call Session control Function S-CSCF1 to a user, when it is queried by the Interrogating Call Session control Function I-CSCF1.

An application server, AS1, which hosts and executes services, and interfaces with the Serving Call Session control Function S-CSCF1, using the protocol SIP. It can query the Home Subscriber Server HSS1.

A Media Resource Function, MRF1, which provides media related functions such as media manipulation (e.g. voice stream mixing) and playing of tones and announcements (Media servers).

A terminal of a user B is connected to the other network part, N2, which will be called terminating network when the user B is being called. Network N2 comprises nodes, similar to the nodes of the originating network N1:

A Proxy-CSCF, P-CSCF2.

A Serving-CSCF, S-CSCF2.

An Interrogating Call Session control Function, ICSCF2.

An application server AS2 (e.g., http://en.wikipedia.org/wiki/Application server).

A Media Resource Function MRF2.

If such a SIP based network N1-N2 must be interworked with a Public Switched Telephone Network (PSTN), it further comprise PSTN Gateways. For signaling, circuit switched networks use ISDN User Part (ISUP) or Bearer Independent Call Control (BICC) over Message Transfer Part (MTP), while IMS networks use Session Initiation Protocol (SIP) over IP. For media, circuit switched networks use Pulse-code modulation (PCM), while IMS network use Real-Time Transport Protocol (RTP). The PSTN Gateways are:

A Signaling Gateway (SGW) which interfaces with the signaling plane of the circuit switched networks. It transforms lower layer protocols, such as Stream Control Transmission Protocol (SCTP), an Internet Protocol, into Message Transfer Part (MTP), a Signaling System 7

(SS7) protocol, to pass ISDN User Part (ISUP) from the MGCF to the circuit switched network.

A Media Gateway Controller Function (MGCF) which does call control protocol conversion between SIP and ISUP, and interfaces with the SGW over Stream Control Transmission Protocol (SCTP). It also controls the resources in an MGW with an H.248 interface.

A Media Gateway (MGW) interfaces with the media plane of the circuit switched network, by converting between RTP and PCM. It can also transcode when the codecs do not match (e.g. IMS might use AMR, PSTN might use G.711).

Registration in an IMS Network:

Registrations in an IMS network are performed according to the procedures described in 3GPP TS 24.228 and 3GPP TS 24.229. According to such procedures:

The UE shall register and deregister only its public user identities with the associated contact address that belong to the UE. The initial registration procedure consists of the UE sending an unprotected initial REGISTER request and, upon being challenged, sending the integrity protected REGISTER request. The UE can register a public user identity with its contact address at any time after it has acquired an IP address, discovered a P-CSCF, and established an IP-CAN bearer that can be used for SIP signaling. However, the UE shall only initiate a new registration procedure when it has received a final response from the registrar for the ongoing registration, or the previous REGISTER request has timed out.

The UE shall send only the initial REGISTER requests to the port advertised to the UE during the P-CSCF discovery procedure. If the UE does not receive any specific port information during the P-CSCF discovery procedure, the UE shall send the initial REGISTER request to the SIP default port values as specified in RFC 3261. The contents of the REGISTER message, etc. shall be in accordance with 3GPP TS 24.229.

Authentication is performed during initial registration. A UE can be re-authenticated during subsequent reregistrations, deregistrations or registrations of additional public user identities. When the network requires authentication or re-authentication of the UE, the UE will receive a 401 (Unauthorized) response to the REGISTER request. The actions by a UE on receiving such a response shall be in accordance with 3GPP TS 24.229.

Example message flows for registration are illustrated in 3GPP TS 24.228. Typical IMS network elements involved in a REGISTER are P-CSCF, I-CSCF, HSS and in some cases an AS, with the S-CSCF usually acting as the registrar.

CCNReg Service Description

The proposed CCNReg service enables a calling user A, encountering a called user B who has not registered yet, or who has unregistered, to the network N1-N2 to have the communication completed without having to make a new communication attempt. This service can be directly used in IMS networks, in non-IMS SIP-based networks, as well as in PSTN/PLMN networks when the called user is an IMS or SIP user, and the calling user is an IMS or SIP user, or a PSTN or PLMN user.

We will describe later an interworking method which is necessary when the called party belongs to a PLMN, and the calling party is a PSTN or PLMN user, IMS or SIP user.

Though there are some similarities in this service CCNReg with CCBS/CCNR, there are several important differences in terms of the call flows, as well as the functionality required in various network elements.

On activation of this CCNReg service, the network monitors the registration state of the called user (User B), and will monitor when the user B is registered again. Similarly to the CCBS/CCNR services, the network will wait a short time, after the registration of user B, for allowing the resources to be reused for user B originating a communication. If the resources are not reused within this time by User B, then the network will automatically recall user A. When user A accepts the CCNReg recall, the network will automatically generate a CCNReg call to user B.

The control of the CCNReg service is done by an application server, and it is possible for users to modify the CCNReg queue by use of appropriate procedures. The originating application server AS1 keeps track of the CCNReg requests of user A for a given period of time, up to a certain provisionable limit, and this is done by maintaining a queue for each served user. The terminating application server AS2 keeps track of the CCNReg requests directed to the user B for a given period of time, and this is done by maintaining a queue for outstanding communications towards a given user. After successful CCNReg call setup, the corresponding entry is deleted from both queues (maintained by originating and terminating application servers, AS1 and AS2 respectively).

In case of more than one endpoint for the called user B, this feature will become active only when none of them are registered. The 'not registered' case could arise when none of the called user's endpoints (terminals) are registered, or if the calling user tries to communicate with a specific endpoint (terminal) that is not registered. The approach described in this proposal can be extended to cover the latter case.

The method according to the invention, for CCNReg, can be extended for call completion based on called user 'presence'.

Detailed Description of an Example of Implementation of CCNReg

FIGS. 6 to 16 represent the call flow in an example where the caller A and the callee B belong to an IMS or SIP based network. They respectively use user equipments UE1 and UE2, both connected to an example of IP based network, which comprises:

A Proxy Call Session control Function, P-CSCF.
  An Interrogating Call Session control Function, I-CSCF, common for user A and for user B (i.e. in this example, a same I-CSCF is the originating I-CSCF and the terminating I-CSCF).
  A Serving Call Session control Function, S-CSCF1, for User A (user equipment UE1).
  A Serving Call Session control Function, S-CSCF2, for User B (user equipment UE2).
  An application server AS1, for User A (user equipment UE1 (e.g., http://en.wikipedia.org/wiki/Application server)).
  An application server AS2, for User B (user equipment UE2).
  A Home subscriber Server HSS.
  A Media Server which is part of a Media Resource Function, not represented, and which can play announcements.

In this example, the assumptions are:
  User B is 'not registered' or 'not available';
  P_CSCF and I_CSCF are the same for UE1 and UE2.

CCNReg Booking

When a user (say user A of user equipment UE1), makes a communication attempt to a called user (User B of user equipment UE2) the network detects the registration state of the user B. We consider the case where this status is "not registered".

IMPORTANT REMARK: If there was already a S-CSCF assigned for this user B (this would happen when an S-CSCF has requested the HSS earlier to retain its identity), the user's registration state would be 'unregistered', and not 'not registered'. In this case, the HSS would return the assigned S-CSCF2 identity to the I-CSCF1, and the incoming request (INVITE in this scenario) would then be sent to the S-CSCF2. The first and the second approaches described below are relevant only when there is no S-CSCF assigned to the user B, and the registration state of the user is 'not registered'.

First Approach

Figure 6:
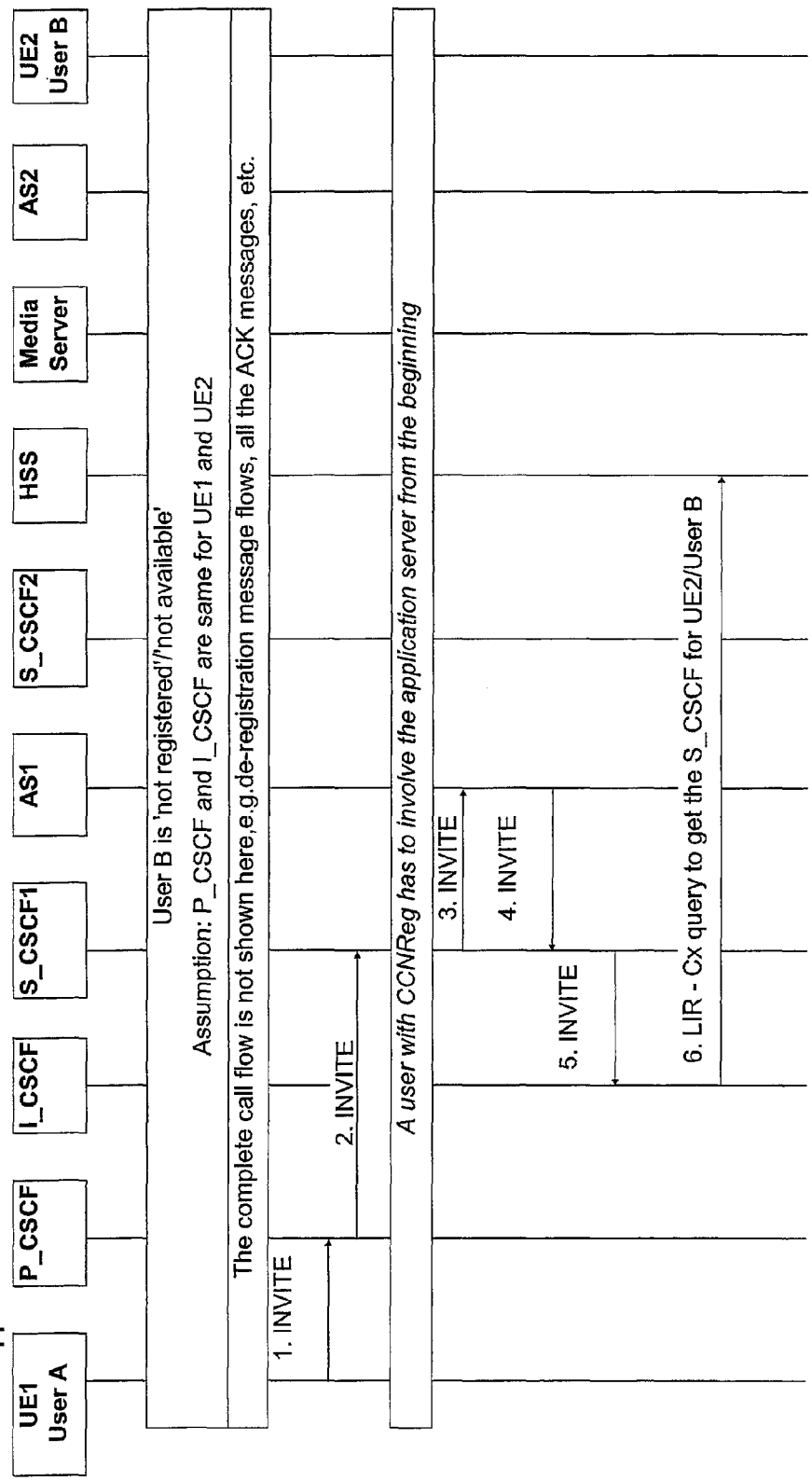
FIGS. 6 to 16 represent the call flow in an example where the caller A and the callee B belong to a same SIP based network, with a first approach for the method.

On FIG. 6, steps:

1-3) The user equipment UE1 of user A sends an INVITE to the originating application server AS1, via the P-SCCF1 and S-CSCF1.

4-5) The originating application server AS1 forwards the INVITE to the terminating I-CSCF via the S-CSCF1 (In this example, the same I-CSCF is also the originating I-CSCF, just for simplification in illustrating the concept, in reality it could be different, as User A and User B could belong to different IMS/SIP networks).

6) The terminating I-CSCF sends a Diameter Location-Info-Request (LIR-Cx) to the HSS, to get the S_CSCF for UE2/User B.

Figure 7:
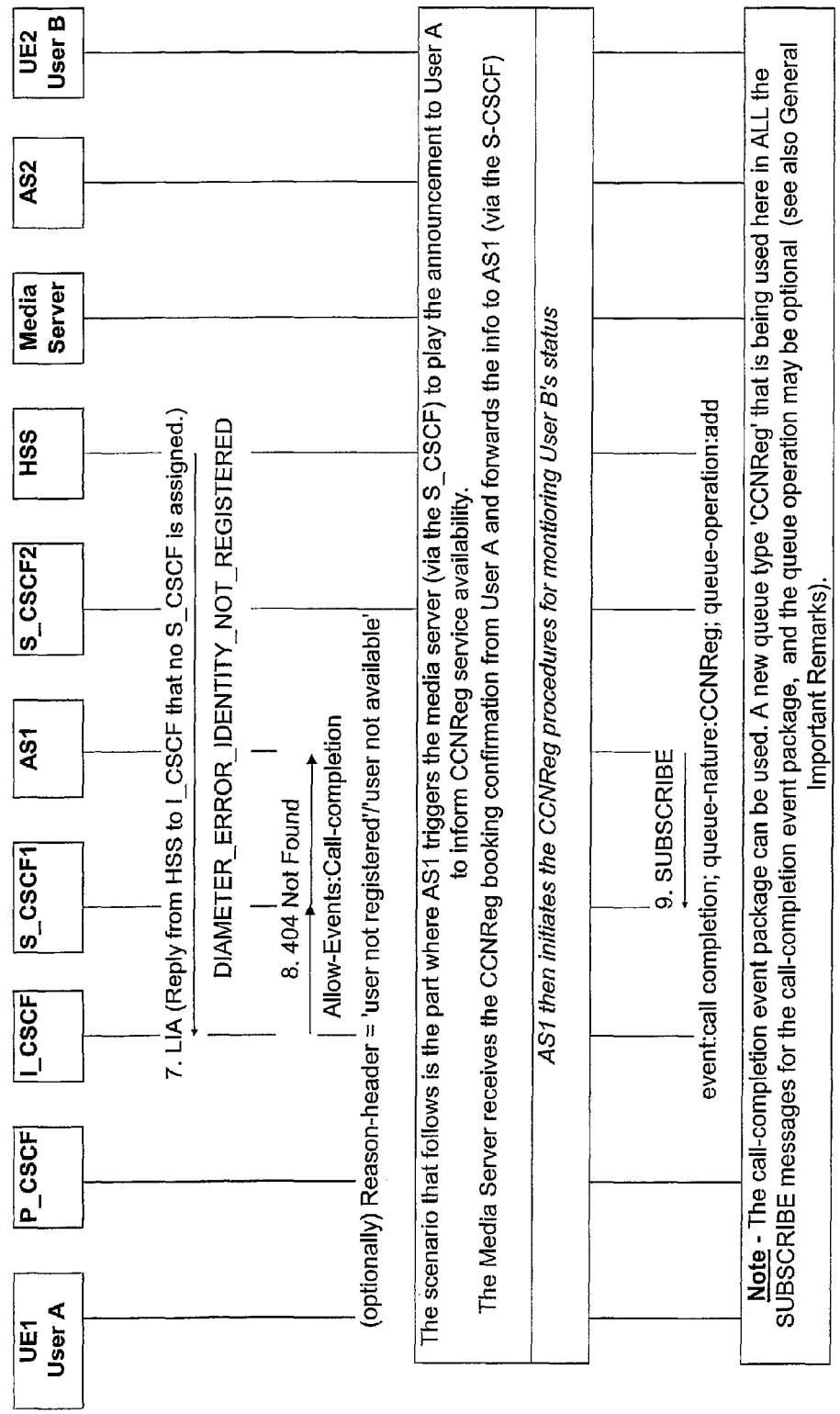

On FIG. 7, steps:

7) The HSS returns a DIAMETER_ERROR_IDENTITY_NOT_REGISTERED indication in a Location-Info-Answer (LIA), back to the I-CSCF.

8) The terminating I-CSCF sends a 404 Not Found response, back to the application server AS1 of User A, via the originating S-CSCF1. The 404 Not Found response contains the following indications:

Allow-Events header: Call-completion;
Reason-header: 'user not registered/user not available'. See Note 2 below.

Note: In case of a user 'not available' (respectively user 'not present' in case of 'presence' services), appropriate values should be sent in the Reason header.

On reception of a 404 Not Found (Not represented on the figure), the originating application server AS1, checks if CCNReg is possible for User A, by checking if:

User A has subscribed to the service (and if it is activated).
The reason header in the 404 response indicates 'user not registered'. See Note 2 below.
CCNReg inhibition is not applicable (Allow-Events header contains Call Completion).
The CCNReg queue of User A is not full.

On ensuring that the above conditions are met, the originating application server, AS1, will start a CCNReg Retention Timer (T1) before the expiry of which the CCNReg booking by User A has to take place. The originating application server, AS1, will also trigger the Media Server (in a Media Resource Function (MRF) not represented), via the S-CSCF1, for an announcement to be played by the Media Server to User A, informing him/her that CCNReg booking is possible, and prompting the user A to perform the booking. Subsequently the digits are collected by the MRF (indication CCNReg booking confirmation), and sent to the originating application server AS1 (via the S-CSCF1). Then the originating application server AS1 initiates the status monitoring for User B: On reception of the CCNReg booking confirmation from User A, before the expiry of the CCNReg Retention Timer T1, AS1 stops timer T1, and adds User B to the CCNReg queue of User A.

Note 1: After confirming the CCNReg booking (both for the first approach described here, as well as the second approach described in later sections below), User A can go on-hook, i.e., terminate the current communication attempt to User B.

Note 2: The Reason header in the 404/480 response is not mandatory for a pure IMS/SIP network call (i.e., calling and called users belong to IMS/SIP networks, without involvement of any PSTN/PLMN in between), but it may be essential when interworking with PSTN/PLMN—depending on the standardization/implementation aspects.

9-10) Subsequently, the originating application server AS1 sends a SUBSCRIBE message to the terminating I-CSCF (which is the same as the originating I-CSCF in this example—just for illustration purposes) via the originating S-CSCF1. In addition, the originating application server AS1 starts a CCNReg Request operation timer T2, to supervise the subscription request of CCNReg event. This SUBSCRIBE message has the following contents:

event: call completion;

Notes:

1. The call-completion event package is defined in the IETF Draft Extensions to the Session Initiation Protocol (SIP) for the support of the Call Completion Services for the European Telecommunications Standards Institute: draft-poetzl-bliss-call-completion-00, available at: http://tools.ietf.org/id/draft-poetzl-bliss-call-completion-00.txt.

2. The following statement is taken from the IETF draft mentioned above as it is also applicable for CCNReg service: "The SUBSCRIBE request MAY contain an Accept header field. If no such header field is present, it has a default value of "application/call-completion". If the header field is present, then it MUST include "application/call-completion".

If the proposal as given in IETF draft-poetzl-sipping-call-completion-02 (or later versions of it) is followed for defining queue related fields & operations for call completion services, then a new queue type 'CCNReg' can be defined. This means that the following will also be included in the SUBSCRIBE:

queue-nature: CCNReg;
queue-operation: add.

Note that the SUBSCRIBE described for this approach as well as the second approach described in later sections will also contain a non-zero value in the Expires header (indicating the duration of the subscription). Since this is common to any SUBSCRIBE-NOTIFY mechanism as described in IETF RFC 3265, it may not be explicitly specified in all sections below.

General Important Remarks

Remark 1:

Note that the 'queue nature' (or, in general, the queue type, providing info on the type of call completion service) info mentioned above (as well as in following sections for SUBSCRIBE and NOTIFY messages) is optional in the (initial) SUBSCRIBE message (to start the status monitoring of User B who is not registered/not available), ONLY under the following circumstances:

1. In case of calls involving only IMS/SIP networks, and separate queues are not required to be maintained in the called user's side (i.e., in the Application Server of User B and Proxy Server of User B for IMS networks and SIP networks respectively) for different types of call completion services (CCBS, CCNR, CCNReg, etc.).

2. In case of calls involving interworking with PSTN/PLMN, ONLY if the PSTN/PLMN is the originating network, i.e., PSTN/PLMN does not play the role of inter-connecting two IMS/SIP networks, and it is also NOT the terminating network (the called party is NOT a PLMN user).

This is mainly because, for invoking different call completion services (for example CCBS, CCNR, and CCNReg now), the mapping to TCAP messages differs, so for example in case of a call from an IMS/SIP to a PLMN user, when CCNReg is invoked by the calling user, the mapping from the SIP SUBSCRIBE message to the appropriate TCAP message (and its contents) should be ensured for proper working of the call completion service.

In the NOTIFY message, the queue nature (or, in general, the queue type) is optional, as it is possible to correlate the NOTIFY to the subscription that triggered this notification using the standard mechanisms as described in RFC 3265.

Remark 2

The queue operation (add, delete, suspend, resume) is optional, in the sense that it could either be used to clearly (and directly) specify the actual operation to be performed by the receiving entity (as described in draft-poetzl-sipping-call-completion-02), or if this is NOT used, such info could be "derived" by the receiving entity using other means—depending on whether it is implemented or not, the implementation logic could slightly vary, however, the basic service as such will not have any impact.

Remark 3

In any case, the presence or absence of such queue-related info (for example, queue-nature, and queue-operation), and its handling by the various network elements will not affect the basic working of the CCNReg service described here. Assuming Remark 1 is taken into account, depending on the actual standardization, and implementation, there could be some minor differences in the actual functional logic of the various involved network elements. Further, the exact fields in which the call completion service related info (described in this document) is conveyed in the SUBSCRIBE and NOTIFY messages will also not affect the basic working of the CCNReg service described here.

Remark 4

The Reason header in the 404/480 response is not mandatory for a pure IMS/SIP network call (i.e., calling and called users belong to IMS/SIP networks, without involvement of any PSTN/PLMN in between), but it may be essential when interworking with PSTN/PLMN—depending on the standardization/implementation aspects.

Remark 5:

Aspects such as "denial-reason" and "cancellation-reason" are described based on draft-poetzl-sipping-call-completion-02. So if this is not used as basis, then it is possible that these fields are not used at all. Hence, throughout this document, these aspects are described as "optional", as they don't have an impact on the basic functioning of the CCNReg service.

Remark 6:

It is possible that queue-state (with value request-queued (or) userfree for recall) is being used instead of the call-completion-state as described in the following sections in the NOTIFY message.

General Remark: In this section as well as in the following sections, the event-specific info, for example, call-completion-state, will be in the SIP message body, with the content type as "application/call-completion".

Figure 8:
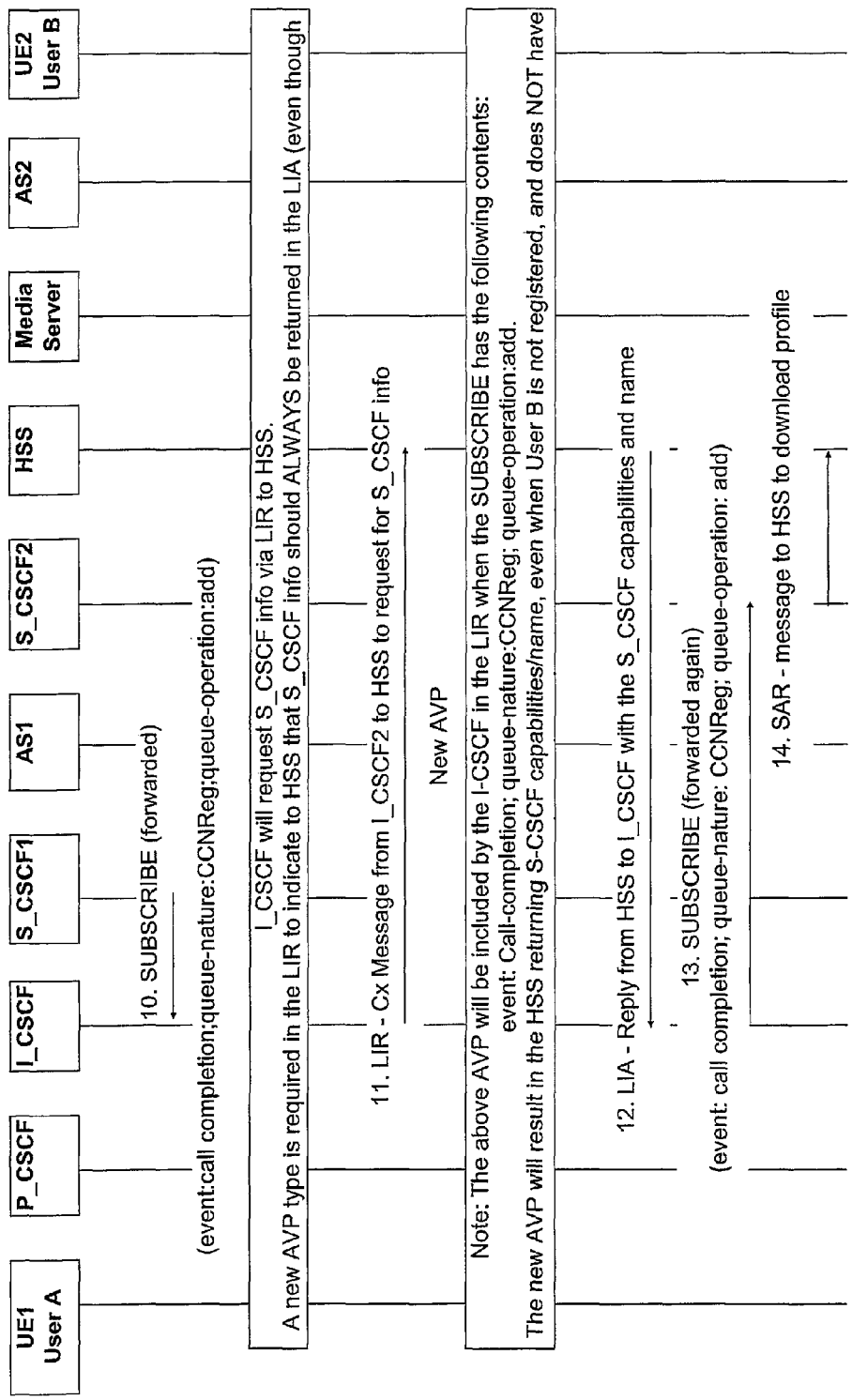

On FIG. 8, steps:

11) The terminating I-CSCF, on determining that this SUBSCRIBE is for CCNReg (by finding the contents mentioned above), sends a LIR request towards the HSS, requesting for S-CSCF capabilities, using a new Attribute Value Pair (AVP) in accordance with the rules laid out in 3GPP TS 29.228. A new AVP type is required in the LIR to indicate to HSS that S_CSCF info should ALWAYS be returned in the LIA (even though the user is not registered).

Note: The above AVP will be included by the I-CSCF in the LIR when the SUBSCRIBE has the following contents:
    event: Call-completion;

In addition, as stated above, optionally (see also General Important Remarks):
    queue-nature: CCNReg;
    queue-operation: add.

The new AVP will result in the HSS returning S-CSCF capabilities/name, even when User B is not registered, and does NOT have any services active in the de-registered state.

12) The HSS responds by sending, to the I-CSCF, a Location Info Answer (LIA) containing the requested S-CSCF capabilities/name.

13) On receiving the S-CSCF capabilities/name from HSS, the I-CSCF assigns a S-CSCF (henceforth this will be referred to as the terminating S-CSCF, S-CSCF2. Then the I-CSCF forwards the same SUBSCRIBE to the S-CSCF2. This SUBSCRIBE message contains the following indications:
    event: call completion;

In addition, as stated above, optionally (see also General Important Remarks):
    queue-nature: CCNReg;
    queue-operation: add;
for requiring the terminating application server AS2 to handle the CCNReg service functions for the second user (User B). In other words, the S-CSCF2 will check the above indications in the received SUBSCRIBE, before sending (forwarding) it to the terminating application server AS2.

14) The terminating S-CSCF2 sends a Server Assignment Request (SAR) to HSS. This is important because when the user B (who had previously deregistered) registers again, it is this S_CSCF which has to be used.

Figure 9:
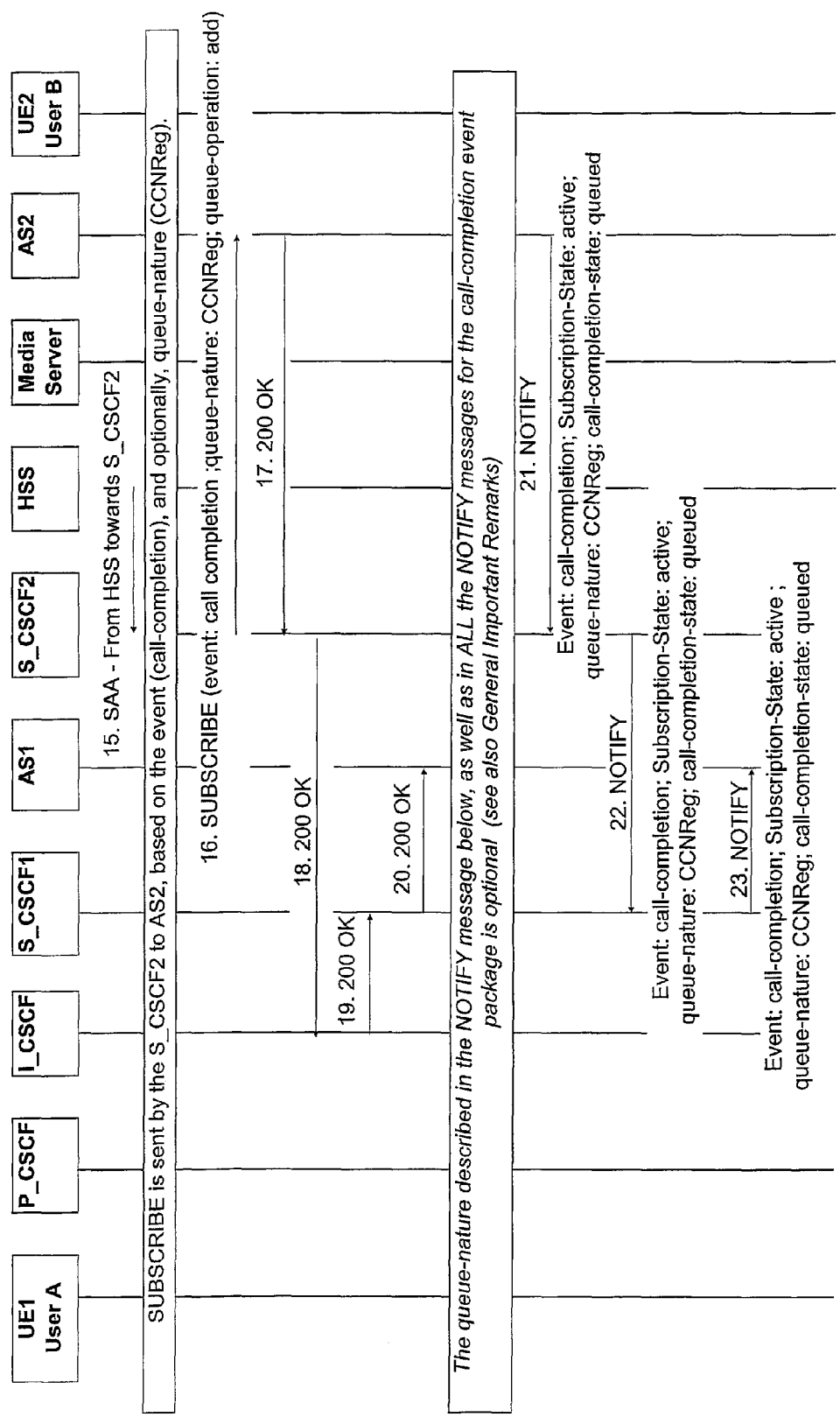

On FIG. 9, steps:

15) HSS responds by sending a Server Assignment Answer (SAA) to the terminating S-CSCF2, with User B's profile info.

16) Subsequently, the terminating S-CSCF2 sends the SUBSCRIBE received as described above from the I-CSCF towards the terminating application server AS2. Thus the terminating application server AS2 is required to handle the CCNReg service functions for the called user B.

17-20) On reception of this SUBSCRIBE, the terminating application server AS2 first responds with a 200 OK, with the subscription duration (in the Expires header) (See Note below). The message 200 OK is sent from the terminating application server AS2 to the terminating application server AS1 via S-CSCF2, I-CSCF, S-CSCF1.

21-23) Subsequently the terminating application server AS2 sends a NOTIFY to the originating application server AS1, via S-CSCF2 and S-CSCF1, with the following contents:
    Event: call-completion,
    Subscription-State: active,
    call-completion-state: queued
In addition, as stated earlier, optionally (see also General Important Remarks), following queue-related information:
    queue-nature: CCNReg.
Remarks: The queue-nature described in the NOTIFY message below, as well as in ALL the NOTIFY messages for the call-completion event package, is optional In addition to what is mentioned above, if the service retention option as described in draft-poetzl-bliss-call-completion-00 (or later versions of it) (or as is currently supported in PSTN/PLMN for other call completion services such as PSTN/PLMN) is supported, then the NOTIFY message should also contain the service-retention indication.

The application server AS2, in addition also adds User A into the CCNReg queue of User B, and starts the CCNReg Service Duration timer T7 (for User B)—this timer specifies the duration for which the CCNReg will be valid (i.e. User A's entry will be retained in User B's CCNReg queue, and the SUBSCRIBE-NOTIFY will be handled). On reception of the first NOTIFY from the terminating application server AS2, the originating application server AS1 stops timer T2, starts the CCNReg Duration timer for User A, T3. This timer T3 specifies the duration for which the CCNReg will be valid (i.e., User B's entry will be retained in User A's CCNReg queue, and the SUBSCRIBE-NOTIFY will be handled).

Figure 10:
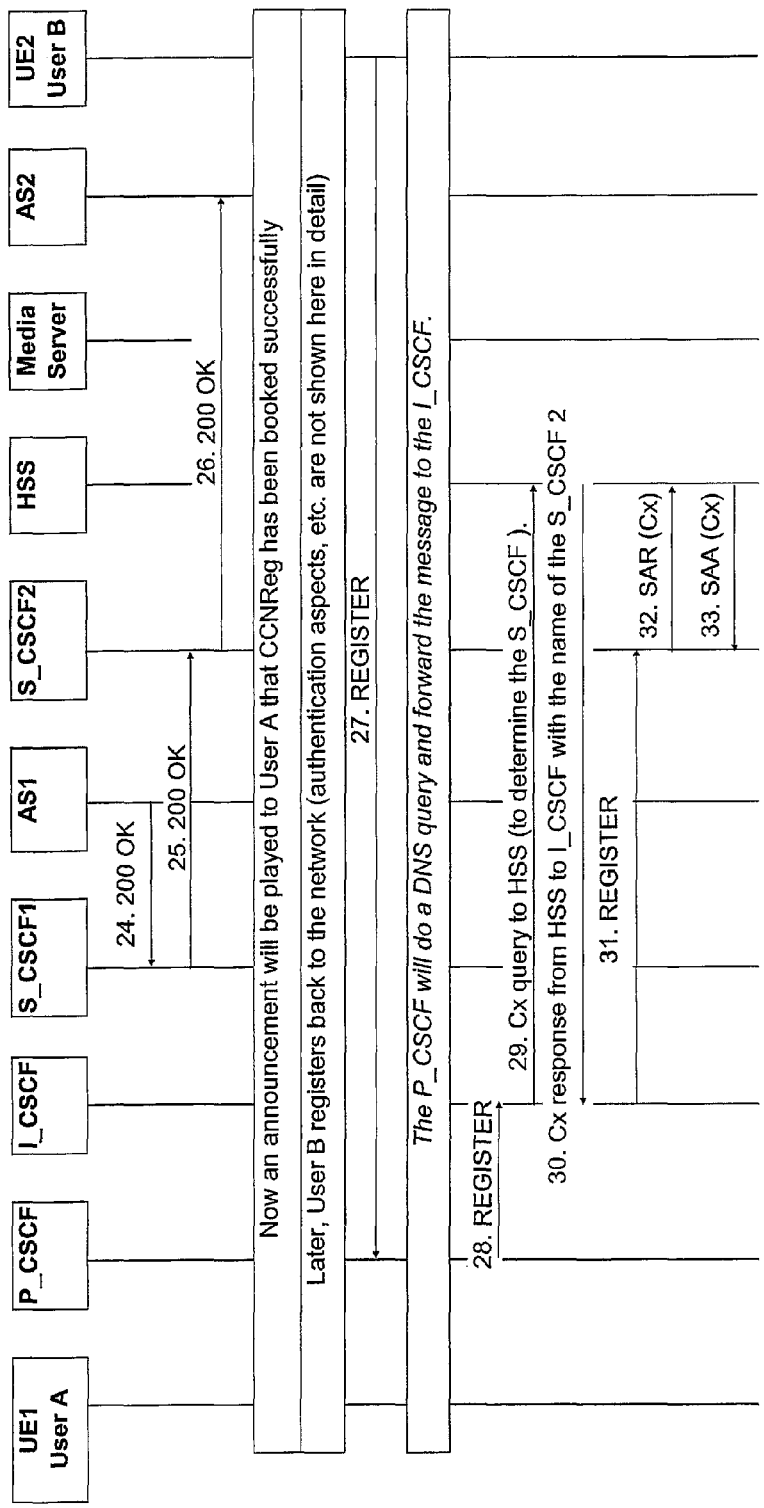

On FIG. 10, steps:

24-26) A message 200 OK is sent from originating application server AS1 to terminating application server AS2 via S-CSCF1, and S-CSCF2. Subsequently, a confirmation announcement is initiated by the originating application server AS1 (via the S-CSCF1) though the Media Resource Function MRF wherein the Media Server plays an announcement to User A that the CCNReg booking to User B, was successful.

Note: In the above described first approach, since the terminating S-CSCF2 and the terminating AS2 are informed only after the CCNReg booking confirmation by User A, in case User B has CCNReg inhibition, still User A is allowed to book the service. This is because User B's profile will be examined only by terminating S-CSCF2 and AS2. So in case User B has CCNReg inhibition, a 403 Forbidden response can be sent by Application Server 2 (AS2) to Application Server 1 (AS1), as this is a case of "long term denial".

Alternately, a proper NOTIFY should be sent in response to the SUBSCRIBE (after sending the appropriate 2xx response). This NOTIFY would contain:
    Subscription-State: terminated;
    Reason: rejected.

In addition, as stated earlier, optionally (see also General Important Remarks), following information:
    queue-nature: CCNReg; (queue-related), and,
    Denial-reason: long-term-denial.

A proper announcement should be played to User A (triggered by originating AS1) during the booking confirmation, if User B has CCNReg inhibition.

Note: In case of some temporary failure conditions due to which the SUBSCRIBE cannot be accepted, for example, if User B's call-completion queue is full, Application Server 2 (AS2) should send a 480 temporarily unavailable response to Application Server 1 (AS1). In case of some general error (for example, CCNReg inhibition as discussed above), the Application Server 2 (AS2) should send a 403 Forbidden response to Application Server 1 (AS1). Alternatively, after acknowledging the SUBSCRIBE request (with a 2xx response), a proper NOTIFY specifying that the subscription is "terminated", etc., optionally along with the appropriate "denial reason" (short-term-denial or long-term-denial) can be sent by Application Server AS2 to Application Server AS1.

Figure 17:
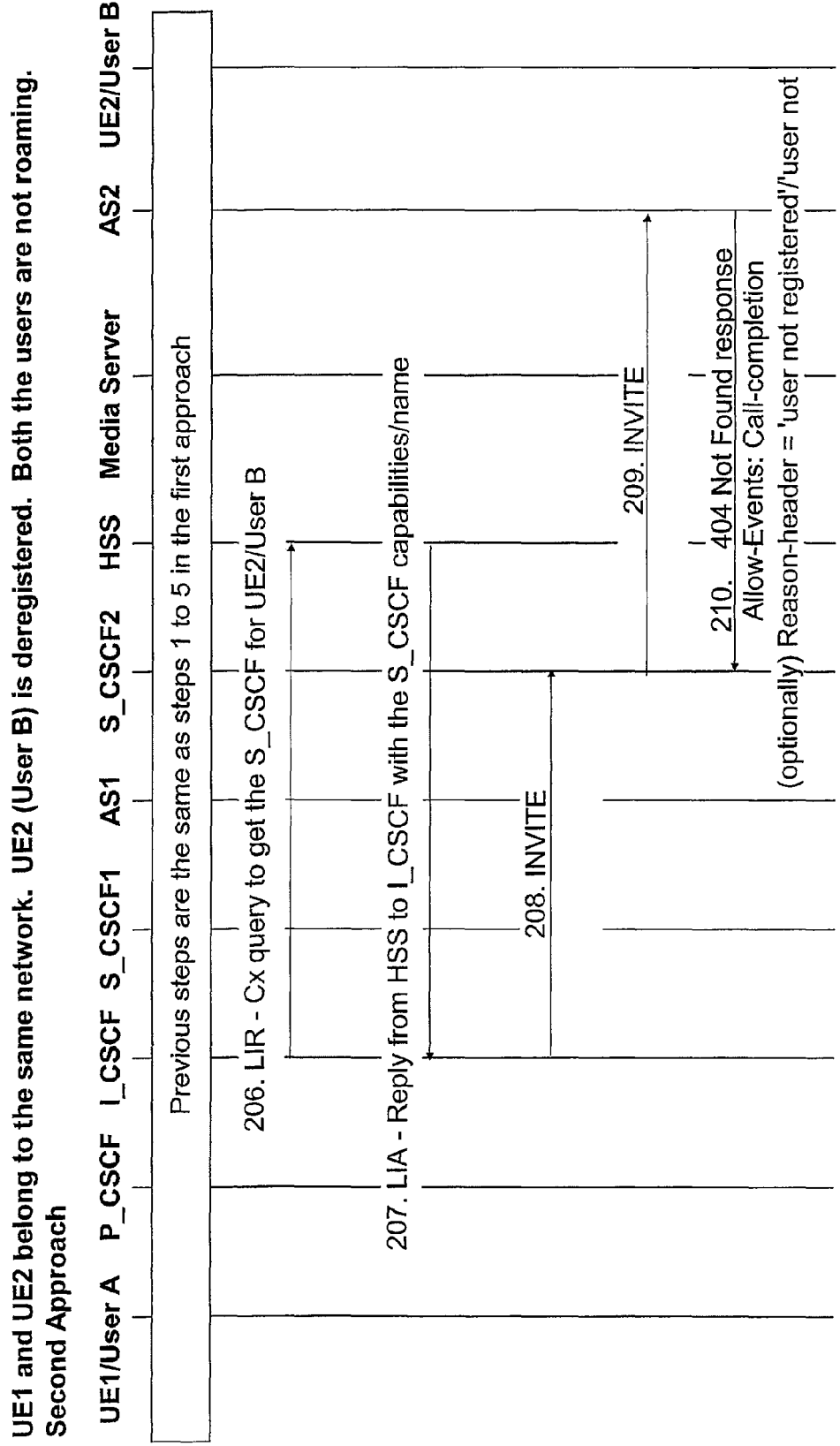
FIGS. 17 to 18 represent a part of the call flow for the same example where the caller and the callee belong to a same SIP based network, but with a second approach implying modifications of some steps.
Figure 18:
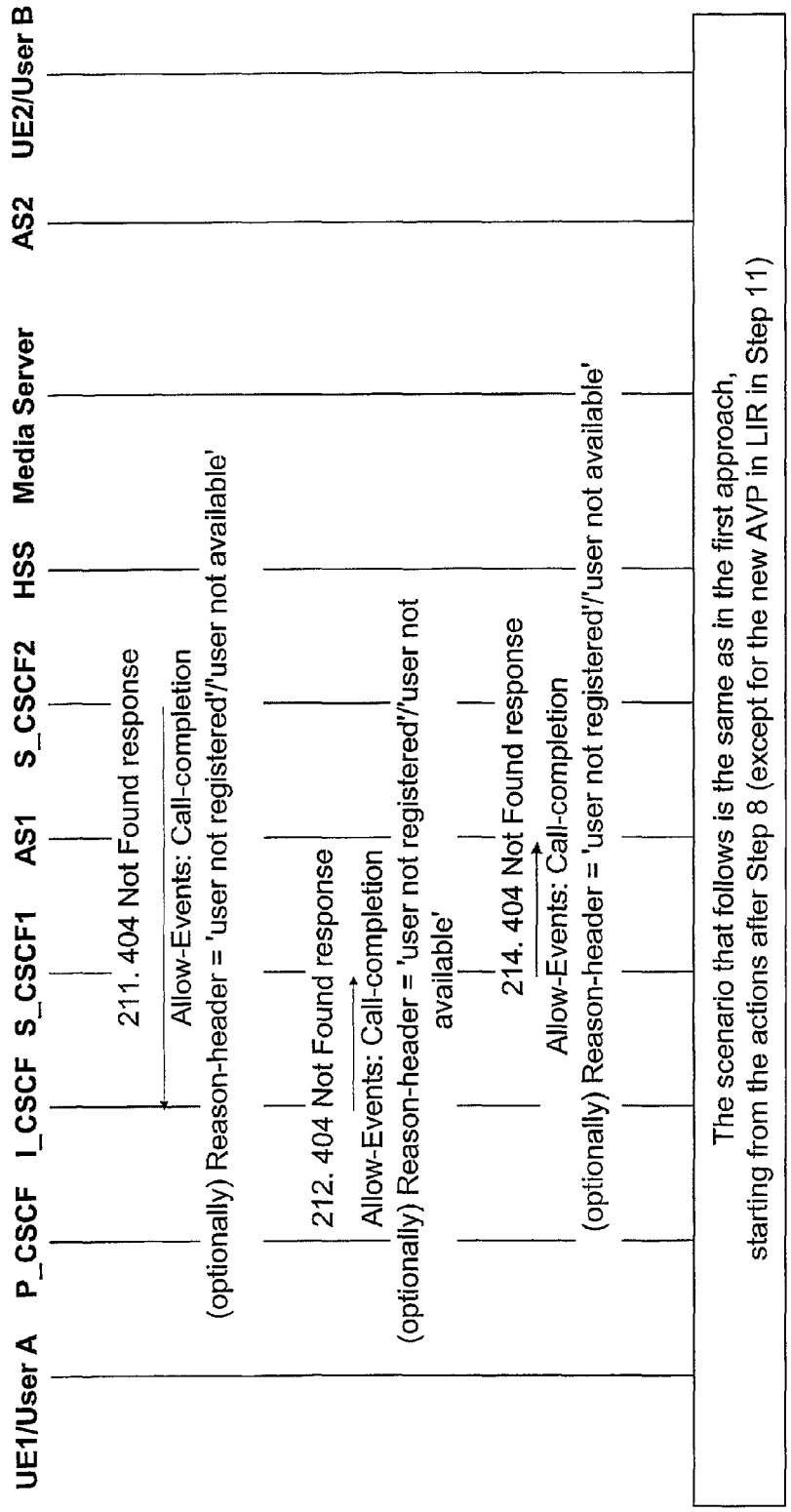

A second approach will be described further, with reference to FIGS. 17-18.

Idle Guard Timer Handling:

Later, User B registers back to the network (authentication aspects, etc. are not shown here in detail).

On FIG. 10, step:

27-28) When User B registers, UE2 sends a REGISTER to P-CSCF, which forwards it to the I-CSCF. The P_CSCF will do a Domain Name System query, and forward the message to the I_CSCF.

29) The I-CSCF sends a Cx query to HSS (to determine the S_CSCF).

30) The HSS sends a Cx response to the I_CSCF, with the name of the S_CSCF2 (which was stored in the HSS after the SUBSCRIBE was received by S_CSCF2).

31) The I-CSCF then sends a REGISTER to S-CSCF2.

32) The S-CSCF2 sends a SAR (Cx) to the HSS.

33) The HSS responds by a SAA (Cx) to the S-CSCF2.

Figure 11:
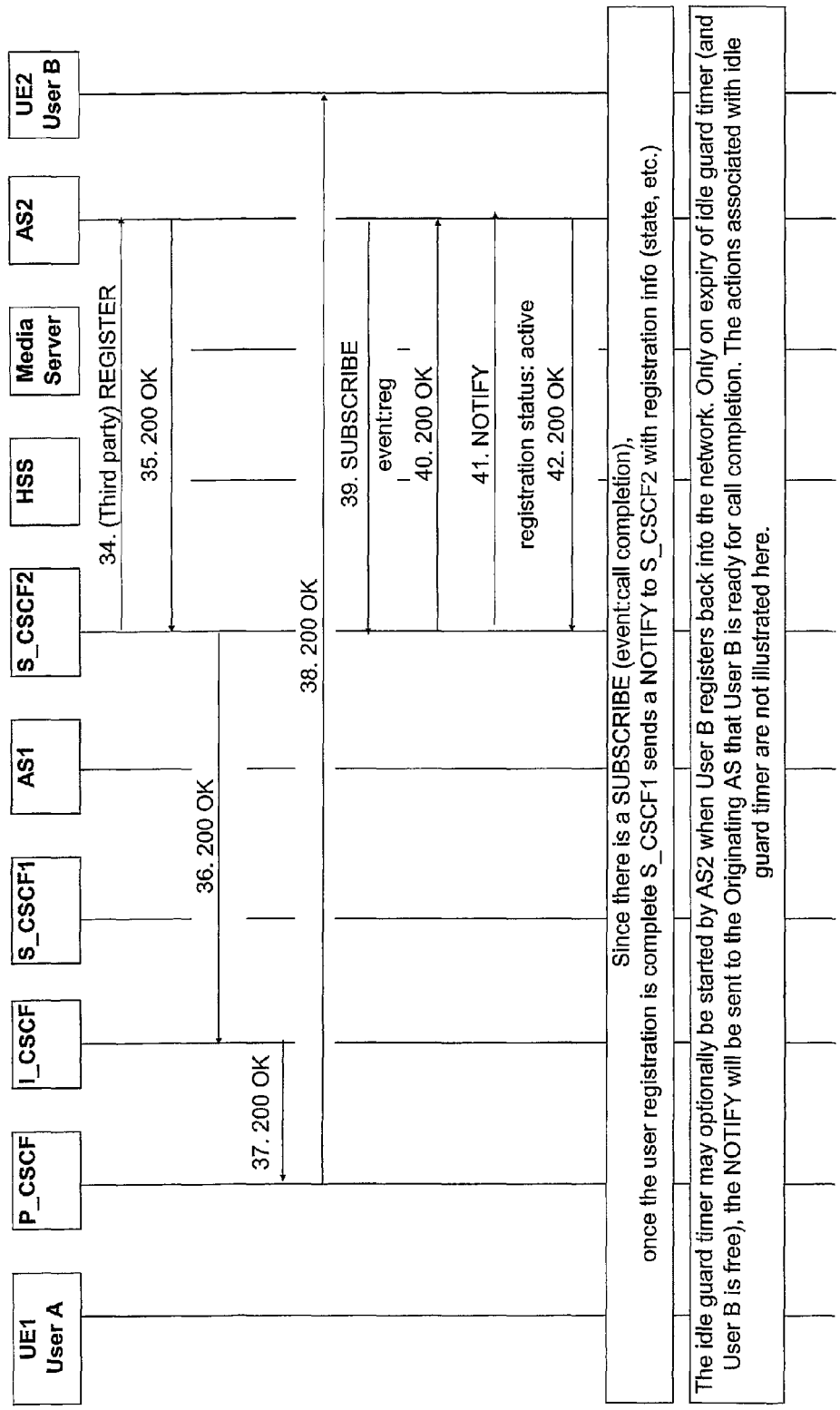

On FIG. 11, steps:

34) The S-CSCF2 sends a (Third party) REGISTER to the terminating application server AS2.

35) The terminating application server AS2 responds by sending a 200 OK.

36-38) S-CSCF2 forwards this 200 OK to UE2, via I-CSCF, and P-CSCF.

39) The terminating application server AS2 sends a SUBSCRIBE (event: reg) (See Note 1 below) to S-CSCF2.

40) The S-CSCF2 sends a 200 OK to the terminating application server AS2.

41) Then the S-CSCF2 sends a NOTIFY (registration status: active) to the terminating application server AS2.

42) The terminating application server AS2 answers to S-CSCF2 by a 200 OK. So the terminating application server AS2 has been informed of the registration event via the S-CSCF2 (See Note 1 below). If there is any CCNReg queue entry pending for User B, the terminating application server AS2 starts a destination idle guard timer T8, during which User B will be able to initiate communication attempts. During this period, all incoming calls will encounter the 'busy' indication (See Notes 2 and 3 below). The idle guard timer T8 may optionally be started by AS2 when User B registers back into the network. Only on expiry of idle guard timer (and User B is free), the NOTIFY will be sent to the Originating AS that User B is free for Recall. The actions associated with idle guard timer are not illustrated here.

Figure 12:
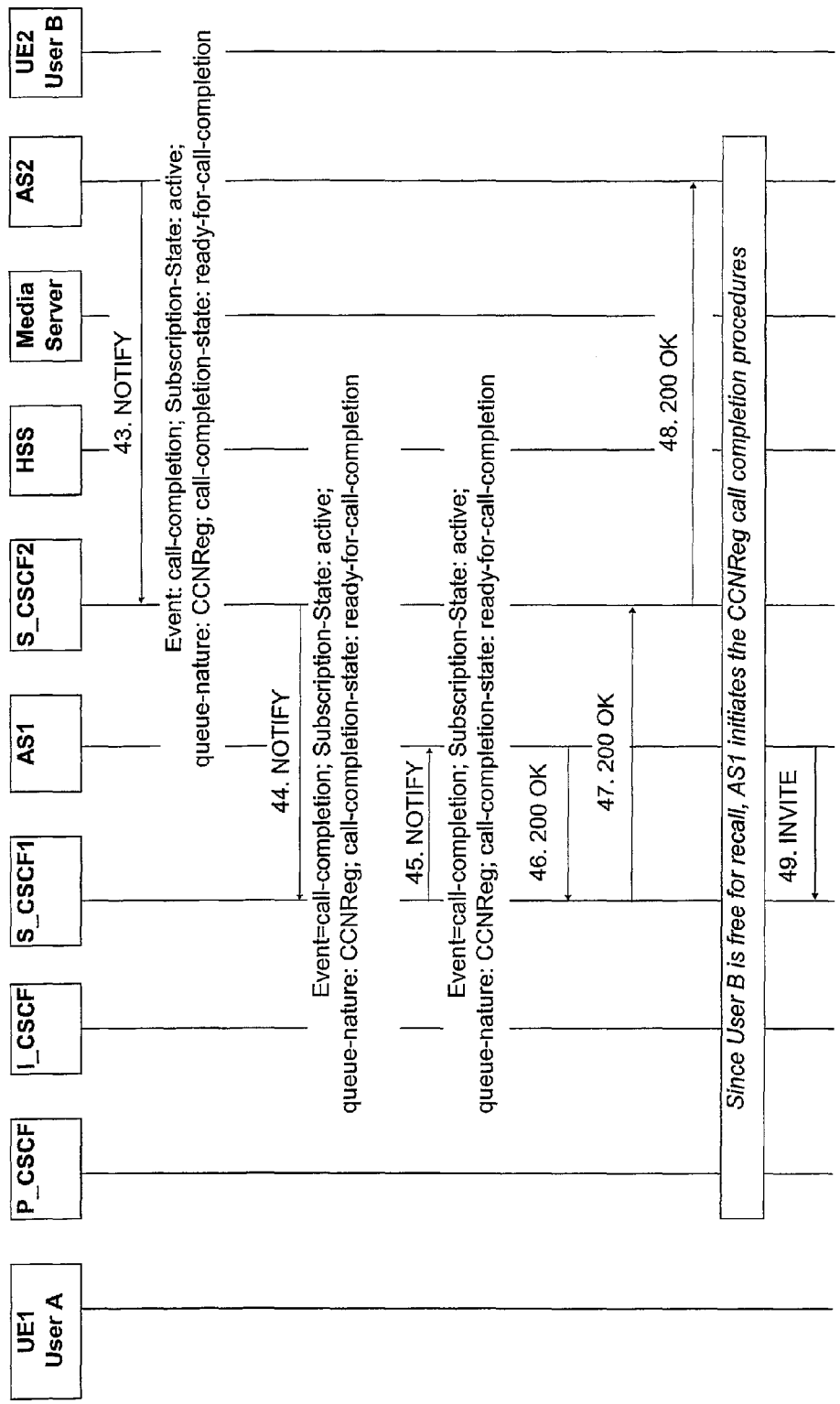
Figure 13:
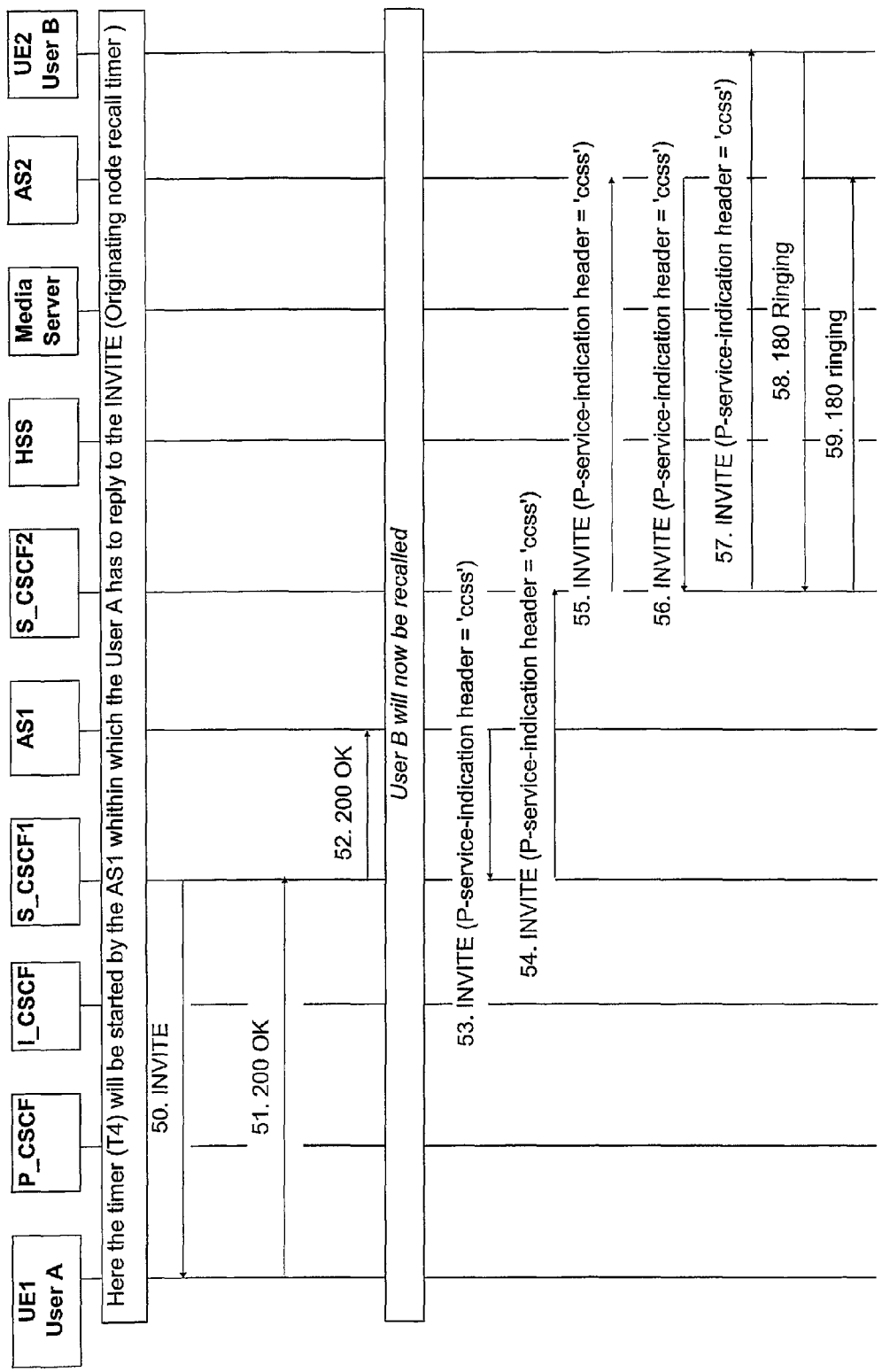
Figure 14:
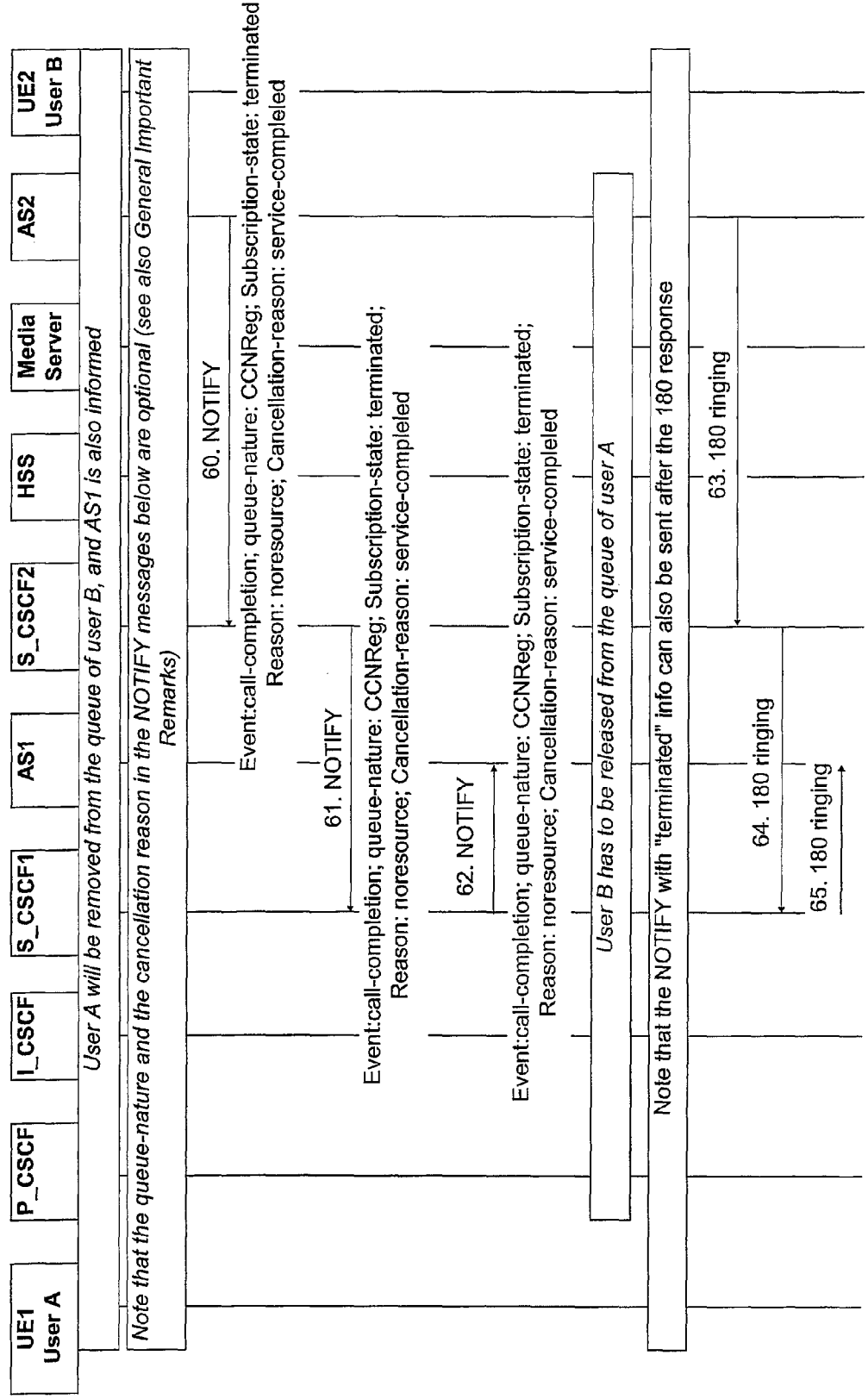

On FIG. 12, steps:

43) On expiry of timer T8 (and User B is free), the terminating application server AS2 sends a NOTIFY (see Note 4 below) to S-CSCF2 with the following indications. It also starts a Timer T9 for recalling CCNReg Destination Node.
    Event=call-completion;
    Subscription-State: active;
    call-completion-state: ready-for-call-completion.

In addition, as stated earlier, optionally (see also General Important Remarks), following queue-related information:
    queue-nature: CCNReg.

Note: The NOTIFY message described above with the indication "ready-for-call-completion" is sent to the first entry in User B's queue. Here, as well as in sections below, it is assumed that User A is the first entry in User B's queue.

44-45) S-CSCF2 and S-CSCF1 forward the NOTIFY, with the same indication, up to the originating application server AS1.

46-48) The originating application server AS1 answers to AS2 with 200 OK, via S-CSCF1 and S-CSCF2.

Note 1: The S-CSCF2 on receiving a REGISTER, would initiate a third party REGISTER towards the (terminating) AS2 (that is already assigned for User B). The terminating AS2 could subscribe to the 'reg' event package, when it receives a third party REGISTER request: the basic mechanism is described in IETF RFC 3680 and 3GPP TS 24.229 (Section 'Common Application Server (AS) Procedures').

Note 2: Of course, a variant of this could be that User B is also allowed to receive incoming calls (if user B is free) during the idle guard period (i.e., the idle guard timer can be a configurable value by the operator).

Note 3: This 'busy' indication could result in interaction with CCBS service.

Note 4: The NOTIFY mentioned above is sent to the first (active) entry in the CCNReg queue of User B.

CCNReg Recall to User A:
Since User B is free for recall, AS1 initiates the CCNReg call completion procedures.
On FIG. 12, step:
49) After receiving information that User B has registered/ is now available, by the indication 'ready-for-call-completion' (via a NOTIFY message), the originating application server AS1 recalls User A by sending an INVITE (without SDP) to the S-CSCF1. The originating application server AS1 will also start the CCNReg (originating Node) Recall Timer T4 within which the User A has to reply to the INVITE.
On FIG. 13, step:
50) The S-CSCF1 forwards the INVITE to UE1.
51-52) When User A accepts the Recall, by picking up the phone, UE 1 sends a 200 OK to the application server AS1, via S-CSCF1. User B will now be recalled. On reception of 200 OK (with SDP Offer) from User A, the originating application server AS1 initiates an announcement which indicates to user A that the CCNReg call is being completed, and the call to User B is being connected. This announcement is triggered by contacting the Media Resource Function via the S-CSCF1 (Step not represented).
CCNReg Call to User B
On FIG. 13, step:
53-55) After completion of the announcement playing to User A (that the CCNReg call is being completed), the originating application server AS1 sends an INVITE (without SDP) to the terminating application server AS2, via the S-CSCF1 and S-CSCF2, with the P-Service-Indication header containing the value 'ccss'.
56-57) On reception of this INVITE, the terminating application server AS2 forwards it towards the called user equipment UE2 (User B) via the S-CSCF2.
Note: In some call scenarios, it is possible that, say, a 183 Session Progress or 200 OK response is sent instead of 180 Ringing. In these cases also, the subscription termination operations explained below will be initiated by the terminating AS after sending the 183 Session Progress or 200 OK response.
58-59) UE2 responds with a 180 Ringing message to the terminating application server AS2, via S-CSCF2. Subsequently, on reception of 180 Ringing, from UE2, the terminating application server AS2 cancels timers T9 and T7, and releases the resources associated with this CCNReg request, including the corresponding queue entry.
On FIG. 14, steps:
60-62) On reception of the 180 Ringing from UE2 (via S-CSCF2), the terminating application server AS2 terminates the subscription request for monitoring the registered status of User B. This is accomplished by sending a NOTIFY, with the following contents, towards originating application server AS1, via the S-CSCF1 and S-CSCF2, and by clearing the corresponding queue entries and timers.
Event: call-completion;
Subscription-State: terminated;
reason: no resource.
In addition, as stated earlier, optionally (see also General Important Remarks), following information:
queue-nature: CCNReg; (which is queue related), and
cancellation-reason: service-completed.
The originating application server AS1 on reception of this (successful) subscription cancellation, stops timer T3 and sends 200 OK (not represented) to the terminating application server AS2.
63-65) The terminating application server AS2 sends a 180 Ringing to originating application server AS1 via S-SCCF2 and S-SCCF1.

Figure 15:
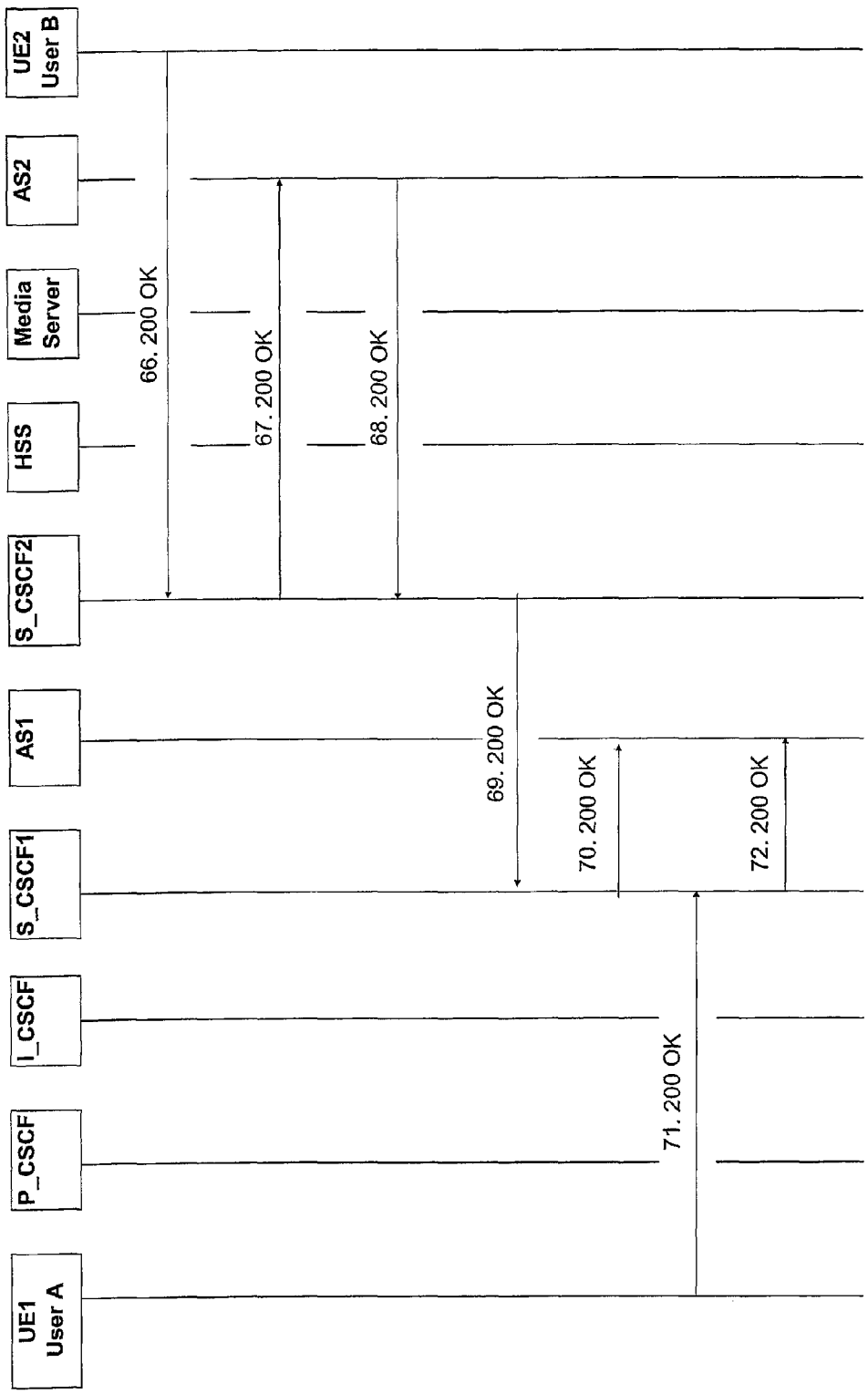
Figure 16:
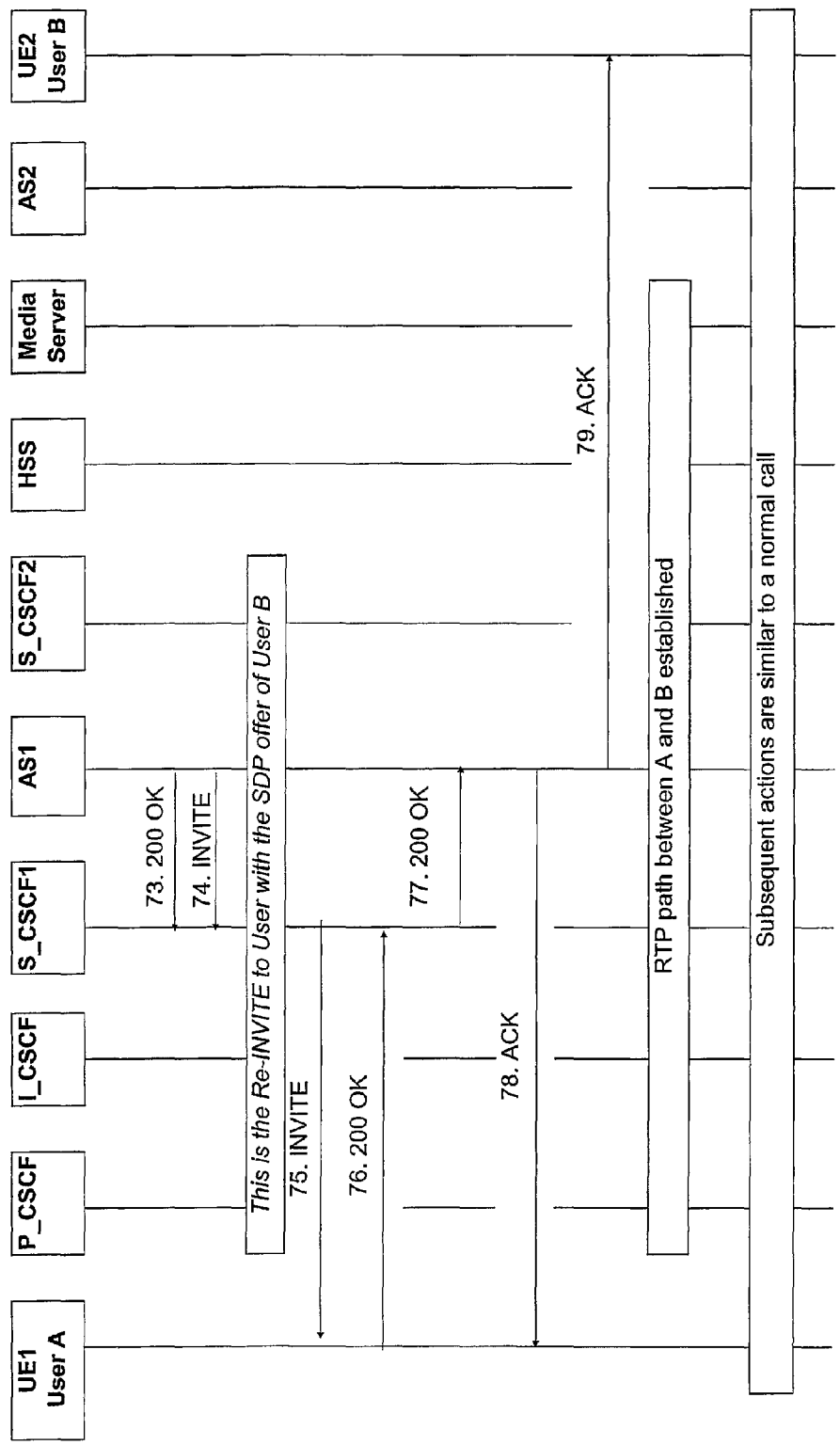

On FIG. 15, step:
66-67) Later, when User B goes off-hook and accepts the call, a 200 OK (with SDP) is sent towards the terminating application server AS2 via the S-CSCF2. This is then passed on towards the originating application server AS1.
68-70) The terminating application server AS2 forwards this 200 OK to the originating application server AS1 via S-SCCF2 and S-SCCF1.
71-73) UE1 sends a 200 OK to AS1 via S-SCCF1.
On FIG. 16, steps:
74-75) The originating application server AS1 then initiates a Re-INVITE towards User A with the SDP offer of B, via the S-CSCF1.
76-77) The user equipment UE1 responds to AS1 by a message 200 OK, via S-CSCF1.
78-79) After receiving 200 OK from User A, the application server AS1 sends a message ACK directly to UE1, and sends a message ACK (with SDP of A) directly to UE2 without involving the terminating application server AS2. A RTP path is established between UE1 and UE2. Subsequently (Step not represented) the originating application server AS1 also releases the call towards the MRF (that was established to play the CCNReg call connection announcement to User A).
With this, the call completion actions are finished, and further steps will be similar to a normal call scenario.
General Remark: In case one of the users is a PSTN/PLMN subscriber (for example the calling user is PSTN/PLMN, or if the called used is a PLMN user), the SIP-specific messages/ parameters should be mapped to the appropriate actions in TCAP. See below the section on interaction with PSTN/ PLMN for more description.
Second Approach
FIGS. 17-18 illustrates a second approach for the above described implementation. The steps 1-5 are unchanged, the steps 6-13 are replaced by steps 206-213 shown on FIGS. 17-18, and the steps 14-79 are unchanged.
206) As in step 6, the terminating I-CSCF sends a Diameter Location-Info-Request (LIR-Cx) to the HSS, to get the S_CSCF for the user equipment UE2 of user B.
207) The HSS returns the S-CSCF capabilities/name (as defined in section 6.7 of 3GPP TS 29.228) to the terminating I-CSCF, in response to the LIR, instead of responding that no S-CSCF is assigned (because the user B is not registered).
208) The I-CSCF then selects a (terminating) S-CSCF based on the returned capabilities. The selected S-CSCF is the terminating S-CSCF2. This latter obtains the user profile (using SAR/SAA) from HSS (Step not represented).
209) The terminating S-CSCF2 then activates the terminating application server AS2, by sending it the received INVITE.
210-213) Subsequently, the terminating application server AS2 sends a 404 Not Found response to the originating application server AS1, via the terminating S-CSCF2, the originating S-CSCF1, the I-CSCF, and the originating S-CSCF1 again (See Note 2 below).
The Reason-header in the 404 Not Found response contains 'user not registered' (See Note 3 below). In addition the terminating application server AS2 includes 'Call-completion' in the Allow-Events header in the 404 response (See Note 4 below, Note 5 below, and also General Important Remarks).
Subsequently, when User A confirms the CCNReg booking, this will directly reach the S-CSCF1, without having to determine one as in the first approach. All other actions are similar to the first approach described above, i.e. step 9 follows.

General Remark: Instead of a 404 Not Found response, a 480 Temporarily Unavailable response, with the same indications in Allow-Events and Reason headers (or some other appropriate error response—See Note 5 below) may be sent. In such a case, all other actions are similar to the case when the 404 Not Found response is sent.

Note 1: In this second approach, an S-CSCF and an Application Server will be always informed for a call to a not registered user (even for the cases for which CCNReg is not invoked by User A). This would be the case even for non-INVITE requests, so an enhancement would be for the I-CSCF to include a new AVP to indicate the type of request (INVITE, SUBSCRIBE, etc.) in the LIR, and then the HSS can return S-CSCF capabilities/name only for an LIR triggered for an INVITE.

Note 2: The S-CSCF can also drive the 404 Not Found response if the initial INVITE is not forwarded to the terminating AS2. In this case, the S-CSCF should fill in the contents of the 404 Not Found as described above for the terminating AS2.

Note 3: In case of a user 'not available'/'not present' (in case of 'presence' services), appropriate values should be sent in the Reason header.

Note 4: The Allow-Events: call completion, and the Reason header with the value 'user not registered'/'user not available'/etc will be filled only if User B has no CCNReg inhibition.

Note 5: In case of a different error response (and not 404/480), then the Reason header, and the Allow-Events as described for 404 response case should be filled in. In addition, the originating AS should interpret these accordingly, and initiate the actions for the CCNReg booking.

Note 6: The following statement is taken from the IETF draft mentioned above as it is also applicable for CCNReg service, for this second approach also: "The SUBSCRIBE request MAY contain an Accept header field. If no such header field is present, it has a default value of "application/call-completion". If the header field is present, then it MUST include "application/call-completion".

Calling User and Called User Belong to a (Non-IMS) SIP Based Network

The description of the CCNReg service in the previous section for IMS networks can easily be adapted for use in non-IMS SIP-based networks. The major steps are outlined below, and for the functional aspects that are similar to IMS networks, a reference is provided to the previous section.

Registration in a (Non-IMS) SIP Based Network:

A registrar server (or SIP registration server) accepts SIP REGISTER requests. It can be co-located with a proxy server or a redirect server. It provides the information about the registered SIP user agents (UA) to other SIP servers within the same administrative domain. A user agent must register with the registrar, if it intends to receive calls. Registration is not necessary for making outgoing calls.

A SIP sub-protocol for registration has been mentioned in the Request For Comments 2543. A user agent may register to a local SIP server by sending a request to a multicast address "sip.multicast.net" (224.0.1.75). Same user agent can register from different locations. Third party registration is also allowed. The requests are processed in the order they are received.

Service Description

A simplified view of how this service can be provided in any (non-IMS) SIP-based network is described below with reference to FIGS. 19-21.

The I-CSCF+S-CSCF+AS functionality will be performed by the Proxy Server, with the exception of handling the REGISTER message, which is handled by a SIP Registration Server (or registrar). The HSS of IMS could be a database in a SIP network, and the interaction between such a database and a Proxy Server (or Registrar) is not standardized (and could use DIAMETER or any other protocol).

Figure 19:
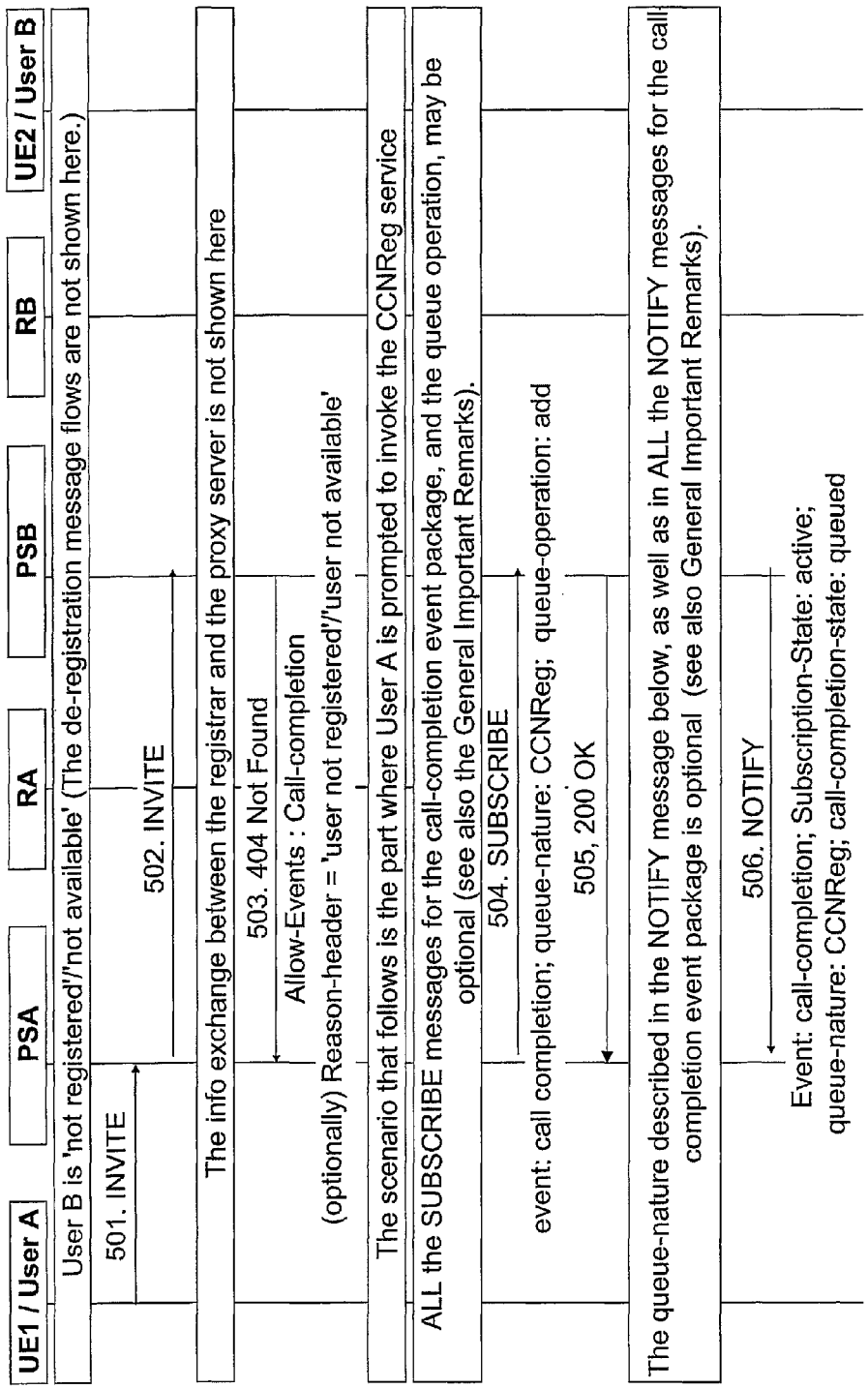
FIGS. 19 to 21 represent the call flow in an example where the caller and the callee belong to a non IMS SIP network.
Figure 20:
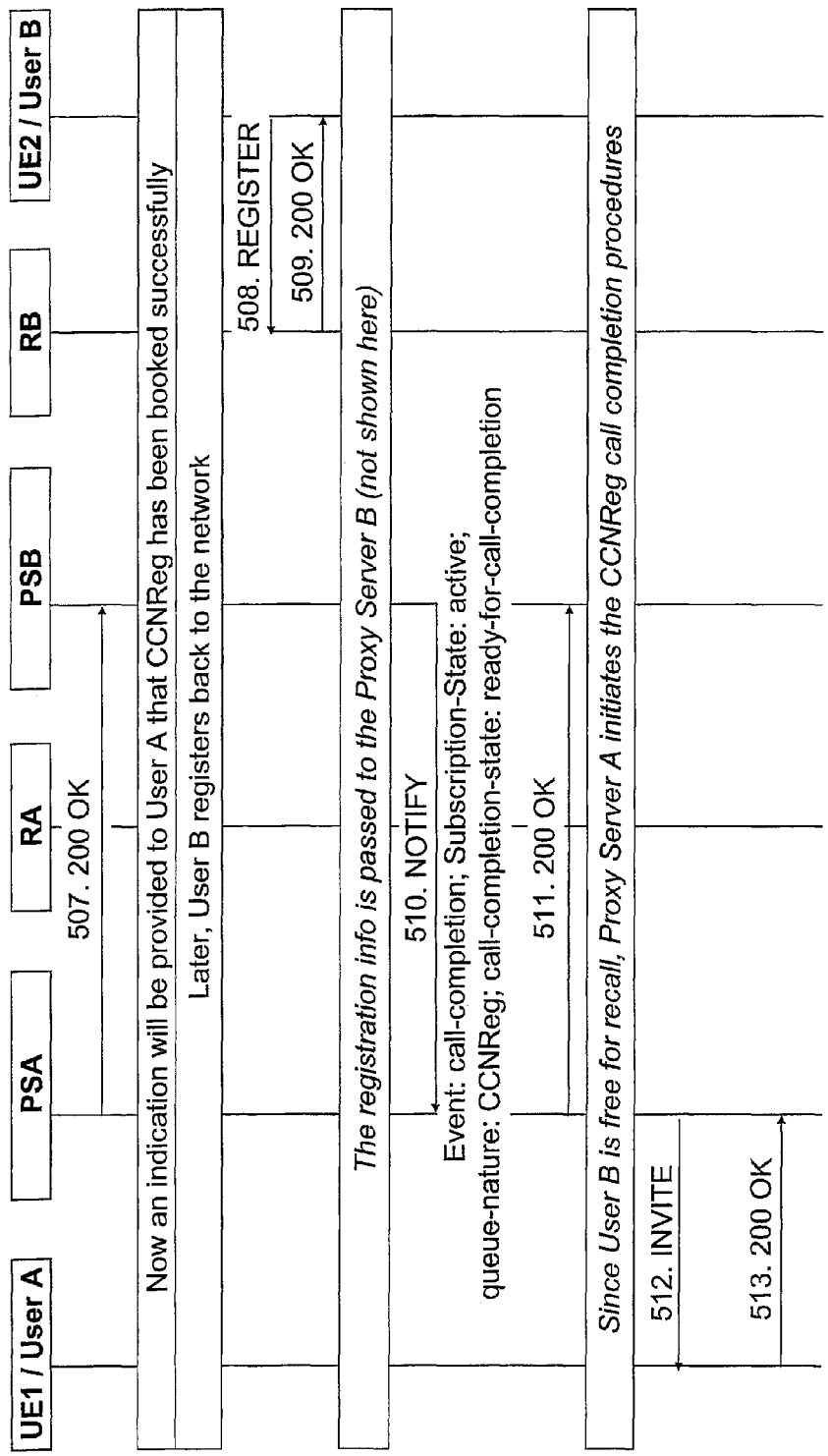
Figure 21:
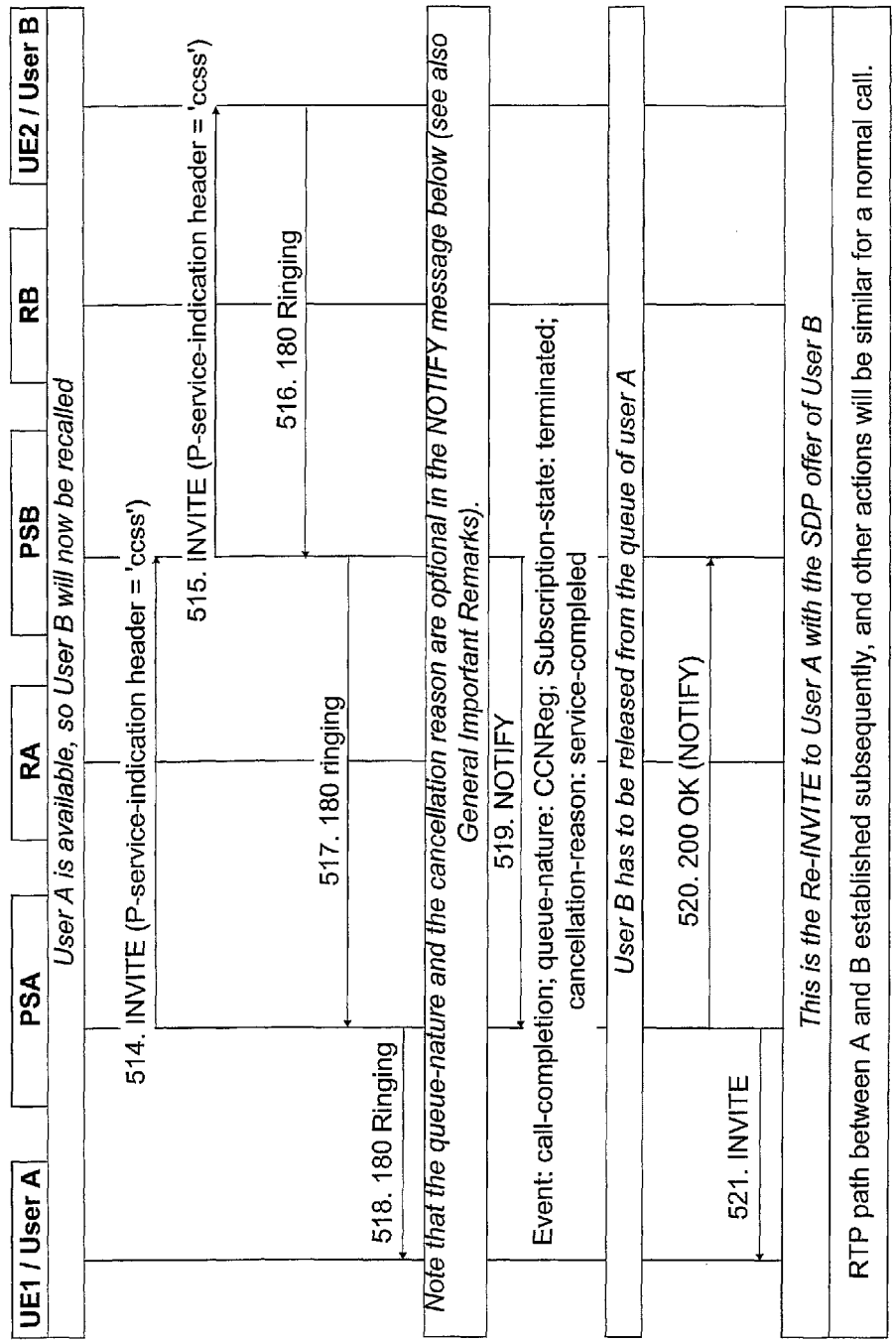

FIGS. 19 to 21 represent the call flow in an example where the caller, User A, and the callee, User B, belong to a non IMS SIP network. The user A has a registrar RA and a proxy server PSA. The user A has a registrar RB and a proxy server PSB. At the start of the call flow User B is 'not registered' or 'Not available'. The deregistration message flow is not represented.

FIG. 19, step:

501) The user equipment UE1 of user A sends an INVITE message to the user B. This message is received by the proxy server PSA of the user equipment UE1.

502) The proxy server A forwards this INVITE message to the proxy server PSB of the user B. The information exchange between the registrar RB of user B and the proxy server PSB of user B is not shown here.

503) The proxy server PSB answers to the proxy server PSA with a 404 Not Found message, with the following content:
   Allow-Events: Call-completion.
   (optionally) Reason-header='user not registered'/'user not available'.
   Note: The same remarks for Reason header and Allow-events header in case of IMS networks (described earlier) is also applicable for SIP-based networks, for example, see Notes 3-5 in the previous section describing the Second Approach, as well as General Important Remarks).

The scenario that follows is the part where User A is prompted to invoke the CCNReg service.

504) Proxy Server PSA then initiates the CCNReg procedures for monitoring User B's status. It sends a SUBSCRIBE message to the proxy server PSB, with the following content:
   event: call completion;
   In addition, as stated earlier, optionally (see also General Important Remarks):
   queue-nature: CCNReg;
   queue-operation: add.

Note: The call-completion event package can be used. A new queue type 'CCNReg', that is being used here in ALL the SUBSCRIBE messages for the call-completion event package, and the queue operation, may be optional (see also the General Important Remarks).

505) Proxy Server PSB checks if this subscription can be accepted (I.e., CCNReg booking can be allowed), etc., and then sends a 200 OK to the proxy server PSA, in the successful case.

506) Proxy Server PSB sends a NOTIFY message to the proxy server PSA, with the following content:
   Event: call-completion;
   Subscription-State: active;
   queue-nature: CCNReg;
   call-completion-state: queued.

The queue-nature described in the above NOTIFY message, as well as in ALL the NOTIFY messages for the call-completion event package is optional (see also the General Important Remarks).

507) Proxy server PSA answers to proxy server PSB with a 200 OK message. Now an indication will be provided to User A that CCNReg has been booked successfully.

Later, User B registers back to the network. Authentication aspects and how the Registrar informs the Proxy Server of the registration are not shown on the figures. A REGISTER message will be sent from User B to the Registrar PSB. Subsequently, Proxy Server PSB informs Proxy Server PSA that CCNReg call can be completed:

508) User equipment UE2 of user B sends a REGISTER message to the registrar RB.

509) Registrar RB answers to user equipment UE2 with a 200 OK message. The registration information is passed to the Proxy Server B (Message not shown here). The idle guard timer may optionally be started by Proxy Server PSB when User B registers back into the network. Only on expiry of idle guard timer (and User B is free), a NOTIFY message will be sent to Proxy Server PSA, indicating that User B is free for recall. The actions associated with idle guard timer are classical and not described here.

510) Proxy server PSB sends a NOTIFY message to proxy server A with the following content:
event: call-completion;
Subscription-State: active;
queue-nature: CCNReg;
call-completion-state: ready-for-call-completion.
In addition, as stated earlier, optionally (see also General Important Remarks), following queue-related information:
queue-nature: CCNReg.

511) Proxy server PSA answers to proxy server PSB with a 200 OK message.

512) Since User B is free for recall, Proxy Server A initiates the CCNReg call completion procedure. It sends an INVITE message to the user equipment of user A. A timer (T4) is be started by Proxy Server A within which the User A has to reply to the INVITE (Originating node recall timer).

513) User equipment of user A answers to equipment of user B with a 200 OK message.

514) User A is available, so User B is recalled by sending an INVITE message from the proxy server PSA to the proxy server PSB, with the P-service-indication header: 'ccss'.

515) This INVITE is forwarded by the proxy server PSB to the user equipment of user B.

516-518) The user equipment of user B sends a 180 Ringing message to the user equipment of user A, via the proxy server PSB and the proxy server PSA. User A is removed from the queue of user B, and proxy server PSA is also informed.

519) User B has to be released from the queue of user A. Proxy server PSB sends a NOTIFY message to proxy server A with the following content:
event: call-completion;
queue-nature: CCNReg;
subscription-state: terminated;
cancellation-reason: service-completed.
Note that the queue-nature and the cancellation reason in this NOTIFY message are optional (see also General Important Remarks).

520) Proxy server PSA answers to proxy server PSB with a 200 OK (NOTIFY) message.

521) Then proxy server PSA sends an INVITE message to the user equipment of user A. This is a Re-INVITE to User A with a SDP offer of User B. A Real-time Transport Protocol path between A and B is established subsequently, and other actions will be similar to those for a normal call.

Calling User Belongs to a SIP Based Network and Called User Belongs to a (Non-IMS) SIP Based Network: Service Description in Detail User A belongs to SIP network 1, and User B belongs to SIP network 2. When User A initiates a communication attempt (by sending an INVITE) to User B who is not registered, this INVITE will reach the Proxy Server of User B, PS2. This latter will check the registration/availability state of User B, as well as its services, e.g., CCNReg inhibition (this could be determined by accessing an external database). On determining that User B is not registered/available, the proxy server PS2 could respond with a 404/480 response. As in case of IMS networks, a proper reason header (containing 'user not registered'/'user not available' and Allow-events header (containing 'call completion') should be included in such a response. (Note: The same remarks for Reason header and Allow-events header in case of IMS networks (described earlier) is also applicable for SIP-based networks, for example, see Notes 3-5 in the previous section describing the Second Approach, as well as General Important Remarks).

When this 404/480 response reaches the Proxy Server of User A, PS1, it will then perform the actions similar to the actions of the application server AS1 for IMS networks, including: determination of whether User A has subscribed to CCNReg service, starting relevant timer(s), etc; and then triggering the user for CCNReg booking confirmation. On receiving the confirmation from User A (it is not described here as to how this happens), proxy server PS1 will perform the actions similar to the actions of the application server AS1, including: the queue updates, starting/stopping relevant timer(s), etc; and then sending the SUBSCRIBE request (with the CCNReg service-specific info as described earlier for IMS networks) as done by the application server AS1.

The SUBSCRIBE message with the CCNReg-specific information (as described earlier) will reach the proxy server PS2, which will then perform the actions corresponding to the actions of the application server AS2 for an IMS network, including: the checks (whether the SUBSCRIBE can be accepted) (See Note 1 below), starting relevant timer(s), queue actions, and subsequently sending a NOTIFY to convey the CCNREg-specific information, including the subscription state, and that the CCNReg request has been queued (the same remark regarding the service-retention indication as mentioned for IMS networks is also applicable for non-IMS SIP based networks). On receiving a NOTIFY with the CCNReg-specific info, the proxy server PS1 will perform actions similar to the actions of the application server AS1 (start/stop of relevant timer(s), information to User A that CCNReg has been successfully activated, etc.).

Subsequently, when User B registers/becomes available, the proxy server PS2 comes to know of this, and sends a NOTIFY with the indication that User B is ready for call completion, and does actions similar to the actions of the application server AS2. When this NOTIFY message reaches the proxy server PS1, it initiates the call completion actions similar to the actions of the application server AS1, with the content of the messages very similar to the IMS case (for example, the 'ccss' indication in the INVITE). The proxy server PS2 will also play the role played by the application server AS2 for the IMS network case, and the call will be successfully completed (and the Subscription to the 'call completion' event successfully terminated and its associated resources freed, etc.).

Notes:

1. The only significant action that may not be performed by PS2 is to 'SUBSCRIBE' to the Registration state of User B (as done in an IMS network). The SIP registration server (registrar) processes all REGISTER requests, and how the registration related info is being provided to the proxy servers is out of scope of this invention (mechanisms existing today shall be used).

2. The query related to determining the S-CSCF (LIR/LIA, including a new AVP for Approach 1, and triggering the HSS to always return S-CSCF info for Approach 2) are not relevant for a (non-IMS) SIP-based network. The interaction between the SIP proxy a the database, SIP registrar & SIP proxy, SIP registrar & the database are not described here.

3. In case of 'availability' related services, a Presence server/presence agent could be involved, and this might have to be contacted to find out 'presence' related information of the called user.

4. The actions performed by the Proxy Server of User A (PS1) can also be performed by User A's terminal (User Agent) itself.

5. The following statement is taken from the IETF draft mentioned above as it is also applicable for CCNReg service, for the case of (non-IMS) SIP based networks also: "The SUBSCRIBE request MAY contain an Accept header field. If no such header field is present, it has a default value of "application/call-completion". If the header field is present, then it MUST include "application/call-completion".

Interworking Between TCAP and SIP, and, ISUP and SIP

It is important for the calling user to have the call completed for a (temporarily) not-available called user, when this latter becomes available irrespective of whether the calling user is a SIP/IMS/PSTN/PLMN user, and the called user is a SIP/IMS/PLMN user. Further, in a PLMN/IMS network involving roaming, there could be frequent occurrences of (temporary) unavailability, and it would be highly desirable for the end-user for the call to be completed in such cases. Such inter-domain (between PSTN/PLMN and SIP/IMS) communications are going to be very much prevalent, given the 'evolutionary' approach to NGN/IMS by several operators.

Figure 1:
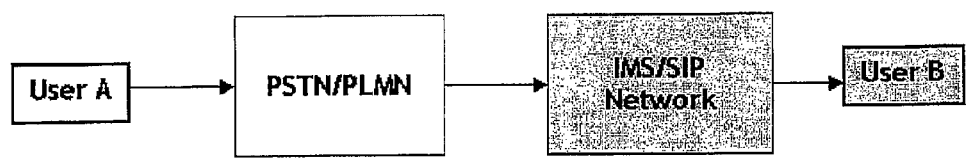
FIG. 1 (already mentioned above) shows an example in which a PSTN/PLMN User A calls an IMS/SIP User B.
Figure 2:
FIG. 2 (already mentioned above) shows an example in which a PSTN/PLMN User A calls a PLMN User B, originating and terminating networks being connected via an IMS/SIP network.

In addition, there are a number of presence-based indications, and for such users a variety of call completion services can be provided. However, if such services have to be provided to PSTN/PLMN users, for example, when a PSTN/PLMN user is the calling user and he calls an IMS/SIP user, then appropriate interfaces have to be defined between PSTN and VOIP, just as is being done for CCBS/CCNR [See ETSI TISPAN Draft TS 183 042]. Therefore another aim of the present invention is to address this interface problem, and consequently provide end-to-end call completion services, even to PSTN/PLMN users, when the communication attempt involves also a VOIP/IMS user. In particular, it addresses the inter-domain availability of this service (i.e., across PSTN/PLMN and VOIP domains). It makes it possible for the CCNReg service to be offered to:

A PSTN/PLMN user who makes a communication attempt to:
- A SIP/IMS user who is not registered currently, or if the "presence" status of the called user indicates unavailability of the called user (FIG. 1).
- A PLMN user, but when the Originating PSTN/PLMN and Terminating PLMN networks are connected only via an IMS/SIP/VOIP network in between (FIG. 2).

Figure 3:
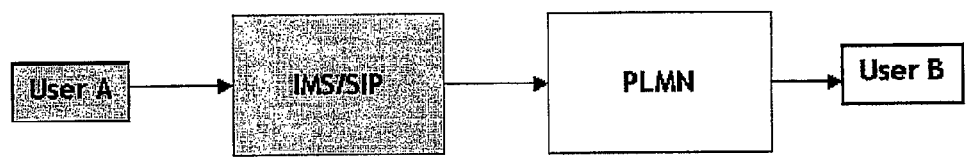
FIG. 3 (already mentioned above) shows an example in which a IMS/SIP User A calls a PLMN User B.
Figure 4:
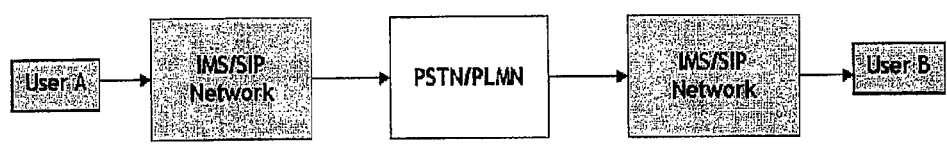
FIG. 4 (already mentioned above) shows an example in which an IMS/SIP User A calls an IMS/SIP User B, originating and terminating networks being connected via a PSTN/PLMN network.

An IMS/VOIP/SIP user, when such a user makes a communication attempt to:
- A PLMN user who is not present/not reachable/not available/ . . . (FIG. 3).
- An IMS/VOIP/SIP user, but when the Originating and Terminating IMS/SIP/VOIP networks are connected only via an PSTN/PLMN in between (FIG. 4).

To be able to achieve the above, the CCNReg service invocation (called user's status monitoring), and other queue operations are interworked between the protocols TCAP and SIP. In other words, the protocol that is used in PSTN/PLMN for this service is TCAP (Transaction Capabilities Application Part), and the protocol used in IMS/SIP (VOIP domain) is SIP.

The initial communication attempt (normal basic call) to the called user from a user in the PSTN/PLMN can be sent over Signaling System no 7 (Signaling protocol is ISUP, acronym of ISDN (Integrated Service Digital Network) User Part), and the resulting error response from SIP/IMS (for example, 404 Not Found) can also be mapped to ISUP, to be provided to the calling user, with indication of the possibility to invoke the CCNReg service.

Subsequently, the service activation, and user status monitoring updates are sent over TCAP in the PSTN/PLMN, and mapped to SIP. These mappings can be performed by a Media Gateway Controller Function (MGCF) in an IMS network, or, in general by a Softswitch.

The actions done by the AS, S-CSCF, HSS, I-CSCF for the calls between PSTN/PLMN and IMS/SIP users are the same as for the case when the calls are between two IMS/SIP users. The differences for the former are the protocol mapping, actions to be done by the MGCF, and the PSTN/PLMN.

Calls Originating from a PSTN/PLMN

In case of calls originating from a PSTN/PLMN (FIGS. 1-2), the Originating PSTN/PLMN switch should perform the actions done by the originating application server AS1 when the calling user is an IMS/SIP subscriber.

Note: The general term IMS/SIP subscriber is used, and if the called user is a SIP subscriber in a non-IMS (SIP based) network, then User B's (Called User) proxy server will perform the actions described to be done by Application Server 2 (AS2). Further, in such a (non-IMS SIP terminating network) case, the actions to be performed by the MGCF would typically be performed by a SIP to PSTN/PLMN gateway.

Further, in the sections below, the various timers associated with the CCNReg service as described in previous sections are also applicable here. The timers handled by the originating application server AS1 in previous sections will now be handled by the originating PSTN/PLMN switch, and the timers handled by the terminating application server AS2 in previous sections will be handled by the terminating application server AS2 here as well.

FIGS. 22-25 represent a sample call flow diagram for a call originating from a user A in PSTN/PLMN, to a user B who is not registered/not available, in an IMS/VOIP network.

Initial Call Setup

Figure 22:
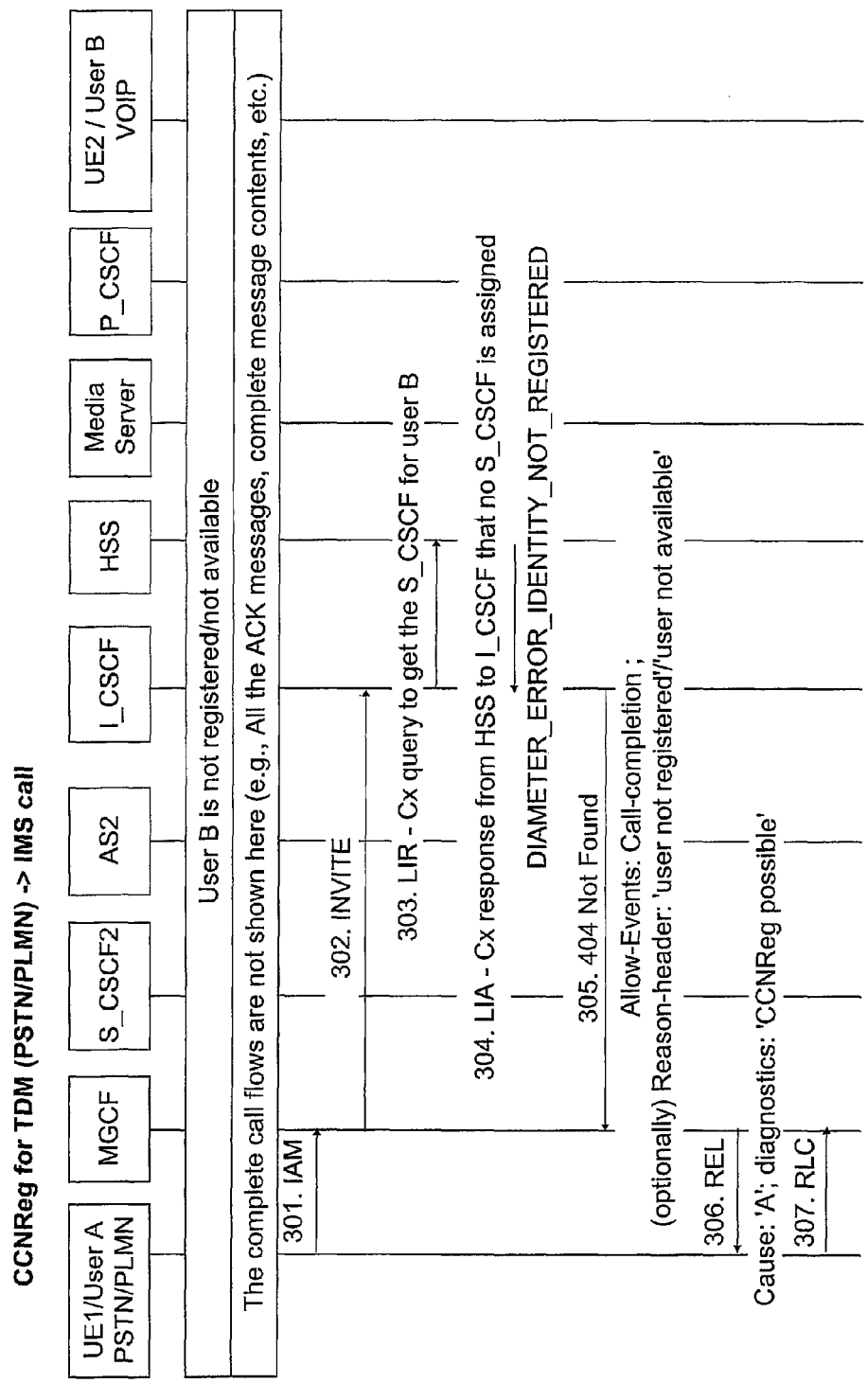

On FIG. 22, step:

301) When a PSTN/PLMN User A attempts to communicate with an IMS/VOIP User B, the Originating PSTN/PLMN switch sends an IAM message, which reaches the MGCF.

302) This IAM is mapped to an INVITE by the MGCF, and this INVITE is sent towards the IMS/VOIP network, i.e. the MGCF sends this INVITE to the terminating I-CSCF (i.e., the I-CSCF of the home network of User B).

303) The terminating I-CSCF sends a LIR to the HSS. This LIR-Cx is a query to get the S_CSCF for user B.

304) The HSS returns a DIAMETER_ERROR_IDENTITY_NOT_REGISTERED indication, in the LIA back to the terminating I-CSCF.

305) The terminating I-CSCF sends a 404 Not Found response back to the MGCF, with the indications:
Allow-Events: Call-completion; and optionally,
Reason-header='user not registered'/'user not available'.
In case of a user 'not available'/'not present' (in case of 'presence' services), appropriate values should be sent in the Reason header. Note that here if the Reason header is present with the indications mentioned above, the MGCF will perform the proper mapping to REL message as described below, otherwise, the MGCF will perform the mapping (to the REL) based on the Allow-events: call completion info (see also General Important Remarks).

306) The MGCF, on receiving such an error response, maps it to a REL message, with the appropriate Cause value: 'A' (See Note 2 below), and a diagnostics containing 'CCNReg possible' indication, and sends it to the UE1 via the Originating PSTN/PLMN switch.

307) The UE1 responds by a RLC message to the MGCF.

Note 1: The steps above are based on the first approach explained in the above description (with reference to FIGS. 6-16). The second approach can be similarly implemented, with appropriate changes as described in the above description.

Note 2: The cause value used could be different for 'not registered' and 'not available/not present' (say, Cause A, and Cause B respectively).

Starting of Service Retention Procedures (Not Represented)

The CCNReg service retention procedure will be started by the Originating PSTN/PLMN switch, when a REL with Cause A/Cause B is received if:

a) UE1 has subscribed to CCNReg service, b) and UE2 supports CCNReg by checking the CCNReg possible indication in the diagnostics of the Cause parameter in the REL message.

c) and the CCNReg queue of User A is not full (the queue size can be a network option, provisionable by the operator). Then the Originating PSTN/PLMN switch starts the CCNReg retention timer T1 during which user A can activate the CCNReg service. In case one of the above conditions (a)-(c) is not satisfied, an appropriate announcement will be provided to User A.

CCNReg Activation by User A (Not Represented)

After starting the CCNReg retention timer T1, the originating PSTN/PLMN switch will initiate an announcement to be played to User A, and, after CCNReg activation confirmation by User A (by in-band interaction procedures), before the expiry of the CCNReg retention timer T1, the originating PSTN/PLMN switch should stop this timer, and add User B to the CCNReg queue of user A.

Initiating the Status Monitoring for User B

Figure 23:
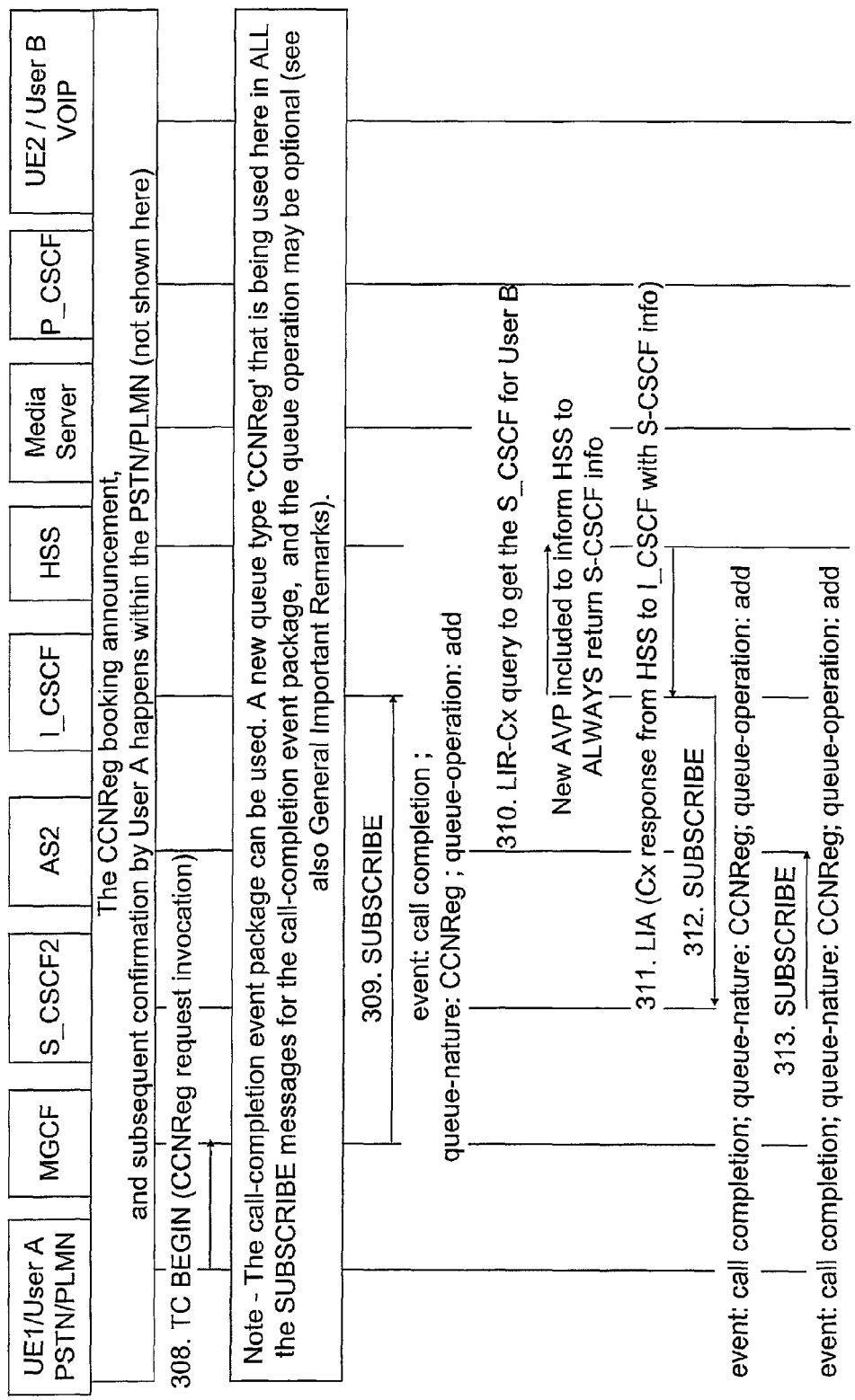

On FIG. 23, step:

308) Subsequent to the reception of CCNReg activation confirmation by User A, the Originating PSTN/PLMN switch (not represented) sends, to the terminating network of user B, a TCAP message TC-BEGIN (CCNReg request invoke) with the contents as described in the Section Protocol Mapping below. This message is received in the MGCF.

309) The MGCF maps this TC-BEGIN (CCNReg request invoke) message to a SUBSCRIBE message, as indicated in Section Protocol Mapping below. This SUBSCRIBE reaches the terminating application server AS2 of User B, with the intermediate steps and the actions in the I-CSCF, HSS and S-CSCF similar to the normal CCNReg case as described above.

310) The I-CSCF sends, to the HSS, a LIR-Cx query, to get the S_CSCF for User B, with a new AVP included to inform HSS to ALWAYS return S-CSCF info.

311) Then the HSS sends, to the I-CSCF, a LIA-Cx response, with S-CSCF info.

312-313) Then the I-CSCF sends a SUBSCRIBE to the terminating application server AS2, via the S-CSCF2, with the contents similar to what is sent in case of IMS/SIP network calls, i.e., Event: call-completion (and a non-zero value in Expires header), and optionally (see also General Important Remarks) (as stated for IMS/SIP networks), queue-specific info such as:

queue-nature: CCNReg;
queue-operation: add.

Figure 24:
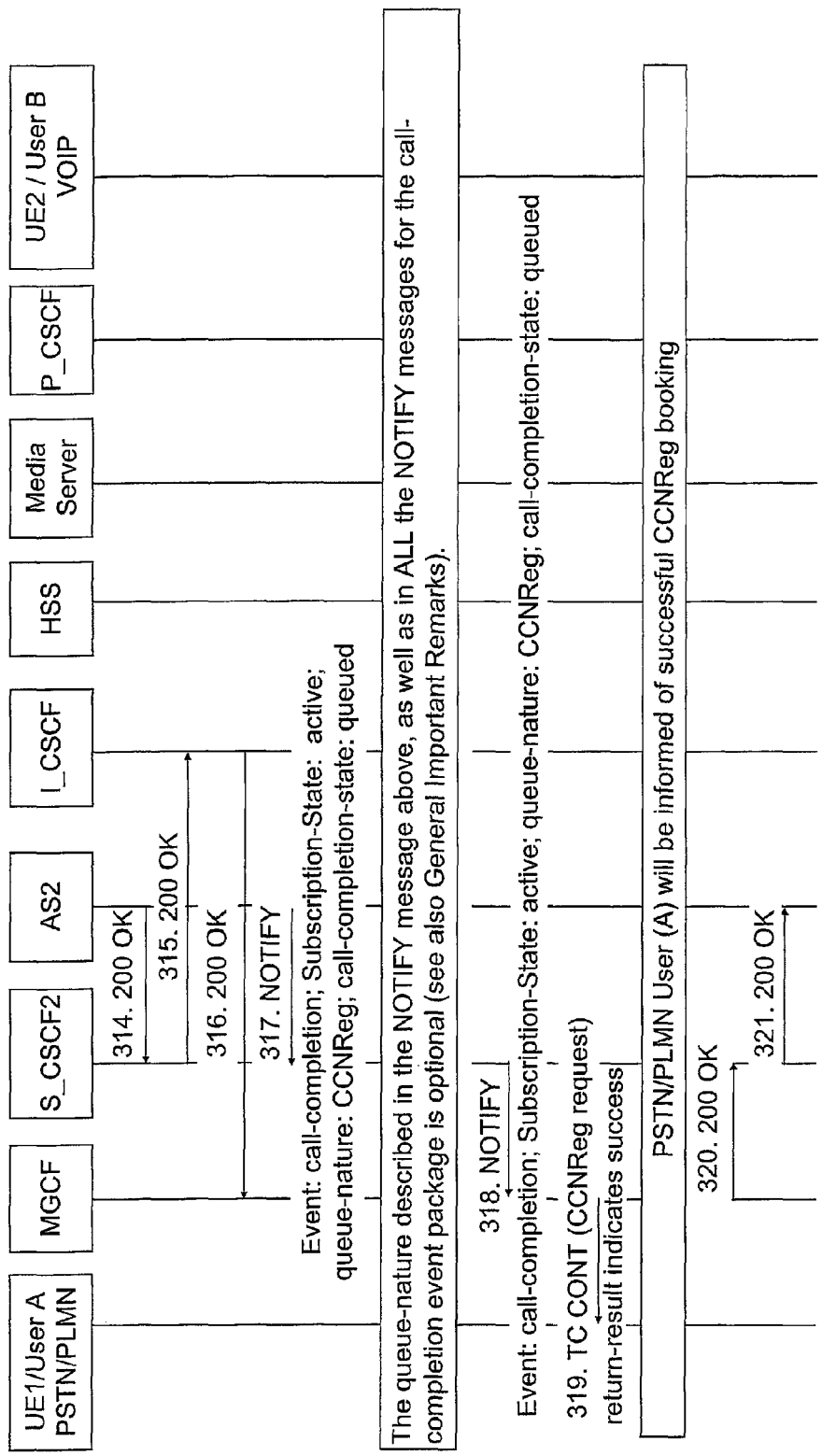
Figure 25:
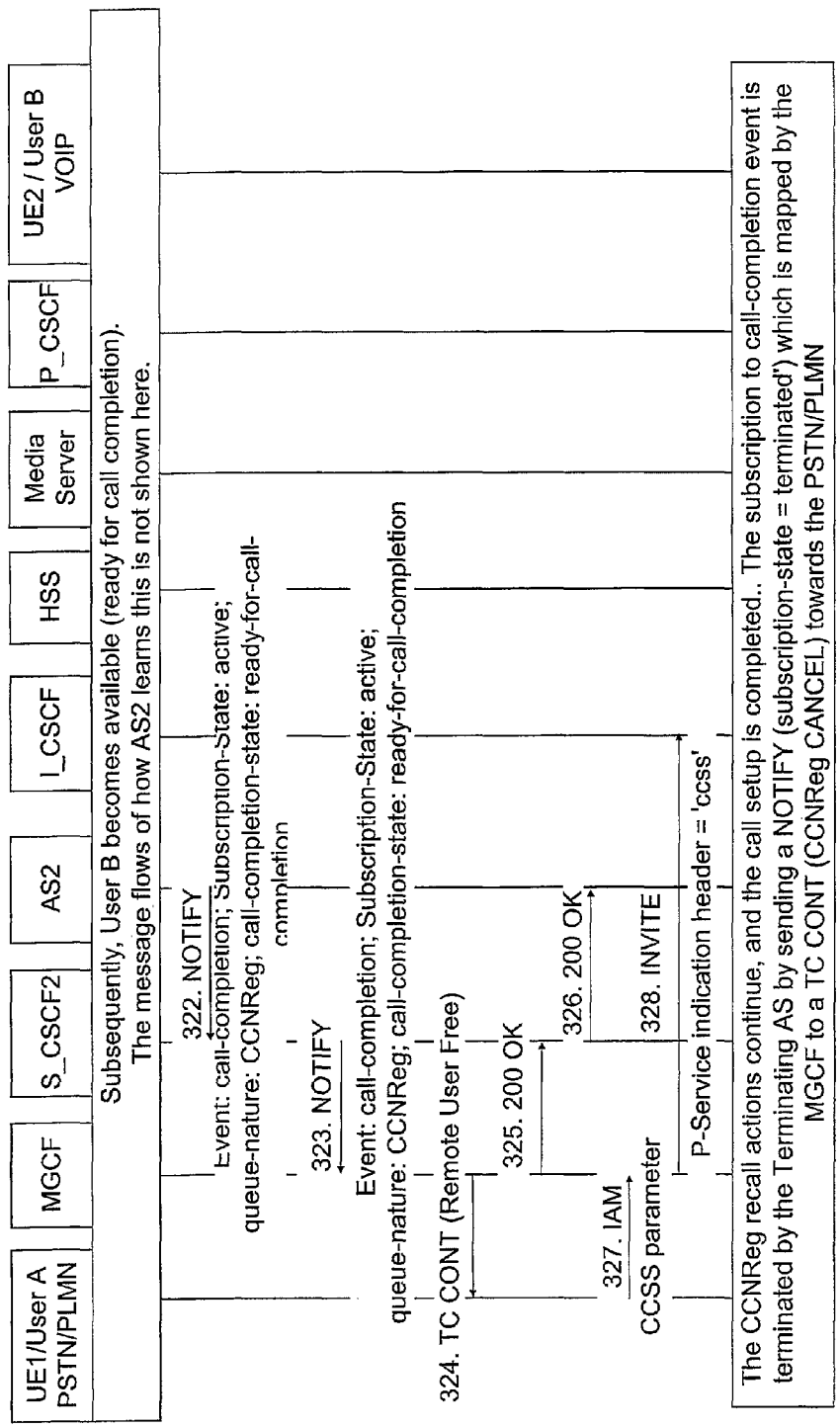
Figure 26:
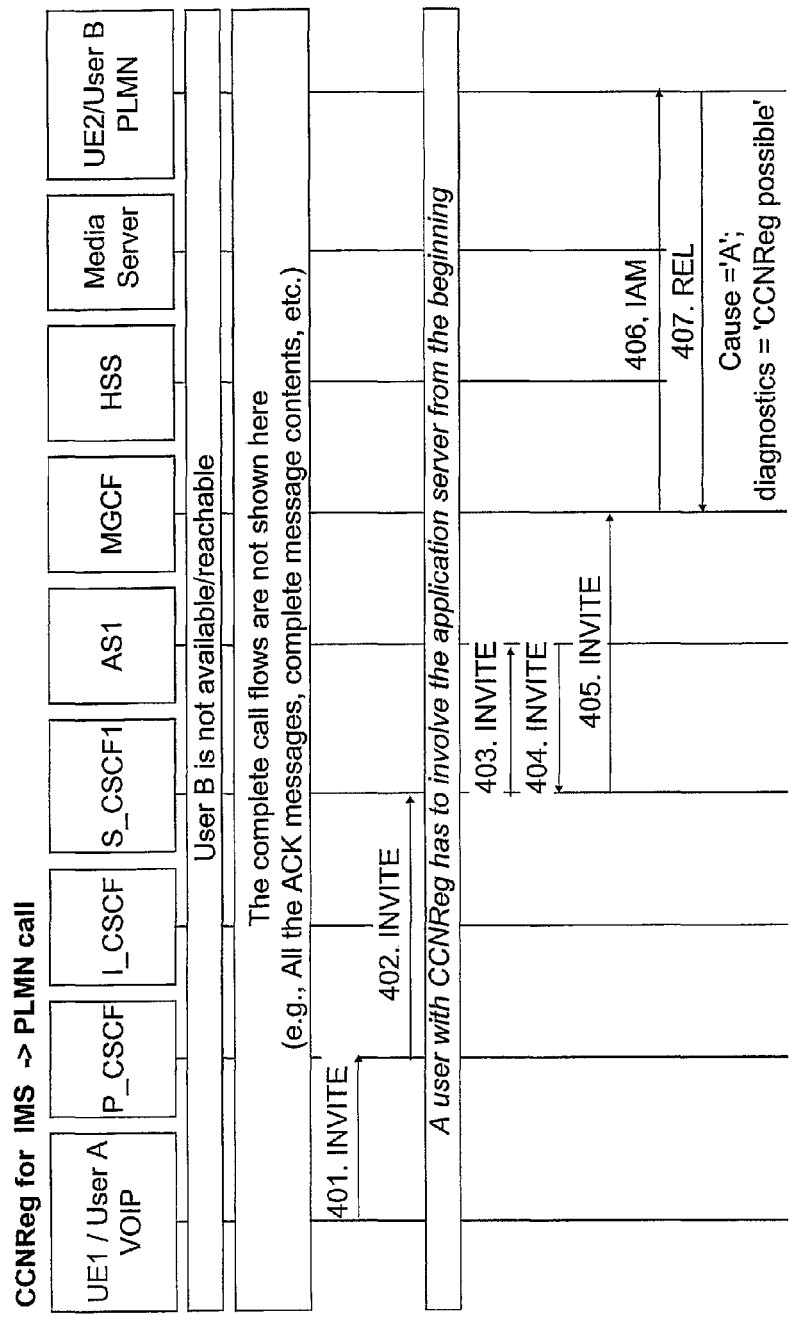

On FIG. 24, step:

314-316) In response to the SUBSCRIBE message, the terminating application server AS2 sends a 200 OK to the MGCF via the S-CSCF2 and the I-CSCF.

317-318) Then, the terminating application server AS2 sends a NOTIFY to the MGCF, via the S-CSCF2, with the following contents:

Event: call-completion;
Subscription-State: active;
call-completion-state: queued In addition, as stated earlier, optionally (see also General Important Remarks), following queue-related information (as in case of IMS/SIP network calls):

queue-nature: CCNReg;

as illustrated in the Section Protocol Mapping below.

Remark: In addition to what is mentioned above, if the service retention option as described in draft-poetzl-bliss-call-completion-00 (or later versions of it) (or as is currently supported in PSTN/PLMN for other call completion services such as PSTN/PLMN) is supported, then the NOTIFY message should also contain the service-retention indication. This indication is then mapped to the appropriate indication ("RetainSupported") in the TCAP TC CONT message described below.

319) This NOTIFY message is mapped to a TCAP TC CONT (with a successful result code) message by the MGCF. This message is sent to the originating network PSTN/PLMN, to indicate to user A that the status monitoring of User B has been initiated successfully. On reception of this message TC CONT (with a successful result code), the Originating PSTN/PLMN switch shall:

Stop timer T2.
Start CCNReg a duration timer T3 for User A.
Trigger a confirmation announcement to User A that the service has been successfully invoked.

320) The MGCF also takes care of acknowledging the SUBSCRIBE/NOTIFY messages with the appropriate 200 OK to the terminating application server AS2, via the S-CSCF2.

CCNReg Call Completion Procedures

Subsequently, when User B becomes registered/available, the terminating application server AS2 is informed (Step not represented) (See Note 1 below).

FIG. 25, step:

322-323) The terminating application server AS2 of User B sends a NOTIFY (See Note 1 below) to the MGCF via the S-CSCF2, with the contents:

Event: call-completion;
Subscription-State: active;
call-completion-state: ready-for-call-completion.

In addition, as stated earlier, optionally (see also General Important Remarks), following queue-related information (as in case of IMS/SIP network calls):

queue-nature: CCNReg;

as illustrated in the Section Protocol Mapping below.

324) This message NOTIFY is mapped to a TCAP message TC CONT (Remote User Free) by the MGCF, and then sent towards the PSTN/PLMN. On reception of a TCAP message TC CONT (Remote User Free), the Originating PSTN/PLMN switch shall initiate the CCNReg recall procedures.

325-326) The MGCF sends a 200 OK to application server AS2 via the S-CSCF2.

Note 1: The idle guard timer handling procedures are the same as for the case when both Calling a Called users are IMS/SIP users (described in earlier sections). If the idle guard timer was started by the terminating application server AS2, then the NOTIFY will be sent only on expiry of this timer (and User B is free).

CCNReg Recall to User A (Not Represented)

User A is recalled by sending an appropriate indication (Ringing) and a CCNReg (Originating Node) Recall Timer (T4) is started. When User A accepts the Recall by picking up the phone, the Originating PSTN/PLMN switch initiates an announcement to be played, indicating to user A that the CCNReg call to User B is being completed.

FIG. 25, step:

327) Subsequently (after completion of the announcement), a message IAM with the CCSS parameter is sent towards the MGCF.

328) The MGCF sends an INVITE to the I-CSCF. It contains an indication similar to P-Service Indication header with the value 'ccss'.

Call Completion to User B (Not Represented)

On reception of a 180 Ringing from User B (via S-CSCF), the terminating application server AS2 will also terminate the subscription request for monitoring the registered status of User B. This is accomplished by sending a NOTIFY with the following contents towards the MGCF and by clearing the corresponding queue entries and timers:

Event: call-completion;
Subscription-State: terminated;
reason: noresource;

In addition, as stated earlier, optionally (see also General Important Remarks), following information:

queue-nature: CCNReg; (which is queue related), and
cancellation-reason: service-completed.

The MGCF on reception of this (successful) subscription cancellation, sends 200 OK to the NOTIFY, and also maps it to a TC CONT (CCBS CANCEL) message. The 180 Ringing from User B (received from the S-CSCF) is mapped by the MGCF to a ACM/CPG message which is sent towards PSTN/PLMN. This also causes the Originating PSTN/PLMN switch to clear the corresponding queue entry, and stop timer T3.

Later, when User B goes off-hook and accepts the call, a 200 OK (with SDP) is sent towards the Terminating AS via the S-CSCF, and is passed on towards the MGCF. This 200 OK is mapped to an ANM message which is sent towards the PSTN/PLMN by the MGCF.

Subsequent actions are similar to a basic call flow between a PSTN/PLMN user and an IMS/VOIP user.

Calls Terminating in a PLMN

In case of calls terminating in a PLMN (FIGS. 2-3), the Terminating PLMN switch should perform the actions done by the Terminating application server AS2 when the Called user is an IMS/SIP subscriber. A sample call flow diagram is represented on FIGS. 26-33 for a case where the calling user A belongs to a IMS/SIP based network and the called user B belongs to a PLMN.

Further, in the sections below, the various timers associated with the CCNReg service as described in previous sections (for the case when both Calling and Called users are IMS/SIP users) are also applicable here. The timers handled by the originating application server AS1 in previous sections will now be handled by the originating application server AS1 here as well, but the timers handled by the terminating application server AS2 in previous sections will be handled by the terminating PLMN switch.

Note: The general term IMS/SIP subscriber is used, and if the calling user is a SIP subscriber in a non-IMS (SIP based) network, then User A's proxy server (or User A's terminal itself) will perform the actions described to be done by Application Server 1 (AS1). Further, in such a (non-IMS SIP originating network) case, the actions to be performed by the MGCF would typically be performed by a SIP to PLMN gateway.

Assumption: User B is not available/reachable.
Initial Call Setup
On FIG. 26, step:

401-405) When an IMS/VOIP user A makes a communication attempt to the PLMN user B, an INVITE is sent towards a MGCF, via the P-CSCF, S-CSCF1, the originating application server AS1, and the S-CSCF1 again (Note that it is possible that in some situations, the originating application server AS1 may not be involved in the INVITE handling).

406) The MGCF maps the INVITE message to an IAM message, and then sends it towards the terminating PLMN switch.

407) If User B is not available/reachable, and does not have CCNReg inhibition, the terminating PLMN switch sends a REL (with an appropriate Cause value, say Cause "B", and diagnostics info "CCNReg possible") back to the MGCF.

Figure 27:
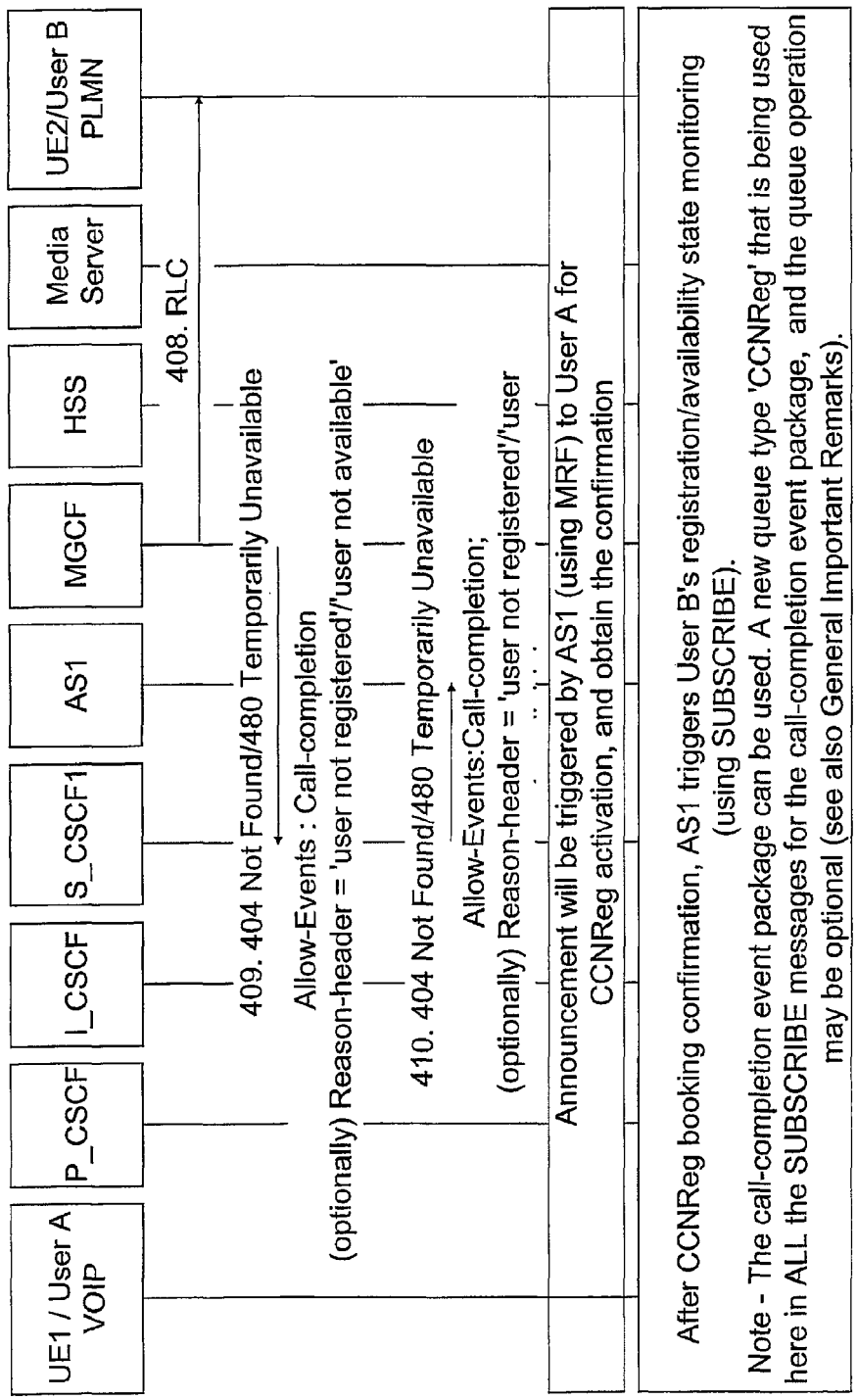

On FIG. 27, step:

408) The MGCF responds to the terminating PLMN switch by a RLC.

409) Then the MGCF maps the REL message with the contents described above to a '404 Not Found' or '480 Temporarily Unavailable' response (or some other appropriate error response) with the Reason header indicating that "user is not available", and the Allow-Events header containing "call-completion" (See also General Important Remarks for clarifications on the Reason header). This '404 Not Found' or '480 Temporarily Unavailable Response' is sent to the originating S-SCCF1 of User A.

410) The S-CSCF1 forwards it to the application server AS1 of User A after checking the indications in the 404/480 response above (even if the application server AS1 of User A was not involved in handling the initial INVITE).

After CCNReg booking confirmation, AS triggers User B's registration/availability state monitoring (using SUBSCRIBE).

Note: The call-completion event package can be used. A new queue type 'CCNReg' that is being used here in ALL the SUBSCRIBE messages for the call-completion event package, and the queue operation may be optional (see also General Important Remarks).

CCNReg Activation by User A

On reception of a 480 Temporarily Unavailable/404 Not Found (Not represented on the figure) response, the originating application server AS1, checks if CCNReg is possible for User A, by checking if:

User A has subscribed to the service (and if it is activated).
The reason header in the 404 response indicates 'user not registered'.
CCNReg inhibition is not applicable (Allow-Events header contains Call Completion).
The CCNReg queue of User A is not full.

On ensuring that the above conditions are met, the originating application server, AS1, will start a CCNReg Retention Timer (T1) before the expiry of which the CCNReg booking by User A has to take place. The originating application server, AS1, will also trigger the Media Server (in a Media Resource Function (MRF) not represented), via the S-CSCF1, for an announcement to be played by the Media Server to User A, informing him/her that CCNReg booking is possible, and prompting the user A to perform the booking. Subsequently the digits are collected by the MRF, and sent to the originating application server AS1 (via the S-CSCF1).

After CCNReg booking confirmation, the application server AS1 of user A triggers User B's registration/availability state monitoring (using SUBSCRIBE). The steps are the same as for the case when both Calling and Called users are SIP/IMS users (as described above).

Initiating the Status Monitoring for User B

Figure 28:
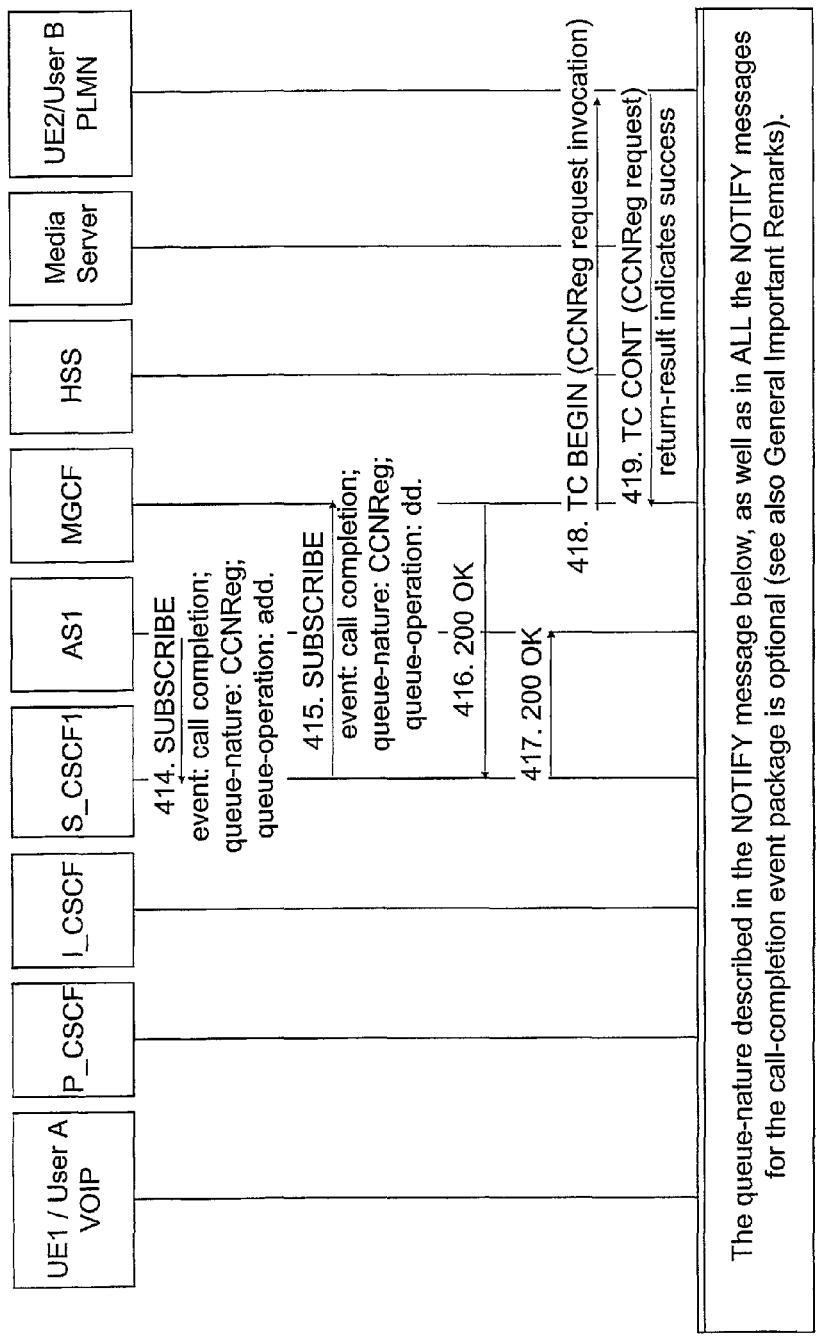

On FIG. 28, step:

414) Subsequent to the CCNReg activation by User A, the Originating application server AS1 sends a SUBSCRIBE (queue-operation 'add') to the S-CSCF1 in User B's network, with the contents event: call completion and a non-zero value in the Expires header. In addition, following queue-specific information (as in case of IMS/SIP network calls):
 queue-nature: CCNReg; and optionally, as stated earlier,
 queue-operation: add.

Note that in this call scenario, the 'type' of queue is essential to be known for the MGCF to perform the mapping to the correct TCAP operation. Of course, the exact format of this field, and the values could be different from what is stated above. See also General Important Remarks.

The following statement is taken from the IETF draft mentioned above as it is also applicable for calls from an IMS/SIP network to PLMN also: "The SUBSCRIBE request MAY contain an Accept header field. If no such header field is present, it has a default value of "application/call-completion". If the header field is present, then it MUST include "application/call-completion".

415) This SUBSCRIBE is forwarded to the MGCF by the S-CSCF1.

416-417) The MGCF sends a 200 OK to the originating application server AS1 via the S-CSCF1.

418) The MGCF maps the SUBSCRIBE to a TCAP message TC BEGIN (CCNReg request invocation) and sends this latter to User B's PLMN switch.

Figure 29:
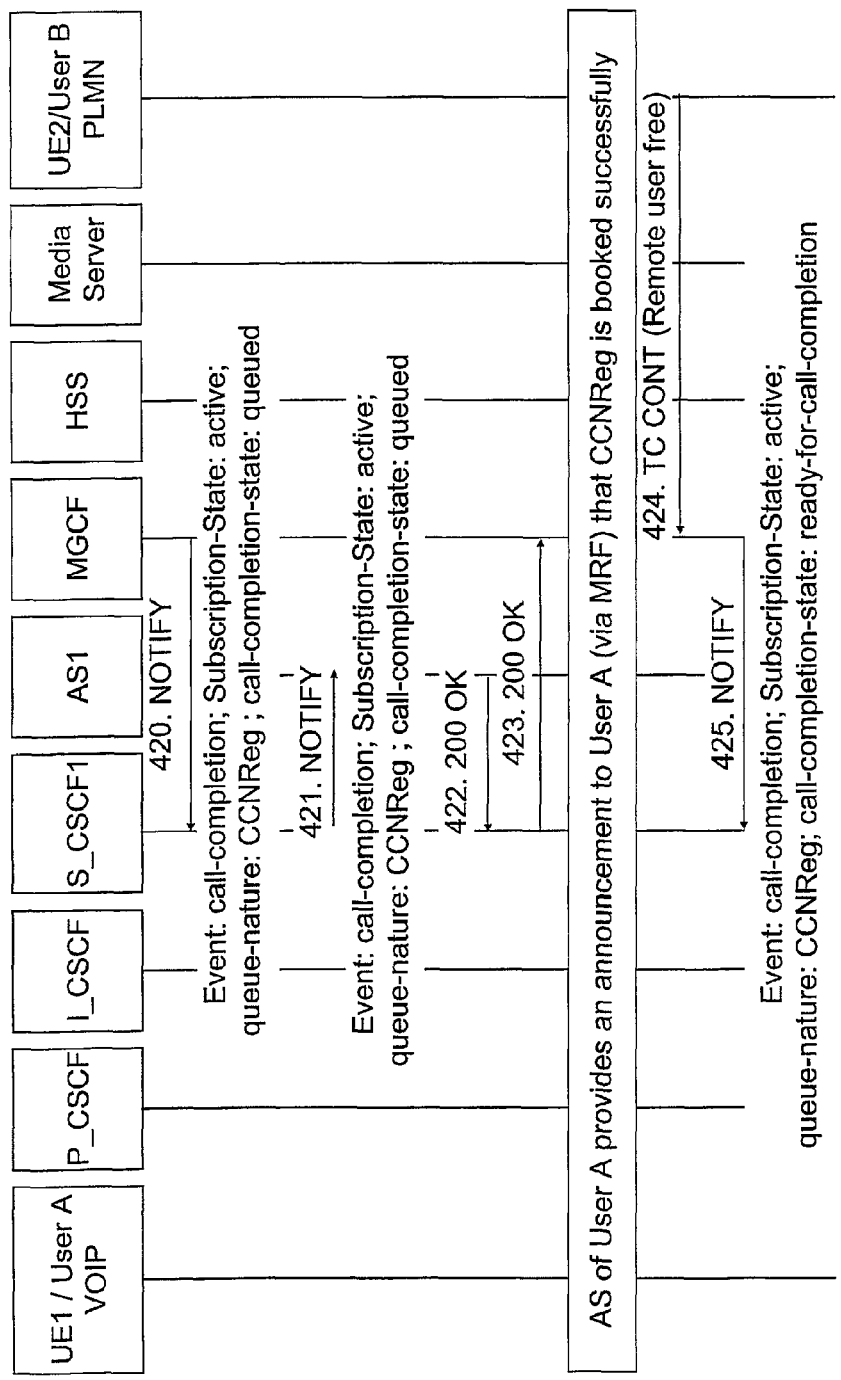

419) User B's PLMN switch, on receiving this TC BEGIN, responds to the MGCF with a TC CONT (return code indicating success), after initiating actions to monitor User B's status, and adding User A to the CCNReg queue of User B, On FIG. 29, step:

420-421) The TC CONT message is mapped by the MGCF to a NOTIFY that is sent to the originating application server AS1, via the S-CSCF1. The contents are:
 Event: call-completion;
 Subscription-State: active;
 call-completion-state: queued In addition, as stated earlier, optionally (see also General Important Remarks), following queue-related information (as in case of IMS/SIP network calls):
 queue-nature: CCNReg;

as described below in the section Protocol Mapping.

Remark: In addition to what is mentioned above, if the service retention option as described in draft-poetzl-bliss-call-completion-00 (or later versions of it) (or as is currently supported in PSTN/PLMN for other call completion services such as PSTN/PLMN) is supported, then the "RetainSupported" indication in the TCAP TC CONT message is coded "TRUE", then it should be mapped to the service-retention indication in the NOTIFY message (see the section Protocol Mapping).

422-423) The originating application server AS1 also takes care of acknowledging the SUBSCRIBE/NOTIFY messages with the appropriate 200 OK sent to the MGCF via the S-CSCF1.

The application server AS1 of User A provides an announcement to User A (via MRF) that CCNReg is booked successfully (Steps not represented).

CCNReg Call Completion Procedures

424) When User B becomes available for recall, the terminating PLMN switch sends a TC CONT (Remote User Free) towards the MGCF.

Figure 30:
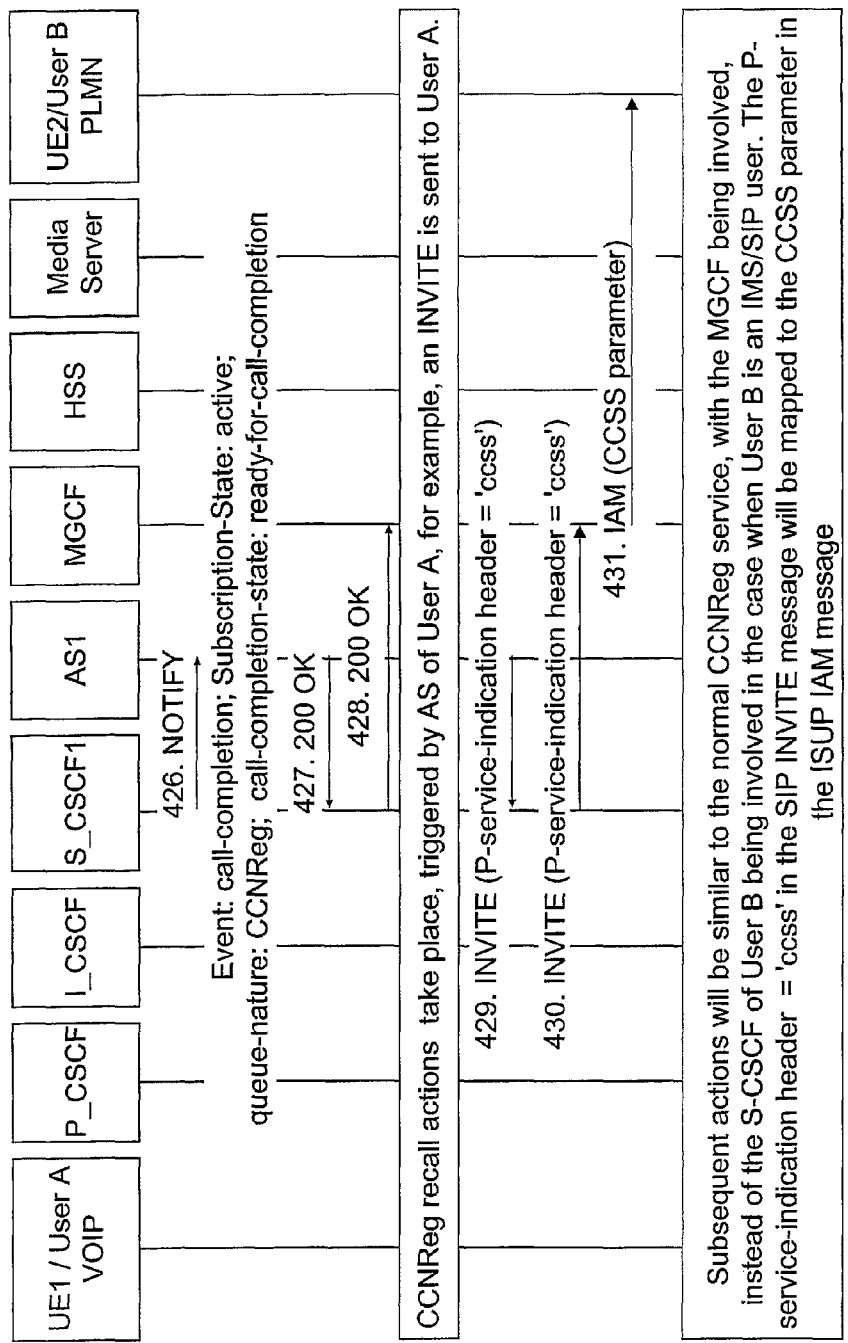

On FIG. 30, step:

425-426) The MGCF maps it to a NOTIFY message and sends it to the application server AS1 via the S-CSCF1, with the contents:
 Event: call-completion;
 Subscription-State: active;
 call-completion-state: ready-for-call-completion In addition, as stated earlier, optionally (see also General Important Remarks), following queue-related information (as in case of IMS/SIP network calls):
 queue-nature: CCNReg;

427-428) The originating application server AS1 sends a 200 OK to the MGCF via the S-CSCF1.

429) The originating application server AS1, on receiving this NOTIFY, initiates the CCNReg recall actions towards User A and User B. For example, the originating application server AS1 sends an INVITE to S-CSCF1.

The subsequent steps are very similar to what is above described for the case when User B is also an IMS/SIP user, with the only difference being that the MGCF has to map the INVITE message, with the P-Service indication header with the value 'ccss', to an IAM message with the CCSS parameter. The subscription is also terminated by the PLMN by sending a TC CONT (CCBS CANCEL) towards the MGCF. The MGCF maps it to the NOTIFY with the subscription-state as 'terminated' towards the Originating AS.

The method according to the invention enables the CCNreg service to be provided to cases ALSO where:
 (a) the Calling and Called IMS/SIP networks are interconnected by PSTN/PLMN,
 (b) the Calling PSTN/PLMN network is interconnected with the Called PLMN network by IMS/SIP networks.

In other words, this service can be provided to ANY IMS/SIP/PSTN/PLMN Calling User when the called user is an IMS/SIP/PLMN user.

The contents such as "queue-nature" and "queue-operation" of the SUBSCRIBE message are not mandatory to be defined as described above. What is important is that there should be sufficient information conveyed to the recipient of the SUBSCRIBE message (the entity handling the SUBSCRIBE) that:

1. This SUBSCRIBE is related to the call completion service;
2. A CCNReg activation/deactivation is being requested. Perhaps, it is sufficient to inform that a call completion activation/deactivation (CCBS/CCNR/CCNReg/ . . . ) is being requested, if we are going to have one queue for all call-completion services.
3. Optionally, which type of call completion is being referred, (especially needed in case of separate queues being maintained for different call completion services), See also General Important Remarks for explanation of the cases where this would be required (and NOT optional).

The contents such as "queue-nature" and "queue-operation" of the NOTIFY message are not mandatory to be defined as described as above. What is important is that there should be sufficient information conveyed to the recipient of the NOTIFY message (the entity handling the NOTIFY, i.e., the entity that originated the SUBSCRIBE) that:

1. This NOTIFY is related to the call completion service;
2. The state of the call completion request—whether the request has been queued (and is pending availability of the called user), or whether the request can be fulfilled (i.e., the user to which a call completion request has been initiated is now available for call completion).
3. Optionally, which type of call completion is being referred, (especially needed in case of separate queues being maintained for different call completion services), and there is really a need to inform the calling network of this. In the absence of this info being sent in the NOTIFY message, the calling network can still deduce this info using other means (for example, by analysing for which event subscription this NOTIFY has arrived, and what was the call completion service that caused the original SUBSCRIBE message to be sent).

Remark 1: In some cases, it may be necessary to "suspend" the subscription due to non-availability of the calling user (served user), and then "resume" it again subsequently when the calling user becomes available again. For this specific case, indications may be required to be transmitted to the receiver of the SUBSCRIBE.

Remark 2: It is possible that an approach as outlined in draft-poetzl-bliss-call-completion-00 (or later versions of it) is followed. In that case, a queue operation specifying "suspend/resume" may not be required to be sent in the SUBSCRIBE, instead the calling user's AS will simply terminate the subscription, and then resume later by subscribing again to the call-completion event package. If this approach is followed, then the mapping between TCAP & SIP messages for the applicable TCAP operation should be adapted accordingly.

Protocol Mapping

The mappings described below are typically done at the MGCF (or, in general, a Softswitch). The MGCF should also take care of the normal actions associated with the SUBSCRIBE-NOTIFY mechanisms, including:
  Refreshing the SUBSCRIBE requests before the expiry of the subscription timer, and
  Sending appropriate 200 OK to the SUBSCRIBE/NOTIFY messages.

NOTE 1: In ALL the SUBSCRIBE/NOTIFY messages below, the Event package is "call-completion", and the queue-nature is "CCNReg" (if "queue"-specific info is being transported, see also the General Important Remarks above). Note that the "queue" related info mapping (in addition to the "queue nature") is provided as an option, if IETF draft-poetzl-sipping-call-completion-02 (or later versions of it) is used as basis for call completion services. If IETF draft-poetzl-bliss-call-completion-00 (or later versions of it) is used as basis, then "queue" related info mapping (in addition to "queue nature") is not required.

Note 2: The PSTN/PLMN node that server User A or User B should implement/support the TCAP operations listed below (similar to CCBS/CCNR services), and should also support the changes mentioned for ISUP, in addition to the feature handling operations (e.g., queue management, timer handling, etc., similar to the actions performed at the Application Server).

TCAP<->SIP Mapping for Messages Sent in the Forward Direction

For calls from PSTN/PLMN to IMS/SIP users, it should be read from left to right (TCAP->SIP mapping for forward direction messages). For calls from IMS/SIP to PLMN users, the table below should be read from right to left (SIP->TCAP mapping for forward direction messages).

| TCAP Message | SIP Message |
| --- | --- |
| TC BEGIN CCNReg REQUEST (invocation) | SUBSCRIBE with non-zero value in Expires header (See Note 1 below) Optionally, in addition: queue-operation = "add" (see General Important Remarks) |
| Called Party Number | SIP URL in To header |
| RetainSupported | "service-retention" parameter |
| User Service Information | Not mapped |
| Calling Party Number | From header/P-asserted ID header |
| User Service Information Prime | Not mapped |
| Access Transport | Not mapped |
| TC CONT CCBS SUSPEND | SUBSCRIBE with Expires header = 0 (OR) SUBSCRIBE (queue-operation = "suspend") (See Note 3) |
| TC CONT CCBS RESUME | SUBSCRIBE with non-zero value in Expires header (see Note 1 below) (OR) SUBSCRIBE (queue-operation = "resume") (See Note 3) |
| TC CONT CCBS CANCEL RetainSupported CancelCause | SUBSCRIBE ("Expires" header = 0) Service retention parameter reason, and optionally Cancellation-reason parameter (See Note 4) |
| TC END CCNReg REQUEST | SUBSCRIBE ("Expires" header = 0) |

Notes:
1. The SUBSCRIBE with event "call completion" (see NOTE 1 above the mapping table) and with a non-zero Expires header should be sufficient to initiate a new subscription (to monitor status of User B), provided an entry corresponding to User A does not already exist in User B's queue. If an entry exists already in User B's queue, it will result in the "resume" operation, i.e., resumption of the subscription.
2. The Application Server 2 (AS2) should be able to distinguish between a subscription "suspend", and a subscription "cancel"/"termination" based on the contents of the received SUBSCRIBE, and the call state.
3. As mentioned earlier, If IETF draft-poetzl-bliss-call-completion-00 (or later versions of it) is used as basis, then "queue" related info mapping is not required. SUBSCRIBE with the queue-operation = "suspend" or "resume" will be mapped if IETF draft-poetzl-sipping-call-completion-02 (or later versions of it) is used as basis for call completion services.
4. As mentioned earlier, Cancellation-reason will be required to be mapped if IETF draft-poetzl-sipping-call-completion-02 (or later versions of it) is used as basis for call completion services.
Further, some other fields defined in IETF draft-poetzl-bliss-call-completion-00 could be replaced by differently named similar fields (conveying the same meaning) specified in IETF draft-poetzl-sipping-call-completion-02, for example, "call-completion-state" could be replaced by "queue-state".
5. Note that as for CCNR, the only new TCAP operation is CCNReg REQUEST, the others are the same as for CCBS. So, in fact, if queue-specific info is not required to be mapped, several entries in the mapping table shown above will be the same as for CCBS/CCNR.

SIP<->TCAP Mapping for Messages Sent in the Backward Direction

For calls from PSTN/PLMN to IMS/SIP users, the table below should be read from left to right (SIP->TCAP mapping for backward direction messages). For calls from IMS/SIP to PLMN users, it should be read from right to left (TCAP->SIP mapping for backward direction messages).

| SIP Message | TCAP Message |
| --- | --- |
| NOTIFY (call-completion-state = queued) | TC CONT CCNReg REQUEST |
| Or NOTIFY (queue-state = "request-queued") | Return result |
| NOTIFY | Error |
| "service-retention" parameter | RetainSupported |
| "denial-reason" parameter value set to "short-term-denial" | ShortTermDenial |
| (OR) 480 Temporarily Unavailable (see Note 1 below) | |

-continued

| SIP Message | TCAP Message |
|---|---|
| "denial-reason" parameter value set to "long-term-denial" (OR) | LongTermDenial |
| 403 Forbidden (see Note 1 below) | |
| NOTIFY (call-completion-state = ready for call completion) (OR) NOTIFY (queue-state = "user available for recall") (see Note 2 below) | TC CONT REMOTE USER FREE |
| NOTIFY ("expires" header = 0, subscription-state = 'terminated') | TC CONT CCBS CANCEL |
| Service retention parameter | RetainSupported |
| Cancellation-reason parameter (optional) (see Note 2 below) | CancelCause |

Notes:
1. As mentioned earlier, if IETF draft-poetzl-bliss-call-completion-00 (or later versions of it) is used as basis, then long term denial and short term denial in TCAP would be mapped to 403 Forbidden response and 480 Temporarily Unavailable respectively. Otherwise, if IETF draft-poetzl-sipping-call-completion-02 (or later versions of it) is used, then the long term denial and short term denial in TCAP will be mapped to a NOTIFY with the appropriate contents in the denial reason parameter. Note that in case of other Error responses in the TCAP TC CONT message, it will be mapped to the appropriate 4xx/5xx/6xx response in SIP.
2. As mentioned earlier, If IETF draft-poetzl-bliss-call-completion-00 (or later versions of it) is used as basis, then "queue" related info mapping is not required. So in this case, the first NOTIFY with the SUBSCRIBE with the call-completion-state will be mapped to TC CONT REMOTE USER FREE in TCAP.
3. As mentioned earlier, Cancellation-reason will be required to be mapped if IETF draft-poetzl-sipping-call-completion-02 (or later versions of it) is used as basis for call completion services.
4. Note that as for CCNR, the only new TCAP operation for CCNReg is CCNReg REQUEST, the others are the same as for CCBS. So, in fact, if queue-specific info is not required to be mapped, several entries in the mapping table shown above will be the same as for CCBS/CCNR.

SIP<->ISUP Mapping for Messages Sent in the Backward Direction

For calls from PSTN/PLMN to IMS/SIP users, the table below should be read from left to right (SIP->ISUP mapping for backward direction messages). For calls from IMS/SIP to PLMN users, it should be read from right to left (ISUP->SIP mapping for backward direction messages).

| SIP Message | ISUP Message |
|---|---|
| 404 Not Found/480 Temporarily Unavailable (See Note 1) | REL |
| Reason: SIP; cause = A; text = "user not registered" (see Note 4) | Cause A (see Note 2) |
| Reason: SIP; cause = B; text = "user not available" (see Note 4) | Cause B (see Note 2) |
| Allow-Events: Call-completion | Diagnostics: CCNReg indicator value = CCNReg possible (00000001) |
| Allow-Events is not present | Diagnostics: CCNReg indicator value = CCNReg not possible (00000010) (see Note 3) |

Notes:
1. Depending on the service ('not registered'/'not available'/. . .), and the cause value, the appropriate SIP error response will be sent.
2. The value of A and B can be a new value that is either defined in ITU-T, or a national cause value that is defined by the operator/regulatory authorities. Instead of mapping "user not registered" to Cause A, and "user not available" to Cause B, another option is to map both these cases to a single cause value indicating "user not available". For the mapping between SIP 404 Not Found/480 Temporarily unavailable, pl. see ITU-T Q.1912.5 - Interworking between Session Initiation Protocol (SIP) and Bearer Independent Call Control protocol or ISDN User Part], Table 21 (Section 6.11.2).
3. Another option to implement this is: if Diagnostics is not included along with Cause A/B, then it can be assumed that CCNReg is not possible. In other words, only the presence 'call completion in the Allow-Events header may need to be mapped to ISUP.
4. If the Reason header is not present (see also General Important Remarks), then the mapping will be based on "Allow-events: call completion" only.

ISUP<->SIP Mapping for Messages Sent in the Forward Direction

For calls from PSTN/PLMN to IMS/SIP users, the table below should be read from left to right (ISUP->SIP mapping for forward direction messages). For calls from IMS/SIP to PLMN users, it should be read from right to left (SIP->ISUP mapping for forward direction messages).

| ISUP Message | SIP Message |
|---|---|
| IAM | INVITE |
| CCSS | P-service-indication = "ccss" |

Note:
If it is decided to implement a different value in the P-service-indication header in SIP for CCNReg service, then it has to be mapped to a new parameter/parameter value (instead of 'ccss').

(Protocol) Standardization Aspects

In addition, if the following aspects are standardized (on top of what is already available today), then the proposed solution could be implemented/provided over IMS/NGN networks across operators/vendors without any interoperability issues.
  Mapping between TCAP and SIP, and ISUP and SIP as illustrated in the previous part (Section 4: Protocol Mapping)
  Updates listed below to TCAP and ISUP:
  TCAP
  The basic principle of working is very similar to the CCBS/CCNR services as defined in ITU-T Q.733.3/Q.733.5, including normal operation, timers, exceptional cases, etc. The following new operations need to be supported:
1. CCNReg REQUEST (TC BEGIN)
  This needs to be sent from the originating local exchange. The actions are exactly the same as for CCNR/CCBS REQUEST.
2. CCNReg REQUEST (TC CONT)
  This needs to be sent to the originating local exchange. The response can either provide a return result or an error (similar to CCBS/CCNR).
3. CCNReg REQUEST (TC END)
  This can be sent from the originating local exchange to terminate the CCNReg procedures.
  ISUP
  The updates required are in the Cause parameter in REL message, in addition to what is defined in ITU-T Q.850.
  1. Cause Value
  Two new cause values, say, A and B need to be supported for indicating the cases "called user not registered" and "called user not available".
  2. Diagnostics
  The diagnostics sub-field should be present for Causes A and B, and should be coded as follows:

| Bits H-A: | |
|---|---|
| 00000000 | Not used (Spare) |
| 00000001 | CCNReg possible |
| 00000010 | CCNReg not possible |
| 00000011 | Spare (not used) |
| to | |
| 01111111 | |
| 10000000 | Spare for national use |
| to | |
| 11111110 | |
| 11111111 | Reserved for extension |

Notes:
If it is decided to implement a different value in the P-service-indication header in SIP for CCNReg service (instead of using "ccss"), then it has to be mapped to a new parameter/parameter value.

If the diagnostics is not included along with Cause A/B, then it can be assumed that CCNReg is not possible (if this is the case, then value 00000010 ('CCNReg not possible') for the diagnostics sub-field may not be needed at all). With these protocol changes, the proposed service can be extended to a pure PLMN domain (PLMN->PLMN call), as well as for calls from PSTN->PLMN, for the cases where the called user is not reachable, switched off, etc.

Procedural Changes with Respect to a Classical IMS Network

The changes described in the sections below are the typical impacts in an IMS network. Of course, specific implementations may have variations with respect to the impacts in the network elements—for e.g., some actions specified to be performed by an Application Server could be handled in an S-CSCF. With the background provided in earlier sections regarding non-IMS SIP-based networks, the impact description in the following sections can be extended to such non-IMS SIP-based networks.

Actions at the HSS (of User B)
  Support of the new AVP in the LIR, if the first approach is adopted. On receiving this (new) AVP in LIR from the I-CSCF, the S-CSCF capabilities should be returned in the LIA, instead of returning DIAMETER_ERROR_IDENTITY_NOT_REGISTERED.
  Providing S-CSCF capabilities always in the LIA in response to the LIR from I-CSCF, instead of returning DIAMETER_ERROR_IDENTITY_NOT_REGISTERED in the LIA, if the second approach is adopted.
  Additionally, if the second approach is chosen, and a new AVP is defined to indicate the type of request (INVITE, SUBSCRIBE, etc.), the HSS can examine this AVP, and return the S-CSCF capabilities only for the LIR triggered due to an INVITE.

Actions at the Incoming I-CSCF:
  If the first approach is adopted, then the incoming I-CSCF (I-CSCF corresponding to User B's network), I-CSCF2, has to do the following:
    When a LIA is received from the HSS with the error DIAMETER_ERROR_IDENTITY_NOT_REGISTERED, include the following in the 404 Not Found response to be sent back to the originating S-CSCF:
    Reason header: "user not registered";
    Allow-events: call completion.
    Note: The Reason header in the 404 response is not mandatory for a pure IMS/SIP network call (i.e., calling and called users belong to IMS/SIP networks, without involvement of any PSTN/PLMN in between), but may be essential where interworking with PSTN/PLMN.
    Check a received SUBSCRIBE request to see if it is for the CCNReg service. This can be done by examining the contents of the SUBSCRIBE message to see if it contains:
    Event: call completion;
  In addition, as explained in earlier sections, optionally (see also General Important Remarks):
    Queue-operation: add;
    Queue-nature: CCNReg.
    If the SUBSCRIBE, as explained above, was received for a CCNReg service by the terminating I-CSCF, I-CSCF2, this latter has to send the LIR with a new AVP.

Actions at the Originating Application Server AS1:
CCNReg Allowance
  The originating application server AS1 checks if CCNReg is allowed for the calling user (User A) by checking if User A has subscribed to the CCNReg service (i.e., the service is active for User A).

Starting of Service Retention Procedure
  The CCNReg service retention procedure will be started when a 404 Not Found (See Note 2 below) response is received if:
    a) User A has subscribed to CCNReg service, and
    b) User B supports CCNReg by checking the Allow-Events: call completion (and Reason header=user not registered, if applicable) in the 404 Not Found response (See Note below, user not available or other reasons for presence services), and
    c) If the CCNReg queue of User A is not full (the queue size can be a network option, provisionable by the operator).
  The originating AS then starts the CCNReg retention timer T1 during which user A can activate the CCNReg service.
  Note 1: In case one of the above conditions (a)-(c) is not satisfied, an appropriate announcement will be provided to User A (played by the MRF).
  Note 2: Instead of the 404 Not Found response, a 480 Temporarily Unavailable response may be sent if Approach 2 is chosen, or in some implementations. The most important aspects are the Allow-events indication, and optionally, the Reason header (see General Important Remarks).

CCNReg Activation by User A
  After starting the CCNReg retention timer T1, the originating AS1 will initiate an announcement to be played to User A, using the S-CSCF1 and a Media Server (within MRF), indicating that CCNReg can be activated. Subsequently, the Media Server, after activation confirmation by User A (by in-band interaction procedures), provides the info to the AS1 (via the S-CSCF1).

Completion of the Service Retention Procedure
  On receiving the CCNReg activation confirmation before the expiry of the CCNReg retention timer T1, the originating AS1 should stop this timer, and add User B to the CCNReg queue of User A.

Sending of the CCNReg Requests to the Terminating AS
Sending of SUBSCRIBE
  Subsequent to the reception of confirmation from User A, the originating application server AS1 shall:
    a) Initiate a SUBSCRIBE message towards the terminating AS1 (via the originating S-CSCF1 and the terminating S-CSCF2). This SUBSCRIBE should contain the following info:
    Event: call completion;
  In addition, as explained in earlier sections, optionally (see also General Important Remarks):
    queue-nature: CCNReg;
    queue-operation: add.
    b) Start the CCNReg Request Operation timer (T2).
    c) On reception of the 200 OK with the SUBSCRIBE expiry indication, store this info, and take care to renew the SUBSCRIBE requests periodically before this expiry duration.

Reception of the First NOTIFY
  Subsequently on reception of the first NOTIFY (see Note below) from the terminating AS2 (and sending a 200 OK for the NOTIFY), the originating AS1 shall:
    a) Stop timer T2.
    b) Start CCNReg duration timer for User A (T3).
    c) Trigger a confirmation announcement to User A that the service has been successfully invoked. This announcement is initiated with the help of S-CSCF, and in turn, a Media Server (MRF) that plays the announcement.

Note: The NOTIFY message should contain the following info:
  Event: call completion;
  Subscription-state: active;
  call-completion-state=queued
In addition, as stated earlier, optionally (see also General Important Remarks), following queue-related information:
  queue-nature: CCNReg;

CCNReg Call Completion Procedures
  On reception of a NOTIFY with the following indication (i.e., indicating User B has registered, and is free to be 'recalled' by User A):
    Event: call-completion;
    Subscription-State: active;
    call-completion-state=ready-for-call-completion
  In addition, as stated earlier, optionally (see also General Important Remarks), following queue-related information:
    queue-nature: CCNReg;
  The originating application server AS1 should respond with a 200 OK to the NOTIFY. Now User A can be recalled.

CCNReg Recall to User A
  After receiving information that User B has registered, and 'ready-for-call-completion' (via NOTIFY message), User A is recalled by the originating AS by sending an INVITE (without SDP) via the S-CSCF, and starting the CCNReg (originating Node) Recall Timer (T4).
  On reception of 200 OK (with SDP Offer) from User A (via the S-CSCF) (when User A accepts the Recall by picking up the phone), the application server AS1 initiates an announcement to be played indicating to user A that the CCNReg call is being completed, and he/she is going to be connected to User B. This announcement is triggered by contacting the MRF (via the S-CSCF1).
  Subsequently (after completion of the announcement), an INVITE is sent from the originating AS1 towards User B (via S-CSCF1, S-CSCF2, and the terminating AS2). This INVITE has no SDP, and contains the indication similar to P-Service Indication header with the value 'ccss'.

Call Completion to User B
  On reception of the 180 Ringing from User B (via S-CSCF), the terminating application server AS2 will also terminate the subscription request for monitoring the registered status of User B. This is accomplished by sending a NOTIFY with the following contents towards originating application server AS1 (via S-CSCF1, S-CSCF2):
    Event=call-completion;
    Subscription-State: terminated;
    reason: no resource;
  In addition, as stated earlier, optionally (see also General Important Remarks), following information:
    queue-nature: CCNReg; (which is queue related), and
    cancellation-reason: service-completed.
  The originating AS1 on reception of this (successful) subscription cancellation, stops timer T3 (and sends 200 OK to the NOTIFY). Subsequently, the terminating AS1 sends the 180 Ringing to the originating AS2 (via S-CSCF1, S-CSCF2). This causes the originating AS to also clear the corresponding queue entry.
  Later, when User B goes off-hook and accepts the call, a 200 OK (with SDP) sent towards the terminating AS2 via the S-CSCF is passed on towards the originating AS. The originating AS1 then initiates a Re-INVITE towards User A with the SDP of B, and after receiving 200 OK from User A (via S-CSCF), the ACK (with SDP of A) is sent directly to User B.
  Subsequently, the originating AS1 also releases the call towards the MRF (that was established to play the CCNReg call connection announcement to User A).
Note: There might be slight variations with respect to the call flows in real-world scenarios, for example, a 183 Session Progress might be received first instead of 180 Ringing. What is important is that the CCNReg call is successfully completed, and all the associated resources for status monitoring, etc. for this call completion to happen are successfully cleared/freed.

CCNReg Deactivation
  This would be generated by sending a SUBSCRIBE message with:
    Expires=0.
  Subsequently, all the CCNReg resources related to this particular entry for User A (in order to complete the call to User B.

Deactivation Requested by User A
  On receiving the deactivation request from User A (Calling User), a SUBSCRIBE with the following contents will be sent by the originating AS1 towards the terminating AS2 (via S-CSCF1, S-CSCF2):
    Event=call-completion;
    Expires=0;
  In addition, as stated earlier, optionally (see also General Important Remarks), following information:
    queue-nature=CCNReg.
  A deactivation confirmation announcement is played to User A, using a Media Server and the S-CSCF1. Subsequently, all the CCNReg resources related to this particular entry for User A (in order to complete the call to User B.

Deactivation Caused by Timer Expiry
  The actions will be similar to the previous section (Deactivation requested by User A).

Actions at the Incoming S-CSCF (Terminating S-CSCF2)
General Remark: The actions associated with the SUBSCRIBE-NOTIFY between the terminating S-CSCF2 and the terminating Application Server AS2 to monitor the registration state of User B using the "reg" event package is NOT described here in detail.

Sending of 404 Not Found
  If the second approach is chosen, then the terminating S-CSCF2 will be active during reception of the INVITE for every call. If the initial INVITE is NOT forwarded to the terminating AS, then the S-CSCF2 of User B has to do the following: After checking User B's profile to ensure that User B does not have CCNReg inhibition, a 404 Not Found response should include:
    Reason header: user not registered/user not available; (see Note 2 below)
    Allow-Events: call-completion Notes:
1. In some implementations, when the second approach is followed, a 480 Temporarily Unavailable response may be sent instead of the 404 Not Found response. In that case, the updates to the Allow-Events and Reason header listed above should be supported in the 480 response instead of the 404 response.
   The Reason header in the 404/480 response is not mandatory for a pure IMS/SIP network call (i.e., calling and called users belong to IMS/SIP networks, without involvement of any PSTN/PLMN in between), but it may be essential where interworking with PSTN/PLMN.

CCNReg Allowance in User B's Profile

If the first approach is chosen, then on reception of a SUBSCRIBE for the CCNReg service, with the following contents, the terminating S-CSCF2 has to check the CCNReg allowance for User B. Also driven by the new event package (not triggered by the Initial Filter Criteria IFC), the Application Server will be invoked, when a SUBSCRIBE is received with the following contents are received:
   Event: call-completion;
and, in addition, as stated earlier, optionally (see also General Important Remarks), following information:
   queue-nature: CCNReg.
   If User B does not have CCNReg inhibition, it has to forward the SUBSCRIBE to the terminating AS2. Otherwise, a 403 Forbidden response can be sent by S-CSCF2 to Application Server 1 (AS1), as this is a case of "long term denial". As an alternative to sending the 403 response, a NOTIFY denying the subscription request can be sent by the terminating S-CSCF2 back to the originating S-CSCF1 (after sending a 200 OK to the SUBSCRIBE), which is, in turn, sent to the originating Application Server AS1. This NOTIFY message should contain the following contents:
   Event: call-completion;
   Subscription-State: terminated;
   reason: rejected;
In addition, as stated earlier, optionally (see also General Important Remarks), following information:
   queue-nature: CCNReg;
   denial-reason: long-term-denial.
In case of some temporary failure conditions due to which the SUBSCRIBE cannot be accepted, the S-CSCF2 should send a 480 temporarily unavailable response to Application Server 1 (AS1). In case of some general error (for example, CCNReg inhibition as discussed above), the terminating S-CSCF2 should send a 403 Forbidden response to Application Server 1 (AS1). Alternatively, after acknowledging the SUBSCRIBE request (with a 2xx response), a proper NOTIFY specifying that the subscription is "terminated", etc., optionally along with "denial reason" can be sent by terminating S-CSCF2 to Application Server 1 (AS1).
Note: Instead of the S-CSCF, the terminating AS may also check User B's profile (for CCNReg inhibition) in Approach 1 as well as in Approach 2, and in such cases, the received requests (INVITE/SUBSCRIBE) will simply be forwarded by the S-CSCF to the AS, without performing any checks.
Informing Terminating AS of User B's Registration The Registration message (REGISTER) is sent from the user to P_CSCF. This is forwarded to the I_CSCF. This latter sends UAR to HSS, which replies with a UAA. This UAA will contain the S_CSCF that was assigned by the HSS during the processing of the SUBSCRIBE in case of first approach, or the INVITE in case of second approach.

I_CSCF forwards the REGISTER message to the S_CSCF. This, in turn, is then forwarded to the (terminating) AS (the actions specific to the "reg" event package for the "notifier" are performed by the terminating S-CSCF2).
Actions at the Terminating AS (AS2)
Sending of 404 Not Found If the second approach is chosen, then the terminating S-CSCF and the terminating AS will be active during reception of the INVITE for every call. If the initial INVITE is forwarded to the terminating AS, then it has to do the following: After checking User B's profile to ensure that User B does not have CCNReg inhibition, the 404 Not Found response should include:
   Reason header: user not registered/user not available; (see Note 2 below)
   Allow-Events: call-completion Notes:
1. In some implementations, when the second approach 2 is followed, a 480 Temporarily Unavailable response may be sent instead of the 404 Not Found response. In that case, the updates to the Allow-Events and Reason header listed above should be supported in the 480 Temporarily Unavailable instead of the 404 Not Found.
2. The Reason header in the 404/480 response is not mandatory for a pure IMS/SIP network call (i.e., calling and called users belong to IMS/SIP networks, without involvement of any PSTN/PLMN in between), but it may be essential where interworking with PSTN/PLMN.

Reception of SUBSCRIBE

On reception of the SUBSCRIBE for monitoring the registration State of User B, the terminating AS should send a 200 OK with the subscription duration (Expires).

If the subscription request can be accepted (i.e., User B does not have CCNReg inhibition, in which case the subscription will be 'terminated'), and User B's CCNReg queue is also not full, a NOTIFY should be sent to originating AS (via the S-CSCFs) with the following contents:
   Event: call completion;
   Subscription-state: active;
   call-completion-state=queued
In addition, as stated earlier, optionally (see also General Important Remarks), following queue-related information:
   queue-nature: CCNReg;
Remark: In addition to what is mentioned above, if the service retention option as described in draft-poetzl-bliss-call-completion-00 (or later versions of it) (or as is currently supported in PSTN/PLMN for other call completion services such as PSTN/PLMN) is supported, then the NOTIFY message should also contain the service-retention indication.

The terminating AS also starts the CCNReg Service Duration Timer T7 (for User B). User A should be added to the CCNReg queue of User B (The 200 OK to the NOTIFY should also be processed successfully).

In case of some temporary failure conditions due to which the SUBSCRIBE cannot be accepted, for example, if User B's call-completion queue is full, Application Server 2 (AS2) should send a 480 temporarily unavailable response to Application Server 1 (AS1). In case of some general error (for example, CCNReg inhibition as discussed above), the Application Server 2 (AS2) should send a 403 Forbidden response to Application Server 1 (AS1). Alternatively, after acknowledging the SUBSCRIBE request (with a 2xx response), a proper NOTIFY specifying that the subscription is "terminated", etc., optionally along with "denial reason" can be sent by Application Server 2 (AS2) to Application Server 1 (AS1).
Monitoring Registration Status of User B The terminating AS should monitor the Registration status of User B (updated via info received from S-CSCF), and should respond to any SUBSCRIBE refresh attempts before the expiry of the SUBSCRIBE duration.
Idle Guard Timer Handling When the user to whom the CCNReg service has been invoked (User B) registers again, the (terminating) S-CSCF (S-CSCF2) informs the (terminating) AS of this event (i.e., after successful registration). The S-CSCF on receiving a REGISTER, would initiate a third party REGISTER towards the (terminating) AS. The terminating AS could SUBSCRIBE to the 'reg' event package, when it receives a third party REGISTER request: the basic mechanism is described in IETF RFC 3680 and 3GPP TS 24.229 (Section 'Common Application Server (AS) Procedures'). On learning that User B has successfully registered (as described above), the CCN- Reg Idle Guard timer (T8) is started (See Note 1 below). During this 'idle guard' period, User B (who has just registered) will be allowed to only make outgoing calls, and all incoming calls will encounter the 'busy' indication (See Note 2 below).

On expiry of timer T8, the terminating AS sends a NOTIFY (See Note 3 below) to the originating AS with the following indication:
Event=call-completion;
Subscription-State: active;
call-completion-state=ready-for-call-completion In addition, as stated earlier, optionally (see also General Important Remarks), following queue-related information:
queue-nature: CCNReg.

It also starts the (CCNReg Destination Node) Recall Timer (T9).

Notes:
1. A variant of this could be that User B is also allowed to receive incoming calls (if he is free) during the idle guard period (i.e., the idle guard timer can be a configurable value by the operator).
2. This 'busy' indication could result in interaction with CCBS service.
3. The NOTIFY mentioned above is sent to the first entry in the CCNReg queue of User B.

Call Completion to User B

After completion of the announcement playing to User A (that the CCNReg call is being completed), the originating AS sends an INVITE (without SDP) to the terminating AS (via the S-CSCFs), with the P-Service Indication header containing the value "ccss" (See Note 2). On reception of this INVITE, the terminating AS sends it towards the called user (User B) via the S-CSCF2 (the P-service indication header may be removed by the S-CSCF2). Subsequently, on reception of 180 Ringing from User B, the terminating AS shall cancel timers T9 and T7, and release the resources associated with this CCNReg request, including the corresponding queue entry.

On reception of the 180 Ringing from User B (via terminating S-CSCF (S-CSCF2)), the terminating AS sends the 180 Ringing to the originating AS (via the 2 S-CSCFs).

Subsequently, the terminating AS will also terminate the subscription request for monitoring the registered status of User B. This is accomplished by sending a NOTIFY with the following contents towards originating AS (via the 2 S-CSCFs).
Event=call-completion;
Subscription-State: terminated;
reason: no resource;

In addition, as stated earlier, optionally (see also General Important Remarks), following information:
queue-nature: CCNReg; (which is queue related), and,
cancellation-reason: service-completed.

Later, when User B goes off-hook and accepts the call, a 200 OK (with SDP) is sent towards the terminating AS via the S-CSCF. This is then passed on towards the originating application server AS1.

Notes:
1. The ACK for the 200 OK (with SDP of A) is sent by the originating AS directly to User B without the terminating AS being involved.
2. A new token, say "ccnreg", can also be used instead of the existing "ccss".

There might be slight variations with respect to the call flows in real-world scenarios, for example, a 183 Session Progress might be received first instead of 180 Ringing from User B. What is important is that the CCNReg call is successfully completed, and all the associated resources for status monitoring, etc. for this call completion to happen are successfully cleared/freed.

Actions at the MGCF

Note: The updates to MGCF are required only when this service is provided across PSTN/PLMN networks. The MGCF should provide the mapping functionality as described in the section on "Interworking with TCAP and SIP, and ISUP and SIP".

Service Interactions

There could be interactions of the CCNReg service with other services, some examples of which are given below:

Queue-processing Priority

If different call completion services are implemented using separate queues, and another User C books a CCBS request to User B (who has just registered back, and to whom User A has CCNReg booking) during:
(CCNReg) Idle Guard Timer running
CCNReg recall procedure
. . .
it has to be decided which queue will have priority (CCNReg/CCBS). This can be made provisionable, so that the operator will have the possibility to decide the priority for his network.

User A Ends Up Having Both CCNReg & CCBS Booking

Suppose User A has CCNReg booking to User B. User B subsequently registers back, but:
Becomes busy during the idle guard period/recall procedure/ . . .
User A initiates another call attempt when User B is in conversation with another User (before the CCNreg service is completed)

The above would result in a situation when User A will have both CCNReg & CCBS booking towards the same User B. In such a scenario, there are 2 possibilities:

1. If the properties of both call attempts are identical (same media, same callee/caller identities, etc.):

There are 2 ways of the network handling this ->these 2 service bookings (CCNReg/CCBS) are treated as:
2 different bookings: Each one (CCNReg/CCBS) will be processed separately, according to the procedures for CCNReg & CCBS respectively.
A single booking: Whichever recall (CCNReg/CCBS) gets completed first successfully (see previous section for the handling priority) will result in both entries being cleared from their respective queues.

2. If the properties of both call attempts are not identical:

These 2 service bookings (CCNReg/CCBS) are treated as 2 different bookings and each one (CCNReg/CCBS) will be processed separately, according to the procedures for CCNReg & CCBS respectively.

Extensions/Enhancements

Presence-based Call-completion

The procedures described above can be easily extended for Call Completion based on User Availability/Presence. The only major update would be that an S-CSCF and an application server AS would already be active for a user who is 'not present' (but registered). In addition, the SUBSCRIBE/NOTIFY contents may require some modifications, and different queues may need to be managed.

Selective Call Completion

User B could be provided an announcement/indication of the pending queue entries, and he can then decide to accept the recall attempt only for 'selected' users.

Same Queue for all Call Completion Services (CCBS, CCNR, CCNReg, . . . )

In order to solve the handling priority issue across different call-completion services, a single queue can be used for all call-completion services internally within the AS (without impacting the protocol message contents).

CCNReg as a Terminating Service

In the above description, CCNReg has been discussed as an originating Service, i.e., a service provided to a calling user. It is also possible to extend this concept to make this service available for User B, i.e., User B will be able to activate this service (for example, before becoming 'not available'), and then any call attempt to him during the period of unavailability will be stored in a queue, and such attempts will be completed by the network automatically once User B becomes 'available'/'registered'. As a further step, such a CCNReg terminating service can be offered as 'selective', i.e., similar to Selective Call Completion above.

Standard Related Modifications

Important Remark:

At the time of writing this document, the IETF draft draft-poetzl-bliss-call-completion-00, IETF draft-poetzl-sipping-call-completion-02, ETSI TISPAN Draft TS183 042 V.0.0.18 were used as references.

The changes proposed are indicative in nature, and there might be some variations to what is proposed here. For example, it is possible that:

(a) a new 'queue-nature' may not be necessary to be transmitted in the NOTIFY (because it could be decided later that either (a) the field 'queue-nature' may not be present at all, and it would be left to the impacted network elements to implement the queues properly or (b) a different field will be used to carry the information on the 'type' of call completion—for example, CCBS, CCNR, CCNReg, etc.), (b) different names are used for the different queue-related fields, but conveying similar information, for example, "queue-state" as defined in IETF draft-poetzl-sipping-call-completion-02 may be used instead of the "call-completion-state".

Notes:
1. There could be other indications already supported, what is mentioned above is only the additional aspect.
2. It may be required to support the above update for Allow-Events header in a 480 Temporarily Unavailable response also (see previous sections for more info).

Reason Header in 404 Not Found

New reason code in 404 response to indicate that the user is not registered currently:

Reason: SIP; cause=404; text="user not registered"

Reason: SIP; cause=404; text="user not available" (for presence case, more text types can be added as required, and the SIP error response could also be 480 Temporarily Unavailable instead of 404 Not Found).

This, in conjunction with the Allow-Events header would enable the Calling side to determine that it is the CCNReg case, and CCNReg booking can be done. This Reason header in 404 response as described above is optional for calls involving only IMS/SIP networks, but may be essential for interworking with PSTN/PLMN (depending on the actual outcome of standardization/implementation).

Note: It may be required to support the above update for Reason header in a 480 Temporarily Unavailable response also (see previous sections for more info).

P-Service-Indication Header

As for CCBS, for the CCNReg service, this can be used to give priority to incoming requests by the UAS containing this header over other incoming requests not having this header. There are 2 options: either a new token, say, "CCNReg" can be defined, or, the existing service-request "ccss" can be used to indicate a CCNReg call also.

Note: If call completion services are standardized based on draft-poetzl-sipping-call-completion-02 (or later versions of it), then a the following aspects related to queue handling would be required on top of it for CCNReg:

Queue Nature

Queue-nature=CCNReg (a new queue type).

CCNReg indicates that it is a request for a CCNReg queue).

Diameter

A new AVP may be defined in the LIR from I-CSCF towards HSS, for requesting the HSS to ALWAYS return S-CSCF capabilities/S-CSCF identity if this AVP is present. The following table is based on [10].

| Attribute Name | AVP Code | Section defined | Value Type | AVP Flag rules | | | | |
| --- | --- | --- | --- | --- | --- | --- | --- | --- |
| | | | | Must | May | Should not | Must not | May Encr. |
| Call-completion-unavailable-user | Xyz | | OctetString | | | | | No |

Event package: The call-completion event package as defined in "IETF Draft draft-poetzl-bliss-call-completion-00: Extensions to the Session Initiation Protocol (SIP) for the support of the Call Completion Services for ETSI" can be used. (If not, the aspects that are required for this service can be standardized based on what is proposed in it). Only the following updates/additions are required on top of it:

Allow-Events in 404 Not Found

"Allow-Events" header field to be included in the 404 response to the INVITE. This header field should be coded as follows in the 404 response to the INVITE:

"Allow-Events: call-completion"

Alternatively, a new AVP value may be defined in the supported features AVP, to indicate "CCNReg" feature, and the HSS can then return S-CSCF capabilities on receiving this AVP value in the LIR.

Note: If the second approach is followed, then as an enhancement, a new AVP may be introduced to indicate the request type (e.g., INVITE), so that the HSS can always return the S-CSCF capabilities/identity only for LIR triggered for an INVITE.

TCAP

Note: The updates to TCAP are only required for PSTN/PLMN interworking. The basic principle of working is very similar to the CCBS/CCNR services as defined in ITU-T Q.733.3/Q.733.5, including normal operation, timers, exceptional cases, etc. The updates to TCAP are described in earlier sections.

ISUP

Note: The updates to ISUP are only required for PSTN/PLMN interworking,
Cause Parameter
Two new cause values, say, A and B need to be supported for indicating the cases "called user not registered" and "called user not available".
Diagnostics
Diagnostics sub-field should be present for Causes A and B with the values as described in previous sections.
Note that if diagnostics is not present, then it can be assumed that 'CCNReg is not possible'. If this method is followed, then diagnostics need to be present only if 'CCNReg is possible'.
Additional Remark: If it is decided to implement a different value in the P-service-indication header in SIP for CCNReg service (instead of using "ccss"), then it has to be mapped to a new parameter/parameter value.

Extensions to PLMN/PSTN

Queue management procedures can be done by PSTN/PLMN switches, similar to CCBS/CCNR. Protocol updates are required in TCAP and ISUP (in addition to what is required for the basic CCNReg service, i.e., in SIP and DIAMETER). The protocol mapping and interworking functionality is proposed to be implemented in the MGCF (or, to be more general, in a Softswitch). The proposed method makes CCNReg service scope to be near-ubiquitous, i.e., it can be offered to ANY user (PSTN/PLMN/SIP/IMS), irrespective of the Calling and Called users networks, due to the proposed protocol mappings.

There is claimed:

1. A method of providing a call completion service to a not registered or not available user, the service being referred to as CCNReg, the call originating from a first user and terminating at a second user that are both in an IP Multimedia Subsystem (IMS) telecommunication network comprising:
   a Proxy-Call Session Control Function P-CSCF;
   an originating Interrogating-Call Session Control Function (I-CSCF), for a first user who is originating a call to a second user;
   a terminating I-CSCF, for the second user;
   an originating Serving-Call Session Control Function (S-CSCF), for the first user;
   a terminating S-CSCF, for the second user;
   an originating application server, for the first user;
   a terminating application server, for the second user; and
   a Home Subscriber Server (HSS);
   the method comprising:
   detecting that the second user is not registered or not available; and
   monitoring the status of the second user;
      wherein, for monitoring the status of the second user, the method comprises:
         sending a first SUBSCRIBE message, from the originating application server to the terminating I-CSCF, via the originating S-CSCF, the first SUBSCRIBE message comprising indications to inform the terminating I-CSCF of the initiation of the CCNReg service for completion of the communication attempt between the first user and the second user;
         on determining that the first SUBSCRIBE message is for CCNReg by finding the indications mentioned above, sending a Location Information Request (LIR), from the terminating I-CSCF towards the HSS, requesting information about the terminating S-CSCF;
         sending a Location Info Answer (LIA) comprising S-CSCF capabilities or/and name, from the HSS to the terminating I-CSCF;
         on receiving S-CSCF capabilities or/and name in the terminating I-CSCF, assigning the terminating S-CSCF, and forwarding the SUBSCRIBE message to the terminating S-CSCF;
         sending a Server Assignment Request (SAR) from the terminating S-CSCF to the HSS;
         sending a Server Assignment Answer (SAA) comprising second user's profile info, from the HSS to the terminating S-CSCF;
         forwarding the first SUBSCRIBE message, from the terminating S-CSCF to the terminating application server, for requiring to handle the CCNReg service functions for the second user;
         sending a first NOTIFY message from the terminating application server to the originating application server with the indication that the CCNReg subscription to the CCNReg service is active, and that the CCNReg request for the first user to communicate with the second user has been queued; and
         when the second user becomes registered/available again, and becomes ready for completion for the CCNReg call, and the first user becomes the first entry in the call completion queue, sending a second NOTIFY message from the terminating application server to the originating application server with the indication that the CCNReg subscription to the CCNReg service is active, and that the second user is now registered/available and ready for call completion to the first user.

2. The method according to claim 1, wherein for detecting that the second user is not registered or not available, the method comprises:
   sending an INVITE from a user equipment (UE1) of the first user towards the terminating I-CSCF;
   sending a Diameter Location Info Request (LIR-Cx) from the terminating I-CSCF to the HSS, to get information about the terminating S-CSCF for the second user;
   sending a Location-Info-Answer (LIA) from the HSS to the terminating I-CSCF, the answer comprising a DIAMETER_ERROR_IDENTITY_NOT_REGISTERED indication;
   sending a 404 Not Found response from the terminating I-CSCF back to the originating S-CSCF which in turn forwards it to the originating application server, the response comprising at least one of the indications:
      Allow-Events header: Call-completion; and
      Reason-header: 'user not registered/user not available';
   forwarding the SUBSCRIBE message, from the originating application server to the terminating I-CSCF, via the originating S-CSCF, the SUBSCRIBE message comprising indications to inform the terminating I-CSCF of the initiation of the CCNReg service for completion of the communication attempt between the first and the second user;

on determining that the SUBSCRIBE message is for CCN-Reg by finding the indications mentioned above, sending a Location Information Request (LIR), from the terminating I-CSCF towards the HSS, requesting information about the terminating S-CSCF, the Location Information Request comprising an Attribute Value Pair to indicate to HSS that S-CSCF information should be returned in its answer, even though the user is not registered /available;

sending a Location Info Answer comprising S-CSCF capabilities and name, from the HSS to the terminating I-CSCF.

3. The method according to claim 1, wherein for detecting that the second user is not registered or not available, the method comprises:

sending a Diameter Location-Info-Request (LIR-Cx) from the terminating I-CSCF to the HSS, to get information about the terminating S-CSCF;

in response to the Diameter Location-Info-Request, sending S-CSCF capabilities and/or name, from the HSS to the terminating I-CSCF;

selecting, in the I-CSCF a terminating S-CSCF, based on the returned S-CSCF capabilities and/or name;

sending an INVITE message from the terminating S-CSCF to the terminating application server, for activating the latter;

sending a 404 Not Found/480 Temporarily unavailable response from the terminating application server towards the originating application server, the response comprising at least one of the indications:
Allow-Events header: Call-completion; and
Reason-header: 'user not registered/user not available'.

4. A method of providing a call completion service to a not registered or not available user, the service being referred to as CCNReg, the call originating from a first user in a Public Switched Telephone Network (PSTN) or a Public Land Mobile Network (PLMN) and terminating at a second user in an IP Multimedia Subsystem (IMS) telecommunication network comprising:
a Proxy-Call Session Control Function (P-CSCF);
an Interrogating-Call Session Control Function (I-CSCF);
a terminating Serving-Call Session Control Function (S-CSCF), for the second user;
a terminating application server, for the second user;
a Home Subscriber Server (HSS);
a Media Gateway Controller Function (MGCF) at the interface of the originating PSTN/PLMN and of a terminating IMS network;
the method comprising:
detecting that the second user is not registered or not available; and
monitoring the status of the second user;
wherein, for monitoring the status of the second user, the method comprises:
sending from the originating PSTN/PLMN to the MGCF at the interface of the originating PSTN/PLMN and of the terminating IMS network, a Transaction Capabilities Application Part (TCAP) message TC-BEGIN CCNReg Request invocation;
mapping, in the MGCF, the TC-BEGIN message to a first SUBSCRIBE message, and sending it to a terminating I-CSCF;
sending from the terminating I-CSCF to the HSS, a Location Information Request (LIR-Cx) to get information about the terminating S-CSCF for the second user, with a new Attribute Value Pair included to inform the HSS to return S-CSCF information;
sending from the HSS to the I-CSCF, a Location Information Answer (LIA-Cx) with S-CSCF info;
sending a second SUBSCRIBE message from the terminating I-CSCF to the terminating application server, via the terminating S-CSCF, for requiring to handle the CCNReg service functions for the second user;
sending a first NOTIFY to the MGCF at the interface of the originating PSTN/PLMN and of the terminating IMS network with the indication that the CCNReg subscription to the CCNReg service is active, and that the CCNReg request for the first user to communicate with the second user has been queued;
mapping, in the MGCF, the first NOTIFY message to a TCAP message TC CONT CCNReg Request, with a successful result code, and sending the message to the originating network, to indicate to the first user that the status monitoring of the second user has been initiated successfully;
when the second user becomes registered/available again, sending a second NOTIFY message from the terminating application server to the MGCF via the terminating S-CSCF with the indication that the second user is free for recall and ready for call completion, and so the CCNreg call completion attempt between the first and the second user can take place;
mapping the NOTIFY message to a TCAP TC CONT Remote User Free message;
sending an Initial Address Message (IAM) message from the originating PSTN/PLMN to a MGCF at the interface of the originating PSTN/PLMN with the terminating IMS network, the IAM comprising a "ccss" parameter;
mapping the IAM to a Session Initiation Protocol (SIP) INVITE message and sending it towards terminating IMS network elements; and
mapping the "ccss" parameter in the IAM message to the P-service-indication header of this message, with value "ccss", in SIP.

5. A method of providing a call completion service to a not registered or not available user, the service being referred to as CCNReg, the call originating from a first user in an IP Multimedia Subsystem (IMS) based telecommunication network and terminating at a second user in a Public Land Mobile Network (PLMN), the IMS telecommunication network comprising:
an originating Serving-Call Session Control Function (S-CSCF) for a first user who is originating a call to a second user;
an originating application server for the first user;
an originating Interrogating-Call Session Control Function (I-CSCF), for the first user;
a terminating I-CSCF, for the second user;
a Home Subscriber Server (HSS); and
a Media Gateway Control Function (MGCF) at the interface of the IMS based telecommunication network and of the PLMN;
the method comprising:
detecting that the second user is not registered or not available; and
monitoring the status of the second user;
wherein, for monitoring the status of the second user, the method comprises:
sending a SUBSCRIBE message from the originating application server to the originating S-CSCF, the SUBSCRIBE message comprising indications to inform of the initiation of the CCNReg service for completion of the communication attempt between the first user and the second user;

forwarding the SUBSCRIBE from the originating S-CSCF to the MGCF;

mapping the SUBSCRIBE, in the MGCF, to a Transaction Capabilities Application Part (TCAP) message TC BEGIN with a CCNReg Request invocation, and sending the latter to the PLMN;

receiving from the PLMN, a TC CONT CCNReg Request message with a return code indicating success;

mapping, in the MGCF at the interface of the IMS based telecommunication network and of the PLMN, the TC CONT message to a first NOTIFY message, and sending it to the originating application server with the indication that the CCNReg subscription to the CCNReg service is active, and that the CCNReg request for the first user to communicate with the second user has been queued;

receiving in the MGCF, from the PLMN, a TC CONT message indicating that the second user is available, when the second user becomes available;

mapping, in the MGCF, the message TC CONT to a second NOTIFY message and sending it to the originating application server, with the indication that the second user is free for recall and ready for call completion, and so the CCNreg call completion attempt between the first and the second user can take place;

sending a Session Initiation Protocol (SIP) INVITE message from the originating Application Server to the MGCF at the interface of the originating IMS network with the terminating PLMN, the INVITE message comprising the P-service-indication header in the message, with value "ccss";

mapping the INVITE message to an Initial Address Message (IAM) and sending it towards the terminating PLMN, and mapping the P-service-indication header in the INVITE message to the "ccss" parameter in the IAM message.

6. The method according to claim 1 wherein the SUBSCRIBE message comprises the following indications:
event: call completion.

7. The method according to 6, wherein the SUBSCRIBE message further comprises the following indications:
queue-nature: CCNReg; and
queue-operation: add.

8. The method according to claim 1 wherein the first NOTIFY message comprises the following indications:
event: call completion; and
call-completion-state: queued.

9. The method according to claim 1 wherein the first NOTIFY message further comprises the following indications:
queue-state: "request-queued"; and
queue-nature: CCNReg.

10. The method according to claim 1 wherein the second NOTIFY message comprises the following indications:
event: call completion; and
call-completion-state: ready-for-call-completion.

11. The method according to claim 1 wherein the second NOTIFY message further comprises the following indications:
queue-state: "user-free-for-recall"; and
queue-nature: CCNReg.

* * * * *

UNITED STATES PATENT AND TRADEMARK OFFICE
CERTIFICATE OF CORRECTION

| | | |
|---|---|---|
| PATENT NO. | : 8,359,015 B2 | Page 1 of 1 |
| APPLICATION NO. | : 12/810548 | |
| DATED | : January 22, 2013 | |
| INVENTOR(S) | : Swaminathan et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 179 days.

Signed and Sealed this
Eleventh Day of August, 2015

Michelle K. Lee
*Director of the United States Patent and Trademark Office*